United States Patent
He et al.

(10) Patent No.: US 10,749,991 B2
(45) Date of Patent: Aug. 18, 2020

(54) EMULATION-BASED CROSS-TECHNOLOGY COMMUNICATION

(71) Applicant: Regents of the University of Minnesota, Minneapolis, MN (US)

(72) Inventors: Tian He, Arden Hills, MN (US); Zhijun Li, Minneapolis, MN (US); Ruofeng Liu, Minneapolis, MN (US); Wenchao Jiang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 145 days.

(21) Appl. No.: 15/994,472

(22) Filed: May 31, 2018

(65) Prior Publication Data
US 2018/0352055 A1 Dec. 6, 2018

Related U.S. Application Data

(60) Provisional application No. 62/512,976, filed on May 31, 2017, provisional application No. 62/581,452, filed on Nov. 3, 2017.

(51) Int. Cl.
*H04L 5/12* (2006.01)
*H04L 29/06* (2006.01)
(Continued)

(52) U.S. Cl.
CPC .......... *H04L 69/08* (2013.01); *H04L 1/0083* (2013.01); *H04L 1/0084* (2013.01);
(Continued)

(58) Field of Classification Search
CPC . H04L 69/08; H04L 27/2646; H04L 27/0008; H04L 1/0083; H04L 27/2636;
(Continued)

(56) References Cited

U.S. PATENT DOCUMENTS 6,259,675 B1 * 7/2001 Honda .................... H04L 43/00
370/248
8,582,599 B2 * 11/2013 Hamamoto ....... H04L 29/12358
370/392
(Continued)

FOREIGN PATENT DOCUMENTS

CN 1034756 A 12/2013
TW 201445928 A 12/2014

OTHER PUBLICATIONS

Adib et al., "Interference Alignment by Motion," MobiCom'13, Sep. 30-Oct. 4, 2013, 12 pp.
(Continued)

*Primary Examiner* — Don N Vo
(74) *Attorney, Agent, or Firm* — Shumaker & Sieffert, P.A.

(57) ABSTRACT

In general, a system is described that includes two computing devices, a first which is configured to operate using a first wireless protocol and a second which is configured to operate using a second wireless protocol different than the first wireless protocol. The first computing device may determine a symbol to be sent to the second computing device. For each bit included in a payload of a data packet, the first computing device may set a value of the respective bit such that the symbol, when the data packet is translated into at least one signal using the first wireless protocol, is readable using the second wireless protocol. The first computing device generates the signal using the first wireless protocol, and outputs, via the first wireless protocol, the at least one signal. The second computing device may receive the at least one signal and demodulate the payload.

38 Claims, 26 Drawing Sheets

(51) Int. Cl.
| | |
|---|---|
| *H04L 1/00* | (2006.01) |
| *H04L 27/227* | (2006.01) |
| *H04L 27/26* | (2006.01) |
| *H04L 27/00* | (2006.01) |
| *H04W 16/14* | (2009.01) |
| *H04W 4/80* | (2018.01) |
| *H04W 80/00* | (2009.01) |
| *H04L 27/36* | (2006.01) |

(52) U.S. Cl.
CPC ...... *H04L 27/0008* (2013.01); *H04L 27/2273* (2013.01); *H04L 27/2636* (2013.01); *H04L 27/2646* (2013.01); *H04W 4/80* (2018.02); *H04W 16/14* (2013.01); *H04L 27/36* (2013.01); *H04W 80/00* (2013.01)

(58) Field of Classification Search
CPC ... H04L 27/2273; H04L 1/0084; H04L 27/36; H04W 4/80; H04W 16/14; H04W 80/00
USPC ............................ 375/261; 370/395.5–395.54
See application file for complete search history.

(56) References Cited

U.S. PATENT DOCUMENTS

| | | | |
|---|---|---|---|
| 9,237,445 | B1 | 1/2016 | Wu |
| 10,142,821 | B2 | 11/2018 | Kim et al. |
| 2005/0066038 | A1* | 3/2005 | Sakamoto ......... H04L 29/06027 709/227 |
| 2007/0254596 | A1 | 11/2007 | Corson et al. |
| 2009/0147768 | A1 | 6/2009 | Ji et al. |
| 2011/0075614 | A1* | 3/2011 | Newkirk ............... H04W 12/04 370/329 |
| 2011/0243110 | A1 | 10/2011 | Dean et al. |
| 2012/0328061 | A1 | 12/2012 | Chow |
| 2013/0235773 | A1 | 9/2013 | Wang et al. |
| 2013/0259019 | A1 | 10/2013 | Karaoguz et al. |
| 2018/0146075 | A1* | 5/2018 | Lee ......................... H04L 69/22 |

OTHER PUBLICATIONS

Bahl et al., "White Space Networking with Wi-Fi like Connectivity," SigComm'09, Aug. 17-21, 2009, 12 pp.
Balasubramanian et al., "Energy Consumption in Mobile Phones: A Measurement Study and Implications for Network Applications," ACM, Internet Measurement Conference 2009, Nov. 4-6, 2009, 16 pp.
Cao et al, "L2: Lazy Forwarding in Low Duty Cycle Wireless Sensor Networks," Proceedings IEEE InfoCom 2012, Mar. 25-30, 2012, 9 pp.
Carbonelli et al., "M-PPM Noncoherent Receivers for UWB Applications," IEEE Transactions on Wireless Communications, vol. 5 No. 8, Aug. 2006, 13 pp.
Carroll et al., "Continua: An Interoperable Personal Healthcare Ecosystem," Pervasive Computing, Standards & Emerging Technologies, Oct.-Dec. 2007, 6 pp.
Chai et al., LTE in Unlicensed Spectrum: Are We There Yet?, MobiCom'16, Oct. 3-7, 2016, 14 pp.
Chebrolu et al., "Esense: Communication through Energy Sensing," MobiCom '09, Sep. 20-25, 2009, 12 pp.
Chen et al., "AirExpress: Enabling Seamless In-band Wireless Multi-hop Transmission," MobiCom'15, Sep. 7-11, 2015, 12 pp.
Chen et al., "Interference Alignment Using Shadow Channel," IEEE Conference on Computer Communications, Infocom '15, Apr. 26-May 1, 2015, 9 pp.
Chen et al., "On Heterogeneous Neighbor Discovery in Wireless Sensor Networks," Nov. 20, 2014, 9 pp.
Chi et al., "B2W2: N-Way Concurrent Communication for IoT Devices," SenSys '16, Nov. 14-16, 2016, 14 pp.

D'Amico et al., "Energy-Detection UWB Receivers with Multiple Energy Measurements," IEEE Transactions on Wireless Communications, vol. 6, No. 7, Jul. 2007, 10 pp.
Ding et al., "Characterizing and Modeling the Impact of Wireless Signal Strength on Smartphone Battery Drain," Sigmetrics 2013, Proceedings of the 2013 ACM Sigmetrics International Conference on Measurement and Modeling of Computer Systems, Jun. 17-21, 2013, 15 pp.
Ghassemlooy et al., "Digital Pulse Interval Modulation for Optical Communications," IEEE Communications Magazine, WDM Fiber Optic Communications, vol. 36, No. 12, Dec. 1998, 7 pp.
Gollakota et al., Clearing the RF Smog: Making 802.11 Robust to Cross-Technology Interference, Proceedings of SIGCOMM 2011 and Best Papers Co-Located Workshops, ACM, vol. 41, No. 4, Oct. 2011, 15 pp.
Hao et al., WizSync: Exploiting Wi-Fi Infrastructure for Clock Synchronization in Wireless Sensor Networks, IEEE 32nd Real-Time Systems Symposium, Nov. 29-Dec. 2, 2011, 12 pp.
Iyer et al., "Inter-Technology Backscatter: Towards Internet Connectivity for Implanted Devices," Jul. 15, 2016, 15 pp.
Jin et al., "WiZi-Cloud: Application-transparent Dual ZigBee-Wifi Radios for Low Power Internet Access," IEEE InfoCom 2011, Apr. 10-15, 2011, 9 pp.
Kellogg et al., "Passive Wi-Fi: Bringing Low Power to Wi-Fi Transmissions," made available from https://passivewifi.cs.washington.edu/ on Mar. 2016, 14 pp.
Li et al., "Towards Energy-Fairness in Asynchronous Duty-Cycling Sensor Networks," ACM Transactions on Sensor Networks, vol. 10, No. 3, Article 38, Apr. 2014, 26 pp.
Li et al., "WiBee: Building Wi-Fi Radio Map with ZigBee Sensor Networks," 31st Annual IEEE International Conference on Computer Communications: Mini-Conference, Mar. 25-30, 2012, 5 pp.
Mahindra et al., "A Practical Traffic Management System for Integrated LTE-WiFi Networks," MobiCom'14, Sep. 7-11, 2014, 12 pp.
Nikolaidis et al., "COPA: Cooperative Power Allocation for Interfering Wireless Networks," CoNEXT'15 Dec. 1-4, 2015, 13 pp.
Radunović et al., "Weeble: Enabling Low-Power Nodes to Coexist with High-Power Nodes in White Space Networks," CoNext'12, Dec. 1-13, 2012, 12 pp.
Rathinakumar et al., "CPRecycle: Recycling Cyclic Prefix for Versatile Interference Mitigation in OFDM based Wireless Systems," CoNEXT '16 Dec. 12-15, 2016, made available from https://www.microsoft.com/en-us/research/publication/cprecycle-recycling-cyclic-prefix-versatile-interference-mitigation-ofdm-based-wireless-systems/ on Nov. 28, 2016, 15 pp. 15 pp.
Saifullah et al., "SNOW: Sensor Network over White Spaces," SenSys'16, Nov. 14-16, 2016, 14 pp.
Sen et al., "No Time to Countdown: Migrating Backoff to the Frequency Domain," MobiCom'11, Sep. 19-13, 2011, 12 pp.
Singh et al., "Trinity: A Practical Transmitter Cooperation Framework to Handle Heterogeneous User Profiles in Wirelss Networks," MobiHoc'15, Jun. 22-25, 2015, 10 pp.
Wirtz et al., "A Wireless Application Overlay for Ubiquitous Mobile Multimedia Sensing and Interaction," MMSys, ACM, Mar. 14-21, 2014, 12 pp.
Yun et al., "Supporting Wi-Fi and LTE Co-existence," IEEE Conference on Computer Communications, Infocom, Apr. 26-May 1, 2015, 9 pp.
Zhang et al., "Cooperative Carrier Signaling: Harmonizing Coexisting WPAN and WLAN Devices," IEEE/ACM Transactions on Networks, vol. 21, No. 2, Apr. 2013, 14 pp.
Zhang et al., "Enabling Coexistence of Heterogeneous Wireless Systems: Case for ZigBee and WiFi," May 2011, 11 pp.
Zhang et al., "Gap Sense: Lightweight Coordination of Heterogeneous Wireless Devices," Proceedings IEEE Infocom '13, Apr. 14-19, 2013, 9 pp.
Zhou et al., "BASIC: Backbone-Assisted Successive Interference Cancellation," MobiCom'16, Oct. 3-7, 2016, 13 pp.
Zhou et al., "BBN: Throughput Scaling in Dense Enterprise WLANs with Blind Beamforming and Nulling," MobiCom'14, Sep. 7-11, 2014, 12 pp.

(56) References Cited

OTHER PUBLICATIONS

Zhou et al., "ZiFi: Wireless LAN Discovery via ZigBee Interference Signatures," MobiCom'10, Sep. 20-24, 2010, 13 pp.
Kim et al., "FreeBee: Cross-technology Communication via Free Side-channel," MobiCom'15, Sep. 7-11, 2015, 14 pp.
Li et al., "Recitation: Rehearsing Wireless Packet Reception in Software," MobiCom'15, Sep. 7-11, 2015, 13 pp.
Hsu et al., "Coexistence Wi-Fi MAC Design for Mitigating Interference Caused by Collocated Bluetooth," IEEE Transactions on Computers, vol. 64, No. 2, Feb. 2015, 11 pp.
Qanbari et al., "Gatica: Linked Sensed Data Enrichment and Analytics Middleware for IoT Gateways," 3rd International Conference on Future of Things and Cloud, IEEE Computer Society, Aug. 24-26, 2015, 6 pp.
Gartner Inc, "Gartner Says the Internet of Things Installed Base Will Grow to 26 Billion Units by 2020," Press Release, Dec. 12, 2013, 3 pp.
"Part 11: Wireless LAN Medium Access Control (MAC) and Physical Layer (PHY) Specifications," Information Technology—Telecommunications and information exchange between systems—Local and metropolitan area networks—specific requirements, ANS/IEEE Std 802.11, 1999 Edition, IEEE-SA Standards Board, Jun. 12, 2003, 528 pp.
Zhang et al., "HoWiES: A Holistic Approach to ZigBee Assisted WiFi Energy Savings in Mobile Devices," IEEE Infocon, Apr. 2013, 9 pp.
Yin et al., "C-Morse: Cross-technology Communication with Transparent Morse Coding," IEEE Conference on Computer Communications, May 2017, 9 pp.
Ou et al., "MISC: Merging Incorrect Symbols using Constellation Diversity for 802.11 Retransmission," IEEE InfoCom Conference on Computer Communications, Apr. 2014, 9 pp.
Singh et al., "Trinity: A Practical Transmitter Cooperation Framework to Handle Heterogeneous User Profiles in Wireless Networks," MobiHoc'15, Jun. 22-25, 2015, 10 pp.
Nastic et al., "SDG-Pro: a programming framework for software-defined IoT cloud gateways," Journal of Internet Services and Applications, Aug. 2015, 17 pp.
Liang et al., "Surviving Wi-Fi Interference in Low Power ZigBee Networks," SenSys'10, Nov. 3-5, 2010, 14 pp.
Sen et al., "Successive Interference Cancellation: Carving out MAC Layer Opportunities," IEEE Transactions on Mobile Computing, vol. 12, Issue 2, Jan. 9, 2013, 13 pp.
Bluetooth Technology Website, "Specifications," accessed from http://bluetooth.com/specification accessed on or about Dec. 28, 2018, 2 pp.
Spill et al., "BlueSniff: Eve meets Alice and Bluetooth," Proceedings of USENIX Workshop on Offensive Technologies, 2007, 10 pp. (Applicant points out, in accordance with MPEP 609.04(a), that the year of publication, 2007, is sufficiently earlier than the effective U.S. filing date, so that the particular month of publication is not in issue.).
Texas Instruments, "Bluetooth Low Energy CC2540 Development Kit, CC2541 Evaluation Module Kit, User's Guide," Document No. SWRU301A, 2012, 39 pp. (Applicant points out, in accordance with MPEP 609.04(a), that the year of publication, 2012, is sufficiently earlier than the effective U.S. filing date, so that the particular month of publication is not in issue.).
Ha et al., "SNAIL Gateway: Dual-mode Wireless Access Points for WiFi and IP-based Wireless Sensor Networks in the Internet of Things," The 9th Annual IEEE Consumer Communications and Networking Conference, Jan. 14-17, 2012, 5 pp.
Ha et al., "Dynamic and Distributed Load Balancing Scheme in Multi-Gateway based 6LoWPAN," IEEE International Conference on Internet of Things, Sep. 1-3, 2014, 8 pp.
Hawelikar et al., "A design of Linux based ZigBee and Bluetooth Low Energy wireless gateway for remote parameter monitoring," 2015 International Conference on Circuit, Power and Computing Technologies, Mar. 19-20, 2015, 4 pp.
Huang et al., "Beyond Co-existence: Exploiting WiFi White Space for ZigBee Performance Assurance," International Conference on Network Protcols, Oct. 5-8, 2010, 10 pp.
U.S. Appl. No. 62/581,452, filed Nov. 3, 2017, naming inventors Jiang et al.

* cited by examiner

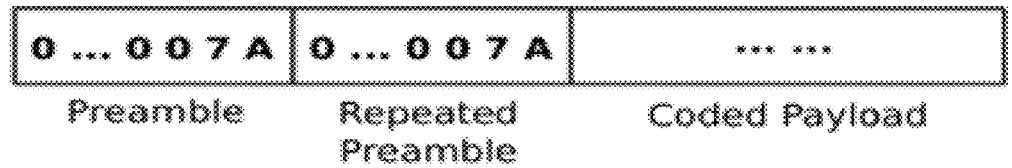
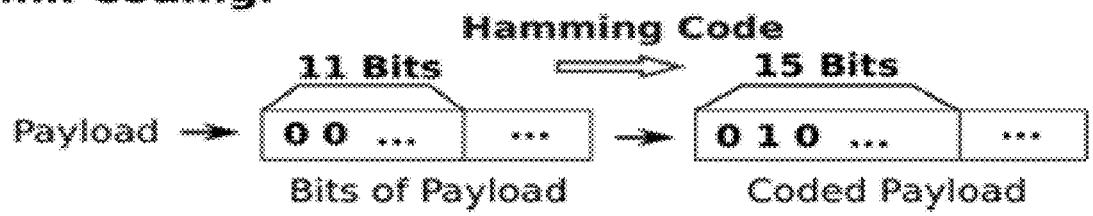
FIG. 16
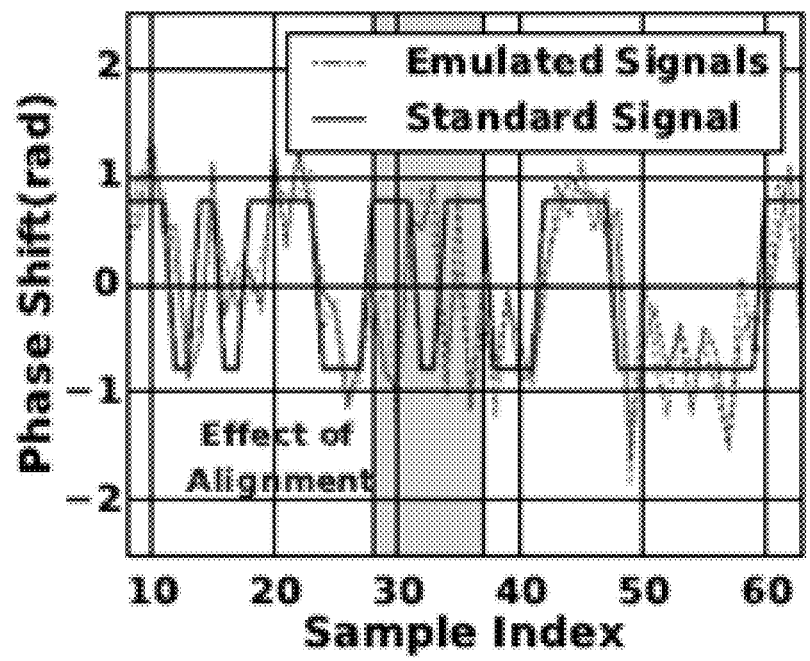
FIG. 17

Figure 4: Emulating ZigBee with BLE (a) ZigBee signal with two chips, '11'.

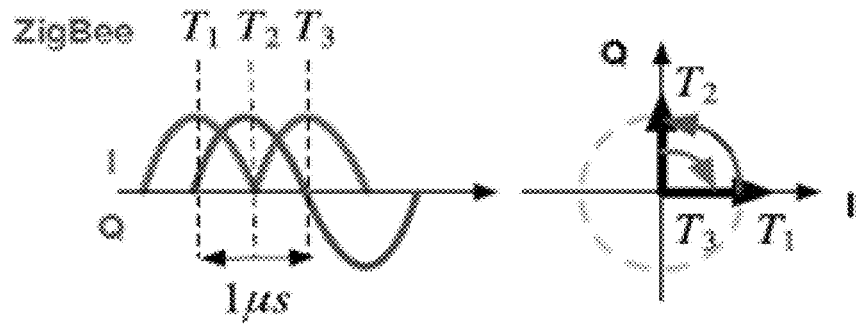
(a) Inconsistent phase shifts at ZigBee
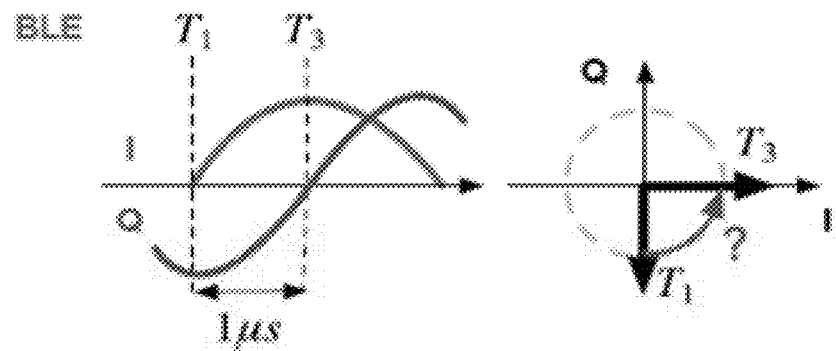
(b) Emulation of (a) by BLE
FIG. 24
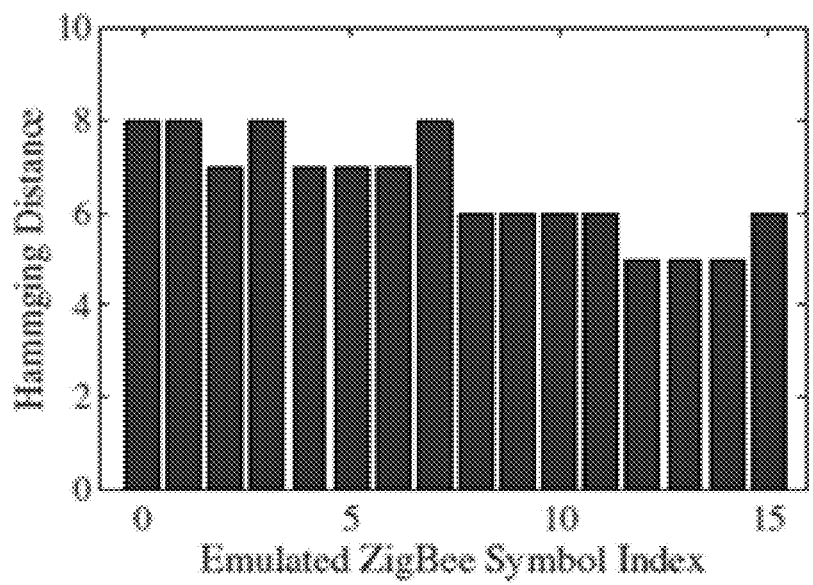
FIG. 25

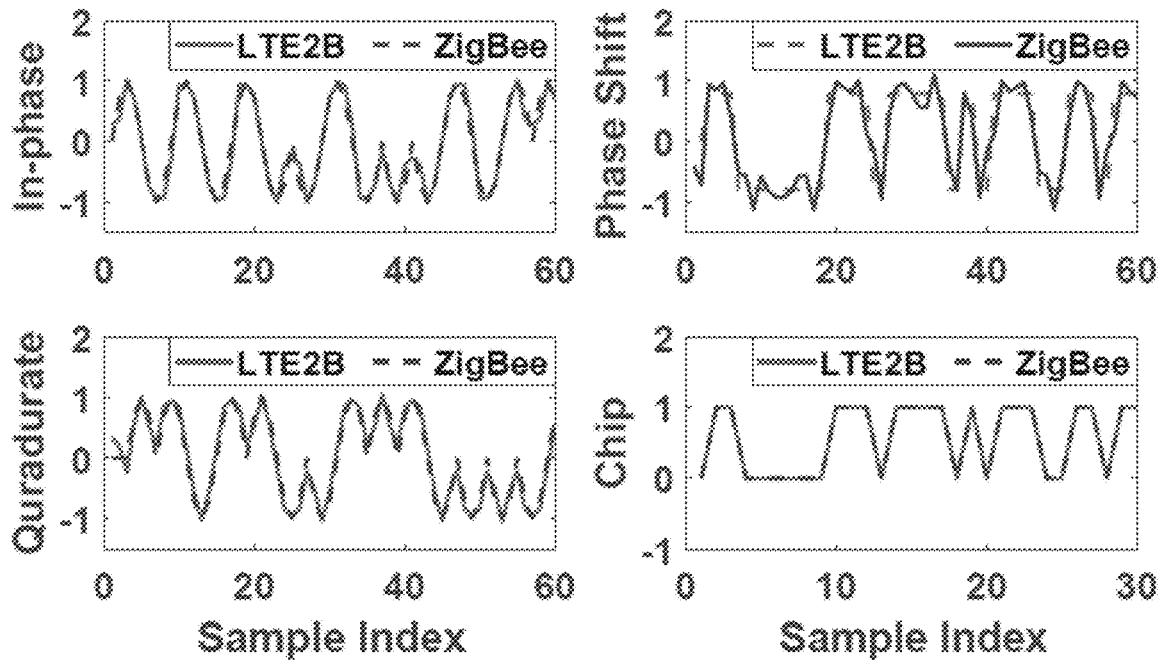
FIG. 39A  FIG. 39B
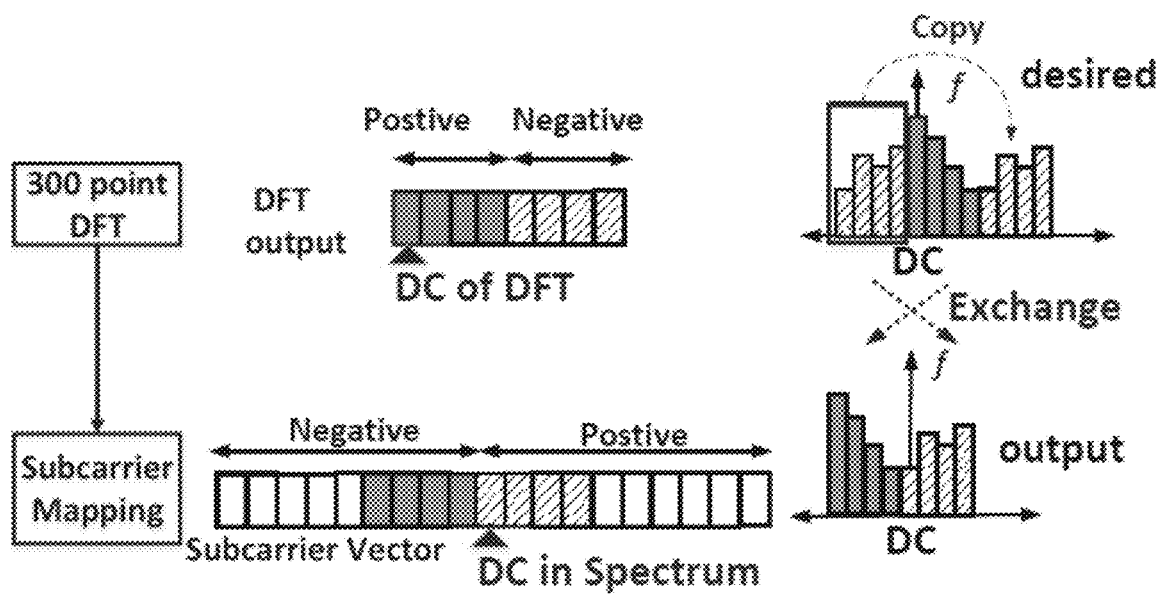
FIG. 40

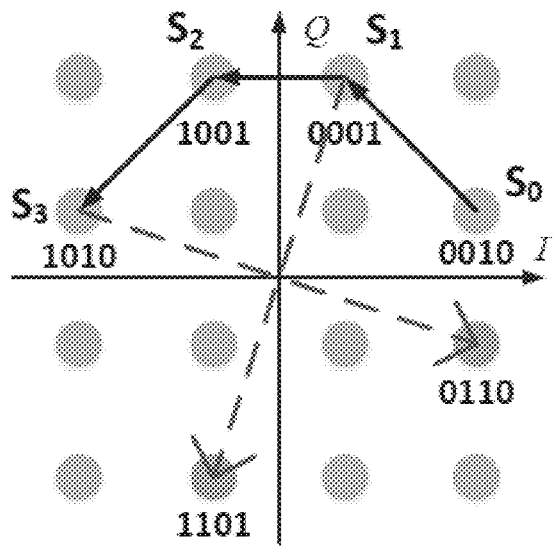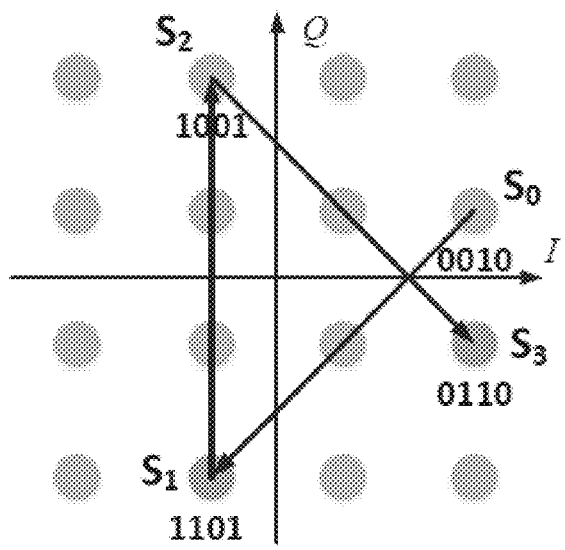
(a) Original Time Sequence
(b) Time Sequence with P/N Frequency Exchange
FIG. 41A
FIG. 41B
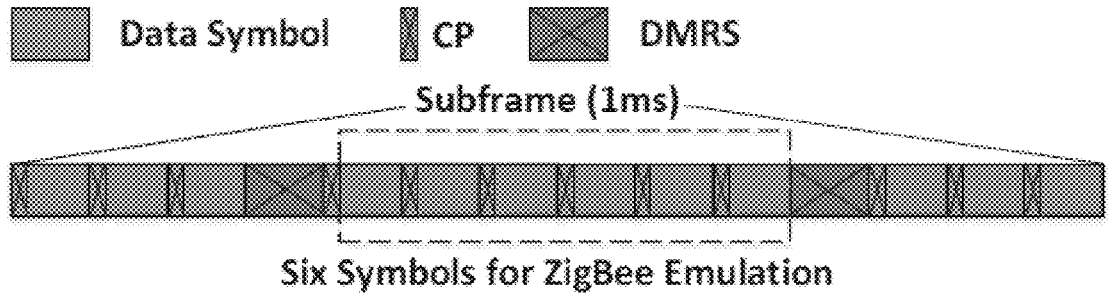
FIG. 42
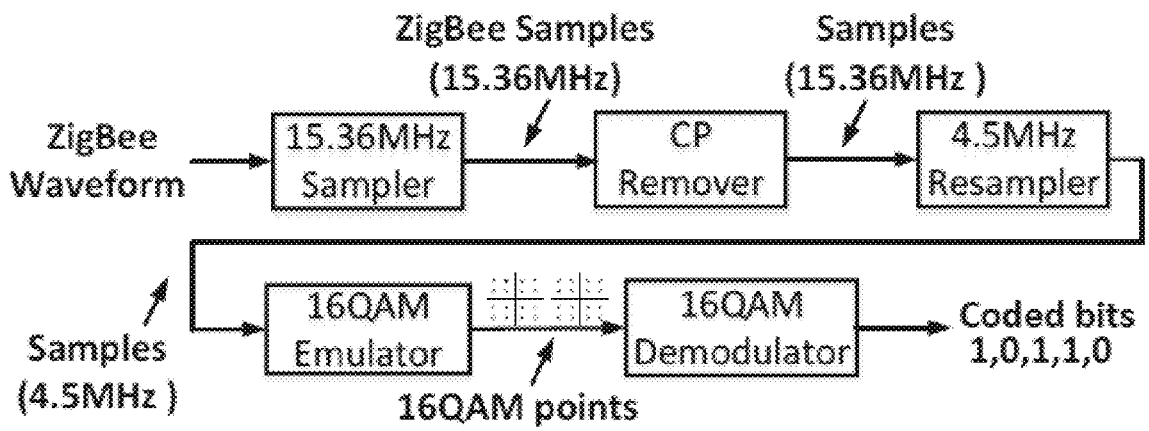
FIG. 43

EMULATION-BASED CROSS-TECHNOLOGY COMMUNICATION

EMULATION-BASED CROSS-TECHNOLOGY COMMUNICATION

This application claims the benefit of U.S. Provisional Application No. 62/512,976, filed May 31, 2017, and U.S. Provisional Application No. 62/581,452, filed Nov. 3, 2017, each of which is herein incorporated by reference herein in its entirety.

GOVERNMENT INTEREST

This invention was made with government support under contract numbers CNS-1444021 and CNS-1718456, each awarded by the National Science Foundation. The government has certain rights in the invention.

TECHNICAL FIELD

The disclosure relates to wireless communication between devices.

BACKGROUND

The number of Internet of Things (IoT) devices connected wirelessly may reach twenty billion by the year 2020, leading to the intense coexistence of wireless technologies. For spectrum efficiency under dense deployment, many of today's wireless technologies are designed to share the unlicensed/open spectrum (e.g., industrial, scientific, and medical (ISM) radio bands), including such popular technologies as WiFi®, Bluetooth®, Long-Term Evolution (LTE), and ZigBee®. Despite the common belief that coexistence of wireless technologies leads to harmful interference, it in fact offers new opportunities for those technologies to collaborate.

The traditional way of communicating among heterogeneous devices is to deploy multi-radio gateways, which suffers from several drawbacks including additional hardware cost, complicated network structure, and increased traffic overhead due to traffic flowing into and out from the gateway. To address these issues, latest literature introduces Cross-technology communication (CTC) techniques that achieve direct communication among heterogeneous wireless devices with incompatible physical (PHY) layers, using legacy devices. Such techniques commonly use packet-level modulations, where the combinations of timing and durations of packets convey the data.

SUMMARY

In one example, a method is described comprising determining, by a first computing device configured to operate in accordance with a first wireless protocol, a symbol to be sent to a second computing device, wherein the second computing device is configured to operate in accordance with a second wireless protocol different than the first wireless protocol, and wherein the second computing device is not configured to operate in accordance with the first wireless protocol, for each bit of a plurality of bits included in a payload of a data packet that is associated with the symbol, setting, by the first computing device, a value of the respective bit such that the symbol, when the data packet is translated into at least one signal using the first wireless protocol, is readable using the second wireless protocol, generating, by the first computing device and based at least in part on the data packet, the at least one signal using the first wireless protocol, and outputting, by the first computing device and to the second computing device via the first wireless protocol, the at least one signal.

In another example, a method is described comprising receiving, by a first computing device configured to operate in accordance with a first wireless protocol, at least one signal including a data packet sent from a second computing device configured to operate in accordance with a second wireless protocol, wherein the first wireless protocol is different than the second wireless protocol, and wherein the first computing device is not configured to operate in accordance with the second wireless protocol, and demodulating, by the first computing device, a payload of the data packet, wherein the payload of the data packet comprises at least a header defined by the first wireless protocol and an indication of a symbol that is associated with the data packet.

In another example, a system is described comprising a first computing device configured to operate in accordance with a first wireless protocol and a second computing device configured to operate in accordance with a second wireless protocol different than the first wireless protocol, wherein the second computing device is not configured to operate in accordance with the first wireless protocol, wherein the first computing device is configured to determine a symbol to be sent to the second computing device, for each bit of a plurality of bits included in a payload of a data packet that is associated with the symbol, set a value of the respective bit such that the symbol, when the data packet is translated into at least one signal using the first wireless protocol, is readable using the second wireless protocol, generate, based at least in part on the data packet, the at least one signal using the first wireless protocol, and output, to the second computing device via the first wireless protocol, the at least one signal, and wherein the second computing device is configured to receive the at least one signal sent from the first computing device and demodulate the payload of the data packet, wherein the payload of the data packet comprises at least a header defined by the second wireless protocol and an indication of the symbol that is associated with the data packet.

In another example, a computing device is described comprising a wireless radio configured to send signals via a first wireless protocol, at least one processor, and a storage component configured to store instructions executable by the at least one processor to determine a symbol to be sent to a second computing device, wherein the second computing device is configured to operate in accordance with a second wireless protocol different than the first wireless protocol, and wherein the second computing device is not configured to operate in accordance with the first wireless protocol, for each bit of a plurality of bits included in a payload of a data packet that is associated with the symbol, set a value of the respective bit such that the symbol, when the data packet is translated into at least one signal using the first wireless protocol, is readable using the second wireless protocol, generate, based at least in part on the data packet, the at least one signal using the first wireless protocol, and output, to the second computing device via the first wireless protocol, the at least one signal.

In another example, a computing device is described comprising a wireless radio configured to receive signals via a first wireless protocol, at least one processor, and a storage component configured to store instructions executable by the at least one processor to receive at least one signal including a data packet sent from a second computing device configured to operate in accordance with a second wireless protocol, wherein the first wireless protocol is different than the second wireless protocol, and wherein the first computing device is not configured to operate in accordance with the second wireless protocol, and demodulate a payload of the data packet, wherein the payload of the data packet comprises at least a header defined by the first wireless protocol and an indication of a symbol that is associated with the data packet.

In another example, a non-transitory computer-readable storage medium is described having stored thereon instructions that, when executed, cause one or more processors of a first computing device configured to send signals via a first wireless protocol to determine a symbol to be sent to a second computing device, wherein the second computing device is configured to operate in accordance with a second wireless protocol different than the first wireless protocol, and wherein the second computing device is not configured to operate in accordance with the first wireless protocol, for each bit of a plurality of bits included in a payload of a data packet that is associated with the symbol, set a value of the respective bit such that the symbol, when the data packet is translated into at least one signal using the first wireless protocol, is readable using the second wireless protocol, generate, based at least in part on the data packet, the at least one signal using the first wireless protocol, and output, to the second computing device via the first wireless protocol, the at least one signal.

In another example, a non-transitory computer-readable storage medium is described having stored thereon instructions that, when executed, cause one or more processors of a first computing device configured to receive signals via a first wireless protocol to receive at least one signal including a data packet sent from a second computing device configured to operate in accordance with a second wireless protocol, wherein the first wireless protocol is different than the second wireless protocol, and wherein the first computing device is not configured to operate in accordance with the second wireless protocol, and demodulate a payload of the data packet, wherein the payload of the data packet comprises at least a header defined by the first wireless protocol and an indication of a symbol that is associated with the data packet.

In another example, an apparatus is described comprising means for determining, in accordance with a first wireless protocol, a symbol to be sent to a second computing device, wherein the second computing device is configured to operate in accordance with a second wireless protocol different than the first wireless protocol, and wherein the second computing device is not configured to operate in accordance with the first wireless protocol, for each bit of a plurality of bits included in a payload of a data packet that is associated with the symbol, means for setting a value of the respective bit such that the symbol, when the data packet is translated into at least one signal using the first wireless protocol, is readable using the second wireless protocol, means for generating, based at least in part on the data packet, the at least one signal using the first wireless protocol, and means for outputting, to the second computing device via the first wireless protocol, the at least one signal.

In another example, an apparatus is described comprising means for receiving, in accordance with a first wireless protocol, at least one signal including a data packet sent from a second computing device configured to operate in accordance with a second wireless protocol, wherein the first wireless protocol is different than the second wireless protocol, and wherein the first computing device is not configured to operate in accordance with the second wireless protocol, and means for demodulating, by the first computing device, a payload of the data packet, wherein the payload of the data packet comprises at least a header defined by the first wireless protocol and an indication of a symbol that is associated with the data packet.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8A is an emulated time-domain signal. FIG. 8B is a phase shift of the emulated signal.

FIG. 16 is a conceptual diagram illustrating reliable cross-technology communication (CTC) with link coding in accordance with the techniques of the current disclosure.

FIG. 17 is a conceptual diagram illustrating phase shifts of emulated signals in accordance with the techniques of the current disclosure.

FIG. 24 is a conceptual diagram illustrating the impact of inconsistent ZigBee® phase shifts in accordance with the techniques of the current disclosure.

FIG. 25 is a conceptual diagram illustrating intra symbol Hamming distance between emulated and ideal ZigBee® symbols in accordance with the techniques of the current disclosure.

FIGS. 39A and 39B are conceptual diagrams illustrating example emulated signals in time domains and phase shifts/chips, respectively, in accordance with the techniques of the current disclosure.

FIG. 40 is a conceptual diagram illustrating an example subcarrier mapping process in accordance with the techniques of the current disclosure.

FIGS. 41A and 41B are conceptual diagrams illustrating example time sequences in accordance with the techniques of the current disclosure.

FIG. 42 is a conceptual diagram illustrating an example Physical Uplink Shared Channel (PUSCH) subframe structure in accordance with the techniques of the current disclosure.

FIG. 43 is a conceptual diagram illustrating an example solution to cyclic prefix (CP) constraints in accordance with the techniques of the current disclosure.

DETAILED DESCRIPTION

Figure 1:
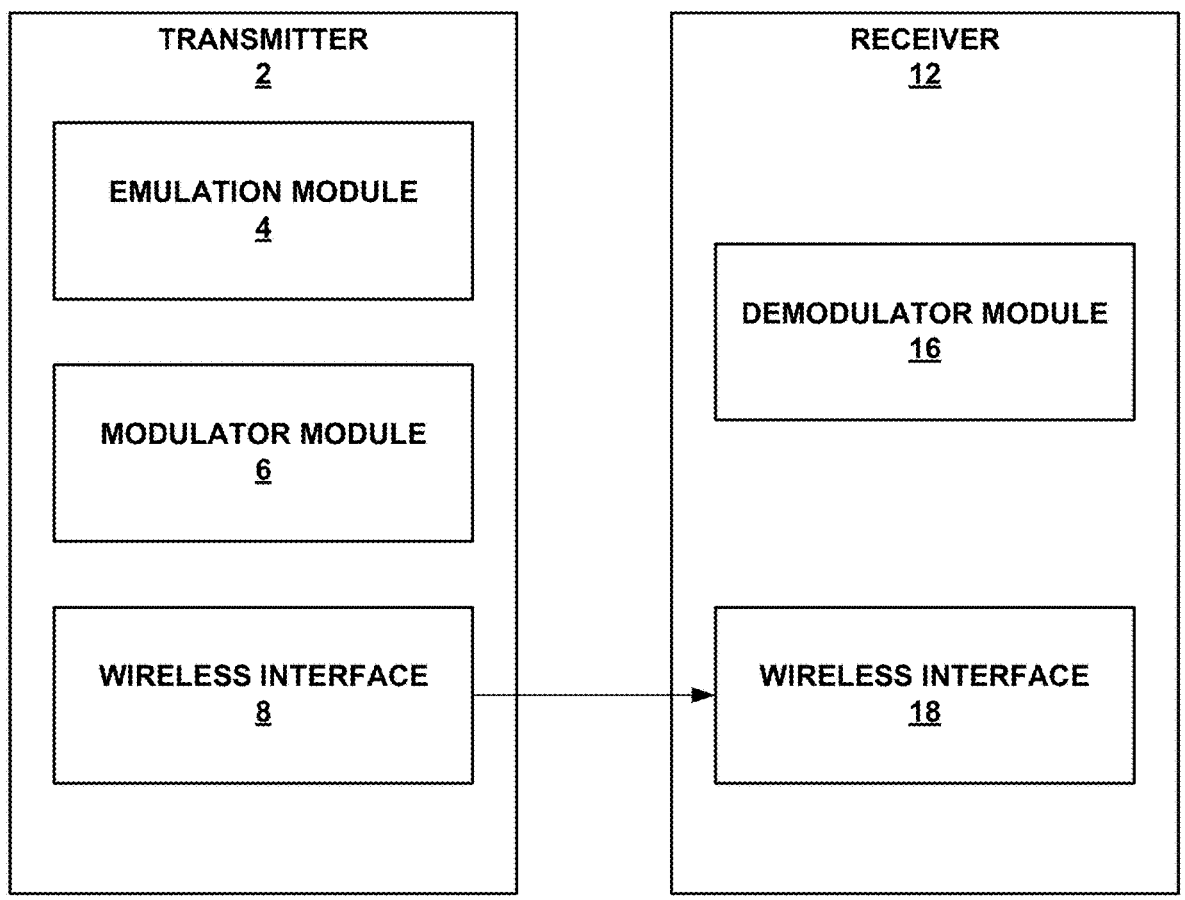
FIG. 1 is a block diagram of a transmitter device and a receiver device that may be configured to perform one or more techniques in accordance with the current disclosure.

In general, a system is described that includes two computing devices, a first which is configured to operate using a first wireless protocol, such as WiFi®, Bluetooth®, or Long-Term Evolution (LTE), and a second which is configured to operate using a second wireless protocol, such as ZigBee®, Bluetooth®, or WiFi®, but that is different than the first wireless protocol. The second computing device is not configured to operate in accordance with the first wireless protocol. The first computing device may determine a symbol to be sent to the second computing device. For each bit included in a payload of a data packet, the first computing device may set a value of the respective bit such that the symbol, when the data packet is translated into at least one signal using the first wireless protocol, is readable using the second wireless protocol. In this way, the first computing device may emulate a signal for the second wireless protocol by configuring the payload of the data packet to resemble a complete data packet for the second wireless protocol. The first computing device generates the signal using the first wireless protocol using one or more modulation or emulation techniques, as described herein, and outputs, via the first wireless protocol, the at least one signal. The second computing device may receive the at least one signal that was output according to the first wireless protocol and demodulate the payload according to the second wireless protocol, enabling the two devices to seamlessly communicate across wireless protocols.

Recent research shows that cross-technology communication (CTC), defined as direct communication (e.g., message/data exchange) among heterogeneous wireless devices, can bring about many benefits. For example, ZiFi® can significantly reduce the standby energy of WiFi® devices when a low-power ZigBee® radio is used to wake up the WiFi® network interface controller (NIC) whenever it detects the existence of WiFi® access points (Aps), and particular techniques can reduce this by 58% more if the open/private setting of a WiFi® AP is conveyed through CTC. Furthermore, CTC will provide more efficient channel coordination by exchanging global request to send/clear to send (RTS/CTS) and time division multiple access (TDMA) messages explicitly among coexisting heterogeneous devices, in place of implicit clear channel assessment (CCA).

However, the effectiveness of existing CTCs, which rely on packet-level modulation, is limited due to their low throughput (e.g., tens of bps). In one example, the techniques described herein opens a promising direction for high throughput CTC via physical-level emulation. The techniques described herein uses a high-speed wireless radio (e.g., WiFi® OFDM) to emulate the desired signals of a low-speed radio (e.g., ZigBee®). These unique emulation techniques manipulate, as one example, only the payload of WIFI® packets, requiring neither hardware nor firmware changes in commodity technologies—a feature allowing zero-cost fast deployment on existing WiFi® infrastructure. The techniques described herein may be implemented with commodity device, such as, for example, the Atheros AR2425WiFi® card, the MicaZ CC2420, and the USRP-N210 platform (for PHY layer evaluation). The techniques described herein may achieve a more than 99% reliable parallel CTC between WiFi® and ZigBee® with 126 Kbps in noisy environments, a throughput about 16,000× faster than current state-of-the-art CTCs.

Certain techniques described herein introduce a new direction for high throughput CTC, a physical-level emulation technique for WiFi® Emulated ZigBee®. Certain techniques described herein choose the payload of a WiFi® frame in such a way as a portion of this WiFi® frame is recognized by commodity ZigBee® devices transparently as a legitimate ZigBee® frame. Since the techniques described herein modify neither the firmware nor hardware of the WiFi® transmitter, this WiFi® frame can also be legitimately received by WiFi® receivers.

To support CTC, a WiFi® transmitter is enabled to emulate the ZigBee® time-domain waveform closely enough so that it can pass ZigBee® preamble detection and allow successful OQPSK demodulation. With such signal emulation, certain techniques described herein conceptually can achieve a 250 Kbps data rate from WiFi® to ZigBee®, the ceiling speed of standard ZigBee® communications. In practice, after accommodating emulation errors, a WiFi® transmitter configured to perform the techniques described herein may achieve a 99.9% symbol reception ratio at 63 Kbps data rate, which is more than 8,000 times faster than the reliable free-channel rate (7.5 bps@99%) reported by other techniques. Moreover, since WiFi® occupies a much wider bandwidth (20 MHz) than ZigBee® (2 MHz), the techniques described herein can successfully emulate two ZigBee® frames under different frequencies within a single WiFi® frame, resulting in a 16,000× throughput and a higher spectrum efficiency.

In one example, this application describes a high-throughput CTC from WiFi® to ZigBee® specifically. However, the features of the techniques described herein provide and the challenges that the techniques described herein address in this emulation-based design are indeed generic and applicable to a whole set of future physical-layer CTCs. Specifically, example contributions of the techniques described herein are as follows:

The techniques described herein include a CTC technique that emulates ZigBee® frames with the payload of WiFi® frames. Without modifying the firmware or hardware of both WiFi® and ZigBee® devices, the techniques described herein include a trans-parent design that can be easily deployed in existing WiFi® infrastructure with broad applicability.

The techniques described herein address a few unique challenges, which include (i) optimized ZigBee® signal emulation using the WiFi® OFDM modulation, (ii) reverse WiFi® channel coding mapping, (iii) pilot/null subcarrier avoidance, (iv) parallel CTC, and (v) link-level reliability. These techniques provide general guidance for future physical-level CTC designs.

The techniques described herein have been implemented and tested on commodity devices (Atheros AR2425 WiFi® NIC and MicaZ CC2420) and the USRP-N210 platform (for PHY-layer evaluation). Extensive evaluation demonstrates that the techniques described herein can achieve a fast, robust, and parallel CTC performance under a full range of wireless configurations, including stationary, mobile, long-distance, and duty-cycled settings. In all these settings, the frame reception ratio (FRR) reaches above 99% with six retransmissions, and throughput is orders of magnitude larger than existing CTC solutions.

In another example of the techniques described herein, this application describes techniques that may pave the way to practical CTC via physical-layer emulation. By smartly selecting the payload bits in a Bluetooth® packet, certain techniques of this disclosure effectively encapsulates a ZigBee® packet within a Bluetooth® packet payload. This is fully compatible with legacy ZigBee® devices while reaching the ZigBee® bitrate cap of 250 kbps. In other words, the techniques of this disclosure do not require any hardware or firmware change to either Bluetooth® transmitter or ZigBee® receiver, offering full compatibility (e.g., implementable as an application) to existing billions of commodity IoT devices, smartphones, PCs, and peripherals.

Despite the effectiveness of past CTC technologies, the bit rates are inherently limited as they adopt coarse-grained 'packets' as the basis for modulation (analogous to 'pulse' in typical digital communication). For instance, the bit rate of Bluetooth® to ZigBee® communication in the state of the art is limited to 18 bps. This not only constraints the usage, but also indicates spectrum inefficiency compared to 250 kbps and 1 Mbps if used for legacy ZigBee® and Bluetooth®.

The emulated ZigBee® packet transmitted from Bluetooth® is, in fact, indistinguishable by the ZigBee® receivers. This is surprising, especially when the bandwidth of Bluetooth® (1 MHz) is only half of that of ZigBee® (2 MHz). The design of the techniques of this disclosure stems from two key technical insights: (i) similarity of (de)modulation techniques of Bluetooth® and ZigBee® and (ii) error tolerance of ZigBee® demodulation (OQPSK/DSSS). Specifically, both technologies use the phase differences between samples, referred to as phase shifts, to indicate symbols, which makes emulation possible. Although the ZigBee® signal cannot be perfectly emulated due to a narrower bandwidth of Bluetooth®, the techniques of this disclosure are optimally designed such that the inevitable error is minimized and kept under the tolerance of (e.g., the error is successfully corrected by) ZigBee®'s OQPSK/DSSS demodulator. The techniques of this disclosure effortlessly run on commodity Bluetooth® devices by simply putting specific bit patterns in the Bluetooth® packet payload, and achieve 250 kpbs at 90% frame reception ratio (FRR), 10,000 times faster than the state-of-the-art. Also, certain techniques of this disclosure effectively utilize the frequency hopping feature of Bluetooth® to support concurrent communication across devices operating on different channels. Lastly, certain techniques of this disclosure offer reliable communication under dynamic wireless channel conditions.

The techniques of this disclosure include the first CTC technique that emulates a legitimate ZigBee® frame within the payload of a legitimate Bluetooth® packet. The design does not require any modification to the hardware or the firmware, for either the transmitter (Bluetooth®) or the receiver (ZigBee®), enabling full compatibility to billions of existing commodity devices.

Certain techniques described herein address several unique challenges of signal emulation, including (i) optimized ZigBee® phase shifts emulation using Bluetooth® signal, (ii) supporting concurrent communication and low duty cycle operation under frequency hopping of Bluetooth®, and (iii) link layer reliability under dynamic channel conditions. These solutions offer general insights for other signal emulation between heterogeneous devices.

The design and implementation of certain techniques of this disclosure on both the USRP platform and commodity devices. The extensive experiments demonstrate that the techniques of this disclosure establish a high throughput and reliable communication under various environments and settings. Compared to a 18 bps rate achieved by the state-of-the-art CTC from Bluetooth® to ZigBee®, the techniques of this disclosure have a reliable throughput of 225 kbps indicates performance gain of more than 10,000 times.

In using the techniques described herein, neither the LTE smartphones nor the ZigBee®/BLE devices require hardware and firmware modification, indicating this technology can be deployed rapidly in existing network infrastructure. The benefit of such a design lies in leveraging the full coverage capability of LTE networks (Wide Area Networks (WAN)) to control and configure Personal Area Network (PAN) devices (e.g., ZigBee® and BLE). This bridging between WAN and PAN will enable numerous new applications. For example, a device implementing the techniques described herein can directly adjust the lighting condition of a city district equipped with ZigBee®-enabled smart bulbs.

Unlike WiFi® and ZigBee®, LTE is a more complicated wireless standard aiming at a high configurability, flexibility, and efficiency. Such complexity introduces constraints in multiple dimensions, including the protocol constraints (e.g., header specifics), coding constraints (e.g., CRC, Turbo encoding), modulation constraints (e.g., SC-FDMA), duration constraints (e.g., DMRS), and PHY constraints (e.g., Cyclic Prefixing), etc. As such, penetrating each constrained layer involves a series of highly challenging tasks, such as SC-FDMA time-domain emulation, subcarrier mapping compensation, and 7-stage reverse channel coding with constrained input.

In yet another example of the techniques of this disclosure, LTE devices (e.g., smartphones) are enabled to transmit a data frame demodulatable by ZigBee® and BLE devices. These techniques are compliant with both LTE and ZigBee®/BLE protocols, generating cross-technology wireless signals purely based on the IP payload. To achieve this, the techniques described herein penetrate the constrained LTE stack from application layers and introduce various processes that include time-domain QAM emulation, subcarrier mapping compensation, and 7-stage reverse channel coding. These techniques can achieve a robust (>99% accuracy), long distance (>400 m) CTC performance under a full range of wireless configurations including indoor/outdoor, mobility, duty-cycle settings.

The techniques described herein may leverage both WANs and PANs, enabling the full coverage capability of the LTE devices and energy-efficiency and low-cost of the ZigBee®/BLE devices. Such a new wireless architecture may support emerging applications such as lighting, irrigation, and access control within smart and connected communities. These techniques achieve this benefit through time-domain emulation with subcarrier mapping constraints, and reverse turbo coding with CRC pollution avoidance. These innovations provide generic guidance for penetrating the constrained layers of other wireless systems.

Further, the techniques described herein provides a transparent design that permeates the complicated LTE stack from application layers and allows user applications to control the LTE wireless signal purely based on the IP payload. The method is generic as these techniques may support both ZigBee® and BLE receivers.

To the extent that particular values are listed for frequencies, channels, or any other setting or measurement, it should be realized that these are merely examples given for the purpose of illustration. Other values may be utilized with the techniques described herein, and the general techniques described herein may be applicable for such other values.

FIG. 1 is a block diagram of a transmitter device 2 and a receiver device 12 that may be configured to perform one or more techniques in accordance with the current disclosure. In the example of FIG. 1, transmitter device 2 and receiver device 12 may be a router, a wireless access point, a mobile device, or any computing device that can be configured to output beacons according to a first wireless protocol. Transmitter device 2 may include any number of different portable electronic computing devices, such as a wearable computing device (e.g., a computerized watch, computerized headphones, a computerized headset, computerized glasses, etc.), a smart phone, a personal digital assistant (PDA), a laptop computer, a portable gaming device, a portable media player, an e-book reader, etc. Transmitter device 2 may include various input and output components, including, e.g. one or more processors, memory, telemetry modules, cellular network antennas, a display, one or more UI elements, sensors, and a power source like a rechargeable battery. Modules 4 and 6 of transmitter device 2 and module 16 of receiver device 12 may perform operations described herein using software, hardware, firmware, or a mixture of hardware, software, and firmware residing in and executing on transmitter device 2 and/or receiver device 12.

In the example of FIG. 1, wireless interface 8 may be operable to communicate with external devices via one or more wired and/or wireless networks by transmitting and/or receiving network signals on the one or more networks. Examples of wireless interface 8 may include a network interface card (e.g. such as an Ethernet card), an optical transceiver, a radio frequency transceiver, a GPS receiver, or any other type of device that can send and/or receive information. Other examples of wireless interface 8 may include Near-Field Communications (NFC) units, Bluetooth® radios, short wave radios, cellular data radios, wireless network radios, as well as universal serial bus (USB) controllers. Wireless interface 8 may be configured to operate in accordance with a first wireless protocol, which may include one or more of the WiFi® protocol, the Bluetooth® protocol, or the LTE protocol. Wireless interface 18 of receiver 12 may be similar to wireless interface 8 of transmitter 2, except for wireless interface 18 may be configured to operate in accordance with a second wireless protocol, which may include one or more of the WiFi® protocol, the Bluetooth® protocol, or the ZigBee® protocol, and wireless interface 18 may be configured to operate according to a different protocol than wireless interface 8.

In accordance with the techniques of this disclosure, emulation module 4 may determine a symbol to be sent to receiver 12. As described above, however, transmitter 2 and receiver 12 may be configured to operate in accordance with two different wireless protocols. Receiver 12 may not be configured to operate in accordance with the first wireless protocol. In some examples, the symbol may be one or more of an informative symbol or a command to perform an action.

For each bit of a plurality of bits included in a payload of a data packet that is associated with the symbol, emulation module 4 may set a value of the respective bit such that the symbol, when the data packet is translated into at least one signal using the first wireless protocol, is readable using the second wireless protocol.

In some examples, in setting the bits of the payload, emulation module 4 may structure the payload of the data packet such that it includes header bits in a format consistent with the second wireless protocol. In some examples, to increase accuracy, emulation module 4 may begin the payload of the data packet with two instances of the same header repeated, increasing the likelihood that receiver 12 acknowledges the data packet. As such, emulation module 4 may, for each bit of a second plurality of bits that form a header included in the payload of the data packet, set a value of the respective bit in the header such that the header includes a first preamble of bits followed by a second preamble of bits. The first preamble of bits may be identical to the second preamble of bits.

The data packet, as it is formed in accordance with the first wireless protocol, may include headers, preambles, and trailers formed in accordance with the first wireless protocol, and these portions of the data packet may not be readable by the second wireless protocol. As such, emulation module 4 may, for each bit of a second plurality of bits outside of the payload of the data packet, set a value of the respective bit such that the second plurality of bits define a header of the data packet, a preamble of the data packet, and a trailer of the data packet in accordance with the first wireless protocol.

Modulator module 6 may generate, based at least in part on the data packet, the at least one signal using the first wireless protocol. In generating the at least one signal, modulator module 6 may modulate the at least one signal according to one or more modulation procedures, which are discussed in greater detail below. Modulator module 6 may output, to receiver 12 and via the first wireless protocol, the at least one signal.

Receiver 12 may be configured to operate in accordance with the second wireless protocol, e.g., ZigBee®, WiFi®, or Bluetooth®. In accordance with the techniques of this disclosure, demodulator module 16 of receiver 12 may receive at least one signal including a data packet sent from a transmitter 2, which is configured to operate in accordance with the first wireless protocol, e.g., WiFi®, Bluetooth®, or LTE. Receiver 12 may not be configured to operate in accordance with the first wireless protocol.

Demodulator module 16 of receiver 12 may demodulate a payload of the data packet. The payload of the data packet may include at least a header defined by the second wireless protocol and an indication of a symbol that is associated with the data packet. The payload may include a sequence of bits readable using the second wireless protocol.

Figure 2:
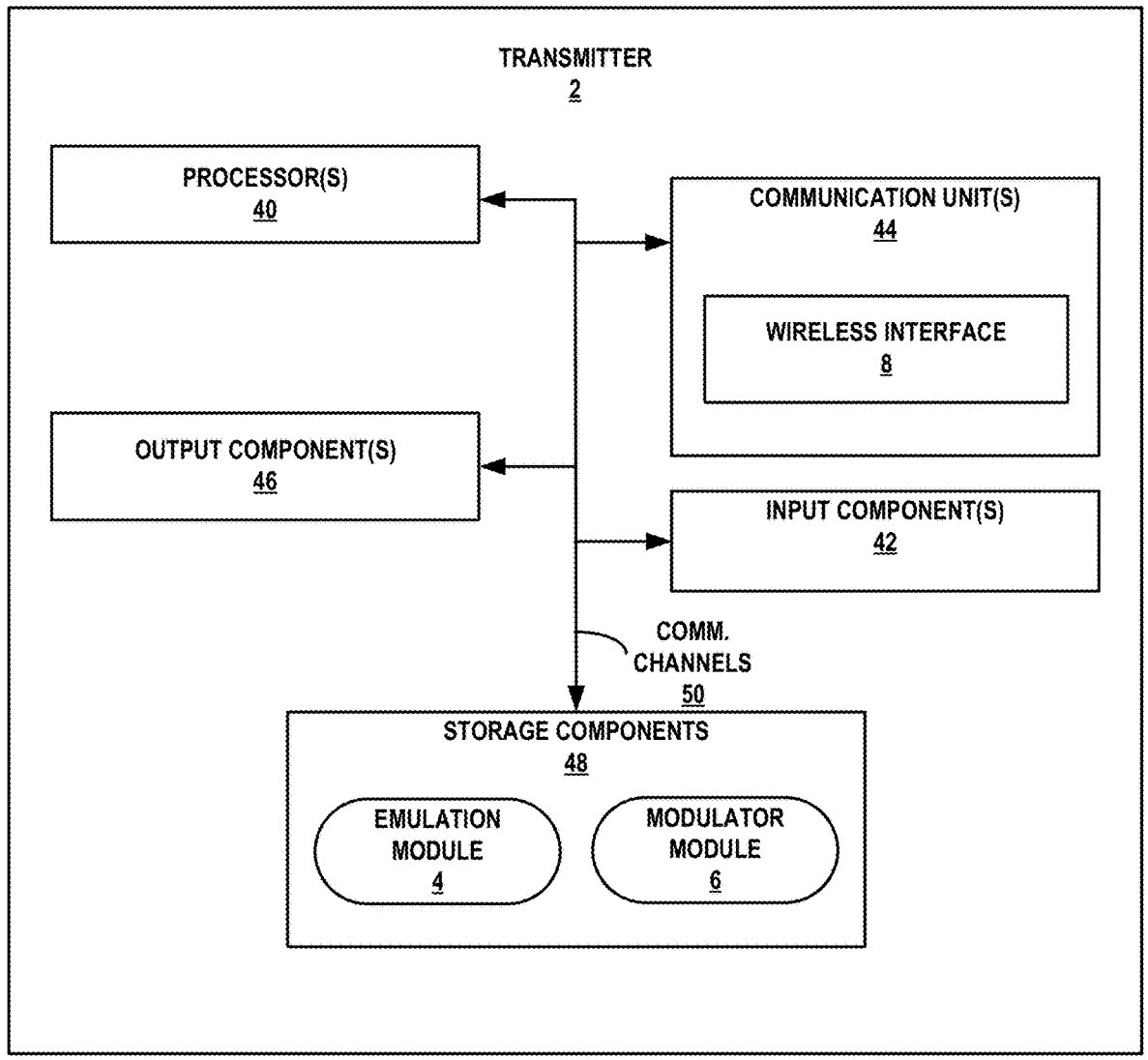
FIG. 2 is a block diagram of a more detailed view of a transmitter device that may be configured to perform one or more techniques in accordance with the current disclosure.

FIG. 2 is a block diagram of a more detailed view of transmitter 2 that may be configured to perform one or more techniques in accordance with the current disclosure. Transmitter 2 of FIG. 2 is described below as an example of transmitter 2 of FIG. 1. FIG. 2 illustrates only one particular example of transmitter 2, and many other examples of transmitter 2 may be used in other instances and may include a subset of the components included in example transmitter 2 or may include additional components not shown in FIG. 2.

As shown in the example of FIG. 2, transmitter 2 includes one or more processors 40, one or more input components 42, one or more communication units 44 that include wireless interface 8, one or more output components 46, and one or more storage components 48. Storage components 48 of transmitter 2 include emulation module 4 and modulation module 6. Communication channels 50 may interconnect each of the components 40, 44, 42, 46, and 48 for inter-component communications (physically, communicatively, and/or operatively). In some examples, communication channels 50 may include a system bus, a network connection, an inter-process communication data structure, or any other method for communicating data.

One or more communication units 44 of transmitter 2 may communicate with external devices via one or more wired and/or wireless networks by transmitting and/or receiving network signals on the one or more networks. Examples of communication units 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers. Communication units 44, which may include wireless interface 8, may be configured to operate in accordance with a first wireless protocol, such as WiFi®, Bluetooth®, or LTE.

One or more input components 42 of transmitter 2 may receive input. Examples of input are tactile, audio, and video input. Input components 42 of transmitter 2, in one example, includes a presence-sensitive input device (e.g., a touch sensitive screen, a PSD), mouse, keyboard, voice responsive system, video camera, microphone or any other type of device for detecting input from a human or machine. In some examples, input components 42 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 46 of transmitter 2 may generate output. Examples of output are tactile, audio, and video output. Output components 46 of transmitter 2, in one example, includes a PSD, sound card, video graphics adapter card, speaker, cathode ray tube (CRT) monitor, liquid crystal display (LCD), or any other type of device for generating output to a human or machine.

One or more processors 40 may implement functionality and/or execute instructions associated with transmitter 2. Examples of processors 40 include application processors, display controllers, auxiliary processors, one or more sensor hubs, and any other hardware configure to function as a processor, a processing unit, or a processing device. Modules 4 and 6 may be operable by processors 40 to perform various actions, operations, or functions of transmitter 2. For example, processors 40 of transmitter 2 may retrieve and execute instructions stored by storage components 48 that cause processors 40 to perform the operations of modules 4 and 6. The instructions, when executed by processors 40, may cause transmitter 2 to store information within storage components 48.

One or more storage components 48 within transmitter 2 may store information for processing during operation of transmitter 2 (e.g., transmitter 2 may store data accessed by modules 4 and 6 during execution at transmitter 2). In some examples, storage component 48 is a temporary memory, meaning that a primary purpose of storage component 48 is not long-term storage. Storage components 48 on transmitter 2 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 48, in some examples, also include one or more computer-readable storage media. Storage components 48 in some examples include one or more non-transitory computer-readable storage mediums. Storage components 48 may be configured to store larger amounts of information than typically stored by volatile memory. Storage components 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 48 may store program instructions and/or information (e.g., data) associated with modules 4 and 6. Storage components 48 may include a memory configured to store data or other information associated with modules 4 and 6.

In accordance with the techniques of this disclosure, emulation module 4 may determine a symbol to be sent to receiver 12. As described above, however, transmitter 2 and receiver 12 may be configured to operate in accordance with two different wireless protocols. Receiver 12 may not be configured to operate in accordance with the first wireless protocol. In some examples, the symbol may be one or more of an informative symbol or a command to perform an action.

In some examples, in determining the symbol, emulation module 4 may determine an ideal symbol to be emulated by transmitter 2. Emulation module 4 may then determine, for each of two emulatable symbols, a respective minimum inter-symbol distance, where each of the two emulatable symbols has a same intra-symbol distance. Emulation module 4 may then select a first emulatable symbol of the two emulatable symbols that has a larger minimum inter-symbol distance.

In some instances, the determined symbol may be an initial symbol. In such examples, emulation module 4 may determine a desired symbol to send to receiver 12. Emulation module 4 may then determine the initial symbol such that an application of a data whitening process to the initial symbol results in the desired symbol. For each bit of the plurality of bits included in the payload of the data packet that is associated with the initial symbol, emulation module 4 may then set the value of the respective bit to be the initial symbol.

For each bit of a plurality of bits included in a payload of a data packet that is associated with the symbol, emulation module 4 may set a value of the respective bit such that the symbol, when the data packet is translated into at least one signal using the first wireless protocol, is readable using the second wireless protocol.

In some examples, in setting the bits of the payload, emulation module 4 may structure the payload of the data packet such that it includes header bits in a format consistent with the second wireless protocol. In some examples, to increase accuracy, emulation module 4 may begin the payload of the data packet with two instances of the same header repeated, increasing the likelihood that receiver 12 acknowledges the data packet. As such, emulation module 4 may, for each bit of a second plurality of bits that form a header included in the payload of the data packet, set a value of the respective bit in the header such that the header includes a first preamble of bits followed by a second preamble of bits. The first preamble of bits may be identical to the second preamble of bits.

In some instances, for each bit of a second plurality of bits outside of the payload of the data packet, emulation module 4 may set a value of the respective bit such that the second plurality of bits define a header of the data packet, a preamble of the data packet, and a trailer of the data packet in accordance with the first wireless protocol.

The data packet, as it is formed in accordance with the first wireless protocol, may include headers, preambles, and trailers formed in accordance with the first wireless protocol, and these portions of the data packet may not be readable by the second wireless protocol. As such, emulation module 4 may, for each bit of a second plurality of bits outside of the payload of the data packet, set a value of the respective bit such that the second plurality of bits define a header of the data packet, a preamble of the data packet, and a trailer of the data packet in accordance with the first wireless protocol.

In some instances, prior to generating the at least one signal using the first wireless protocol, emulation module 4 may exchange positive frequency components and negative frequency components of the at least one signal. Also, prior to outputting the at least one signal, emulation module 4 may interleave the symbol of the payload using binary Hamming Code.

Emulation module 4 may perform additional preparations of the data packet. For instance, emulation module 4 may interleave a set of bits in the data packet to form a first subset of bits and a second subset of bits. The first subset of bits has a size equal to the second subset of bits. Emulation module 4 may then reverse cod e each of the first subset of bits and the second subset of bits to produce a first reverse coded subset of bits and a second reverse coded subset of bits, respectively, with the first reverse coded subset of bits having a size greater than the second reverse coded subset of bits. In reverse coding the first subset of bits, emulation module 4 may perform a matrix multiplication operation to derive the first reverse coded subset of bits.

Modulator module 6 may generate, based at least in part on the data packet, the at least one signal using the first wireless protocol. In generating the at least one signal, modulator module 6 may modulate the at least one signal according to one or more modulation procedures, which are discussed in greater detail below. Modulator module 6 may output, to receiver 12 and via the first wireless protocol, the at least one signal.

In modulating the at least one signal, modulator module 6 may, in general, modulate the at least one signal such that one or more components of the at least one signal, sent via the first wireless protocol, match one or more components of at least one template signal defined by the second wireless protocol. These components may be frequency components or time-domain phase components.

More specifically, in modulating the at least one signal, modulator module 6 may perform one or more of the following modulation procedures: modulate the at least one signal using quadrature amplitude modulation emulation; modulate, using a filter, the at least one signal using Gaussian frequency shift keying modulation, where the filter comprises a Gaussian low pass filter; modulate the at least one signal using single-carrier frequency-division multiple access (SC-FCDMA) modulation; or emulate a sign of a shift in the phase of time-domain components by setting a value of a first bit of the data packet. In the instances where the modulation procedure includes modulating the at least one signal using SC-FDMA modulation, modulator module 6 may sample an ideal waveform at a valid sample rate to produce a sequence of ideal samples and quantize a respective value for each ideal sample in the sequence of ideal samples to a respective closest quadrature amplitude modulation (QAM) point of a plurality of QAM points.

In some examples, the symbol may be a first symbol, and emulation module 4 may further determine a second symbol, a third symbol, and a fourth symbol within the data packet to be sent to receiver 12. In some instances, the first symbol, the second symbol, the third symbol, and the fourth symbol, when combined, form a singular symbol in the second wireless protocol. In other instances, the first symbol, the second symbol, the third symbol, and the fourth symbol are each different symbols in both the first wireless protocol and the second wireless protocol. For each bit of the plurality of bits included in the payload of the data packet, emulation module 4 may set a value of the respective bit such that each of the first symbol, the second symbol, the third symbol, and the fourth symbol, when the data packet is translated into the at least one signal using the first wireless protocol, are readable using the second wireless protocol. Emulation module may then generate, based at least in part on the data packet, the at least one signal using the first wireless protocol, and flip a half-chip of a boundary of at least one symbol of the data packet. Modulator module 4 may then output, to receiver 12 via the first wireless protocol, the at least one signal.

In some instance, one or more components of the at least one signal include time-domain phase components. In such instances, the at least one signal may include at least one in-phase and quadrature (I/Q) signal. In generating the at least one I/Q signal using the first wireless protocol, modulator module 6 may determine a phase of the time-domain phase components of the at least one modulated signal and calculate, based on the phase of the time-domain phase components, the I/Q signal.

In outputting the at least one signal, modulator module 6 may set a central frequency for the at least one signal such that a data subcarrier of a frequency channel that includes the central frequency matches a frequency channel of the second wireless protocol.

In some instances, for each bit of a second plurality of bits that form a header included in the payload of the data packet, modulator module 6 may set a value of the respective bit in the header such that the header includes a first preamble of bits followed by a second preamble of bits, with the first preamble of bits being identical to the second preamble of bits.

In other examples, in outputting the at least one signal, modulator module 6 may attempt to output the at least one signal over a first channel via the first wireless protocol. Upon this attempt failing, modulator module 6 may then determine a packet accept ratio of the first channel and compare the packet accept ratio of the first channel to a threshold packet accept ratio. Responsive to determining that the packet accept ratio of the first channel is below the threshold packet accept ratio, modulator module 6 may hop frequencies to a second channel that is an overlap channel between the first wireless protocol and the second wireless protocol. The second channel may also be experiencing less bandwidth usage than the first channel. Modulator module 6 may then output, over the second channel via the first wireless protocol, the at least one signal.

In some instance, modulator module 6 may further output a second set of one or more signals identical to the at least one signal. In doing so, modulator module 6 may increase the chance that the transmission of the at least one signal between transmitter 2 and receiver 12 is successful.

Figure 3:
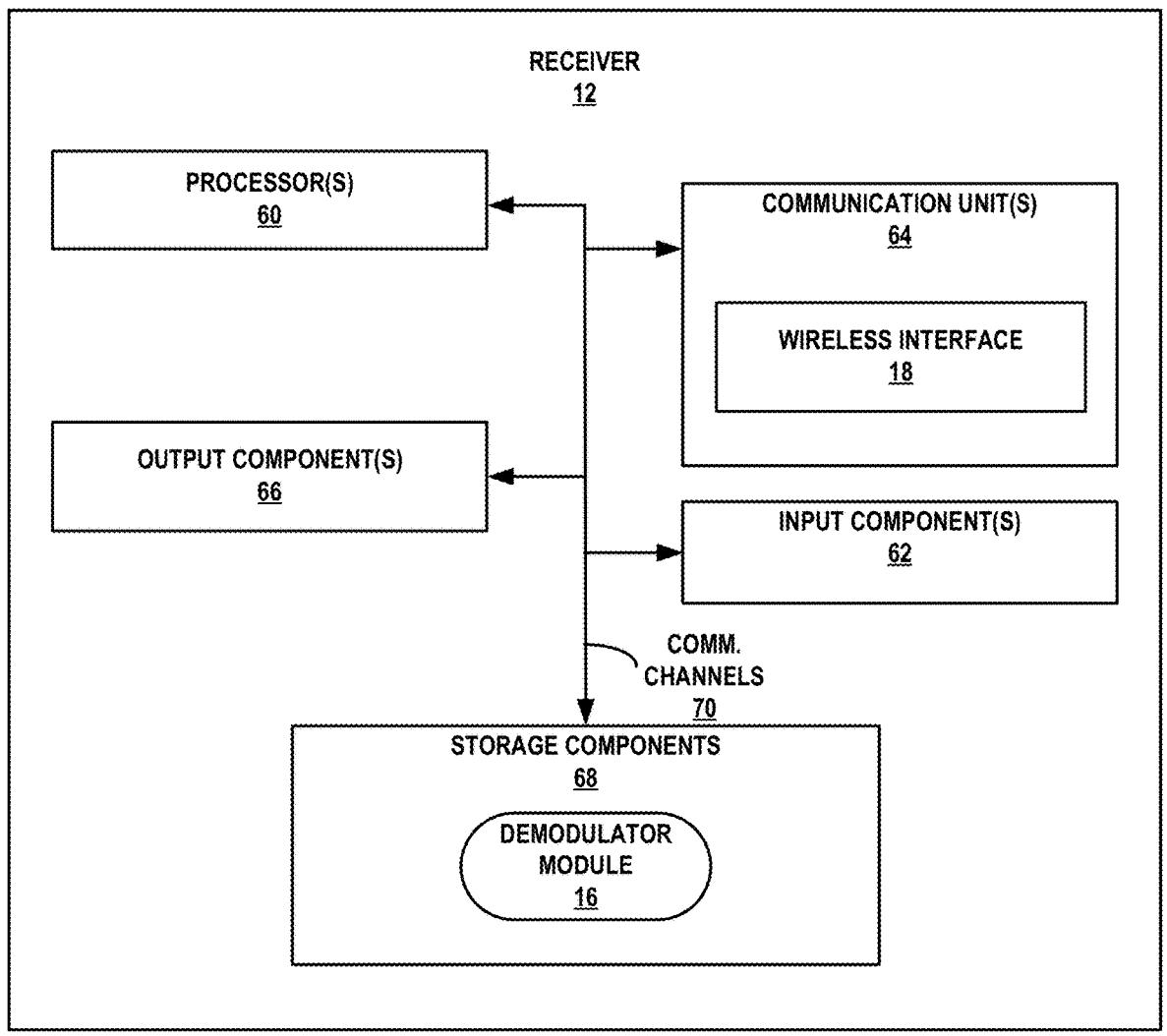
FIG. 3 is a block diagram of a more detailed view of a receiver device that may be configured to perform one or more techniques in accordance with the current disclosure.

FIG. 3 is a block diagram of a more detailed view of receiver 12 that may be configured to perform one or more techniques in accordance with the current disclosure. Receiver 12 of FIG. 2 is described below as an example of receiver 12 of FIG. 1. FIG. 3 illustrates only one particular example of receiver 12, and many other examples of receiver 12 may be used in other instances and may include a subset of the components included in example receiver 12 or may include additional components not shown in FIG. 3.

As shown in the example of FIG. 3, receiver 12 includes one or more processors 60, one or more input components 62, one or more communication units 64 that include wireless interface 8, one or more output components 66, and one or more storage components 68. Storage components 68 of receiver 12 include demodulation module 16. Communication channels 50 may interconnect each of the components 60, 64, 62, 66, and 68 for inter-component communications (physically, communicatively, and/or operatively). In some examples, communication channels 70 may include a system bus, a network connection, an inter-process communication data structure, or any other method for communicating data.

One or more communication units 64 of receiver 12 may communicate with external devices via one or more wired and/or wireless networks by transmitting and/or receiving network signals on the one or more networks. Examples of communication units 64 include a network interface card (e.g. such as an Ethernet card), an optical transceiver, a radio frequency transceiver, a GPS receiver, or any other type of device that can send and/or receive information. Other examples of communication units 64 may include short wave radios, cellular data radios, wireless network radios, as well as universal serial bus (USB) controllers. Communication units 64, which may include wireless interface 18, may be configured to operate in accordance with a wireless protocol, such as WiFi®, Bluetooth®, or ZigBee®.

One or more input components 62 of receiver 12 may receive input. Examples of input are tactile, audio, and video input. Input components 62 of receiver 12, in one example, includes a presence-sensitive input device (e.g., a touch sensitive screen, a PSD), mouse, keyboard, voice responsive system, video camera, microphone or any other type of device for detecting input from a human or machine. In some examples, input components 62 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 66 of receiver 12 may generate output. Examples of output are tactile, audio, and video output. Output components 66 of receiver 12, in one example, includes a PSD, sound card, video graphics adapter card, speaker, cathode ray tube (CRT) monitor, liquid crystal display (LCD), or any other type of device for generating output to a human or machine.

One or more processors 60 may implement functionality and/or execute instructions associated with receiver 12. Examples of processors 60 include application processors, display controllers, auxiliary processors, one or more sensor hubs, and any other hardware configure to function as a processor, a processing unit, or a processing device. Module 16 may be operable by processors 60 to perform various actions, operations, or functions of receiver 12. For example, processors 60 of receiver 12 may retrieve and execute instructions stored by storage components 68 that cause processors 60 to perform the operations of module 16. The instructions, when executed by processors 60, may cause receiver 12 to store information within storage components 68.

One or more storage components 68 within receiver 12 may store information for processing during operation of receiver 12 (e.g., receiver 12 may store data accessed by module 16 during execution at receiver 12). In some examples, storage component 68 is a temporary memory, meaning that a primary purpose of storage component 68 is not long-term storage. Storage components 68 on receiver 12 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 68, in some examples, also include one or more computer-readable storage media. Storage components 68 in some examples include one or more non-transitory computer-readable storage mediums. Storage components 68 may be configured to store larger amounts of information than typically stored by volatile memory. Storage components 68 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 68 may store program instructions and/or information (e.g., data) associated with modules 4 and 6. Storage components 68 may include a memory configured to store data or other information associated with module 16.

In accordance with the techniques of this disclosure, receiver 12 may be configured to operate in accordance with the second wireless protocol, e.g., ZigBee®, WiFi®, or Bluetooth®. In accordance with the techniques of this disclosure, demodulator module 16 of receiver 12 may receive at least one signal including a data packet sent from a transmitter 2, which is configured to operate in accordance with the first wireless protocol, e.g., WiFi®, Bluetooth®, or LTE. Receiver 12 may not be configured to operate in accordance with the first wireless protocol.

Demodulator module 16 of receiver 12 may demodulate a payload of the data packet. The payload of the data packet may include at least a header defined by the second wireless protocol and an indication of a symbol that is associated with the data packet. The payload may include a sequence of bits readable using the second wireless protocol.

In demodulating the payload of the data packet, demodulator module 16 may capture, using an analog-to-digital converter, the at least one signal sent using the first wireless protocol. Demodulator module 16 may then determine an in-phase sample and a quadrature sample for the at least one signal. Using the in-phase sample and the quadrature sample for the at least one signal, demodulator module 16 may map the symbol of the payload of the data packet to a chip sequence.

Spectrum efficiency calls for sharing within the unlicensed bands. Between 2014-2016, the FCC opened the spectrum in 600 MHz, 5 GHz, and 7 GHz, bringing in new ISM standards, including LTE-U and 802.11ah. Such coexisting environments necessitate explicit information exchange among heterogeneous wireless devices to support channel coordination and cross-technology collaboration. Information can be exchanged through either multi-radio gateways or cross-technology communication (CTC). The limitations of existing solutions and the benefits of the techniques described herein are summarized in Table 1.

TABLE 1

Comparison of the techniques of this disclosure and existing CTC solutions

|  | Cost | Spectrum Efficiency | Throughput | Multi-channel CTC |
|---|---|---|---|---|
| Gateway | Medium | Medium | High | Not Support |
| ESense | Low | Low | Low | Not Support |
| $B^2W^2$ | Low | Medium | Low | Support |
| Claimed Techniques | Low | High | High | Support |

Multi-radio gateways can serve as translators among heterogeneous wireless devices with incompatible physical layers. However, this solution is inherently limited in several aspects. First, gateways incur extra hardware costs and deployment complexity, in which the density and physical locations of the gateways noticeably impact network performance. Second, gateway-based approaches induce significant traffic overhead flowing in and out from the gateway, which further intensifies interference, especially in multi-hop scenarios. Third, gateways have to be deployed in advance in the situations where CTCs are required, making it difficult to support mobile and ad hoc scenarios.

The inherent limitation of the packet-level CTCs is their throughput. Usually, the duration of a wireless packet is in the range of milliseconds. Embedding CTC symbols with sparse packet-level information (i.e., the packet Tx timing or the packet received signal strength indicator (RSSI) duration in various prior techniques) limits the bandwidth. For example, in ZigBee® devices, the packet-level RSSI information is sampled at only 31.25 KHz, while the phase-shift is obtained at 4 MHz by the ZigBee® PHY for (de) modulation. In other words, the throughput of packet-level CTCs is inherently bounded by a low sampling rate (e.g., KHz) in contrast to hundreds of Kbps for native ZigBee® communication.

Another limitation of the packet-level CTCs is that they fail to utilize bandwidth fully. A single WiFi® transmission occupies 20-40 MHz channels, while ZigBee® receivers only obtain packet-level information within a 2 MHz-wide ZigBee® channel. It should be noted that this is an inherent limitation of packet-level CTCs because the packet-level information (e.g., packet Tx timing) perceived by ZigBee® at different channels is the same, making parallel symbol transmission infeasible at the packet level.

As summarized in Table 1 above, the techniques described herein may resolve the limitation of gateways by offering direct connectivity. For example, various techniques described herein enable a WiFi® AP to control all IoT devices equipped with low-power ZigBee® radios in a smart home without a gateway. Instead of depending on sparse packet-level information, various techniques described herein may achieve a throughput close to that of the ZigBee® standard by emulating time-domain ZigBee signals. Parallel CTCs become feasible by emulating multiple time-domain ZigBee® signals at different frequency bands, further boosting the total throughput.

Figure 4:
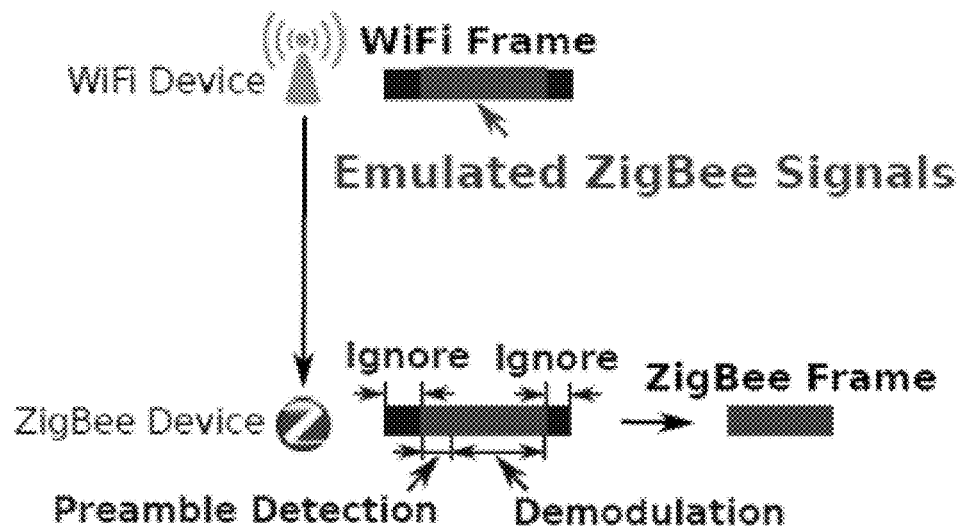
FIG. 4 is a conceptual diagram illustrating an example architecture of data packets in accordance with the techniques of the current disclosure.

FIG. 4 is a conceptual diagram illustrating an example architecture of data packets in accordance with the techniques of the current disclosure. FIG. 4 illustrates how the techniques described herein may work: a WiFi® device transmits a frame with a selected payload that can be recognized by a ZigBee® receiver as a legitimate ZigBee® frame. More specifically, the techniques described herein enable a device to construct the payload of a WiFi® frame elaborately so that the RF waveform of the payload resembles that of ZigBee® signals. When such a WiFi® frame is transmitted into the air through the front end of the WiFi® RF, the WiFi® header, preamble, and trailer are ignored by ZigBee® receivers as noise, while the payload will successfully pass the ZigBee® preamble detection and the emulated ZigBee® frame will be then demodulated at the ZigBee® receiver. It should be noted that techniques described herein may have a transparent design, in the sense that a ZigBee® receiver cannot differentiate whether the sender is a ZigBee® or a WiFi® device. Moreover, time-domain waveforms of multiple ZigBee® frames can be modulated into one WiFi® frame because of the wider band of WiFi® transmissions. Multiple ZigBee receivers working on different channels can detect and demodulate different emulated ZigBee® frames simultaneously and independently.

To explain the techniques described herein, the description herein first introduces how WiFi® transmitters and ZigBee® receivers work. Although the description is specific, the approach is generically applicable to future emulation-based CTCs.

Figure 5:
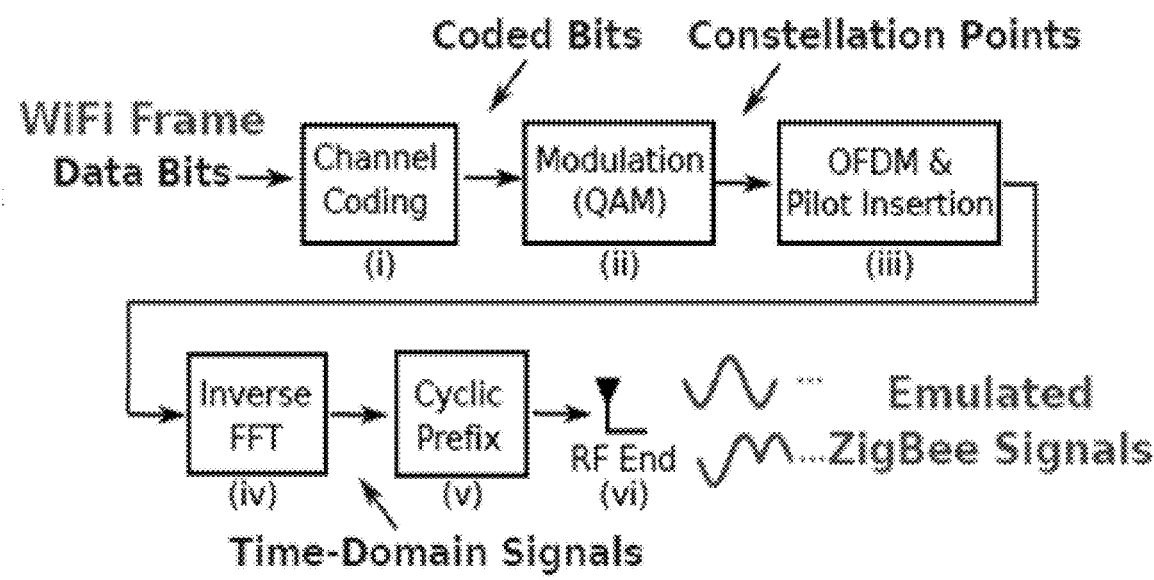
FIG. 5 is a conceptual diagram illustrating an example transmitter in accordance with the techniques of the current disclosure.

FIG. 5 shows how a WiFi® transmitter (802.11g/n) works, from step (i) to step (vi). (i) The channeling coding module encodes the data bits in a WiFi® frame into redundant coded bits for robustness. (ii) These coded bits are then mapped into a set of constellation points based on selected modulation schemes, typically Quadrature Amplitude Modulation (QAM). (iii) By using Orthogonal Frequency Division Multiplexing (OFDM), these constellation points are modulated into 48 data subcarriers, while additional pseudo-random pilot symbols are modulated into pilot sub-carriers for channel estimation at the WiFi® receivers. (iv) After that, Inverse Fast Fourier Transform (IFFT) combines all these subcarriers and turns them into a time-domain signal. (v) The WiFi® time-domain signal is then processed by the cyclic prefix module, which prefixes a WiFi® symbol with a repetition of the end. By cyclic prefixing, a guard 0.8 us interval is formed to eliminate inter-symbol interference. (vi) Finally, a whole WiFi® symbol with a 4 µs duration is generated at the WiFi® sender and is sent by the WiFi® RF radio.

The objective of the techniques described herein is to create time-domain waveforms that can be recognized by ZigBee® receivers. To emulate ZigBee® waveforms, the techniques described herein proceed with a reverse direction from step (vi) to step (i) as shown in FIG. 5. To transmit the desired time-domain ZigBee® RF signals at step (vi) from the commodity WiFi® radios, at step (iii) the techniques described herein may choose corresponding frequency components, which are mapped from the set of constellation points (complex numbers) selected at step (ii). These constellation points are controlled by the source bits of the WiFi® payload.

In other words, source bits in a selected WiFi® payload determine the QAM constellation points after the WiFi® modulator. When a specific combination of constellation points are fed into the IFFT, the desired time-domain signals are emulated and transmitted from the commodity WiFi® radios. With such signal emulation, the commodity ZigBee® radios can demodulate and decode the "frame" sent from the WiFi® to achieve CTC. It is noted that the techniques described herein may not change the WiFi® modulator, and therefore QAM-based emulation contains an intrinsic error because only a limited number of discrete QAM constellation points are available for emulation.

Figure 6:
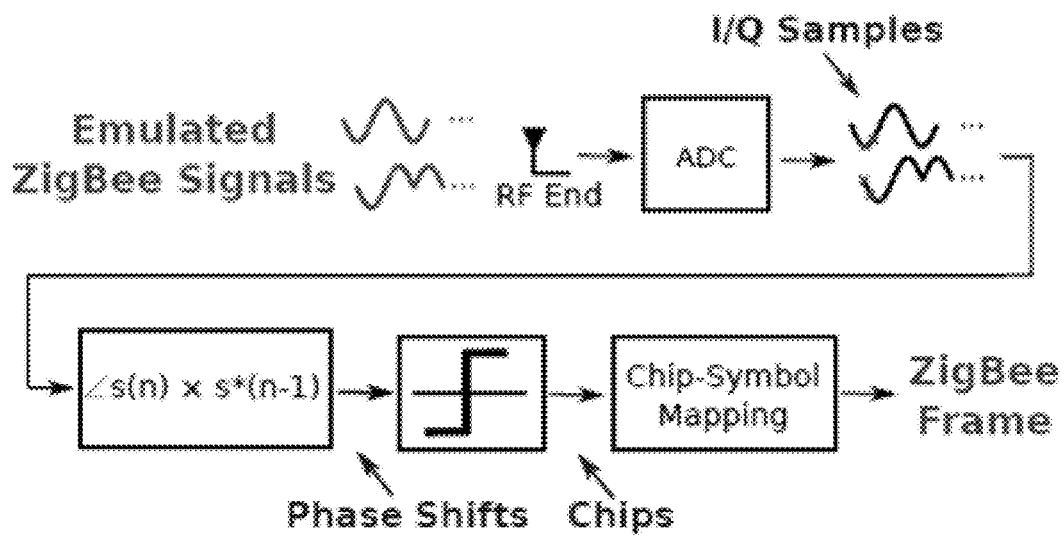
FIG. 6 is a conceptual diagram illustrating an example receiver in accordance with the techniques of the current disclosure.

FIG. 6 is a conceptual diagram illustrating an example receiver in accordance with the techniques of the current disclosure. The techniques described herein may send WiFi® frames to commodity ZigBee® devices. The physical layer of ZigBee® receivers is shown in FIG. 6. Because of sharing the same ISM wireless band (e.g., 2.4 GHz), the waveform emulated by WiFi® can be sampled by ZigBee® devices. To receive a frame, a ZigBee® RX Radio down-converts the received WiFi® passband waveforms to baseband and digitalizes them into in-phase and quadrature (I/Q) samples using an analog-to-digital converter (ADC).

The modulation of ZigBee® is Offset Quadrature Phase-Shift Keying (OQPSK), in which the phase shifts between the consecutive I/Q samples are used to demodulate the ZigBee® symbols. Specifically, the phase shift between two consecutive complex samples $s(n)$ and $s(n-1)$ is computed by arctan $\arctan(s(n) \times s^*(n-1))$, where $s^*(n-1)$ is the conjugate of $s(n-1)$. With thresholding, ZigBee® outputs the chip value "1" if the phase shift is bigger than 0° and otherwise outputs the chip value "0". After collecting 32 chips, ZigBee® maps these chips into four bits (i.e., a ZigBee® symbol in frame), according to the predefined symbol-to-chip spreading relationship in the direct sequence spread spectrum (DSSS) process.

In ZigBee® (i.e., IEEE 802.15.4), direct sequence spread spectrum (DSSS) is used to improve protection against interference and noise by multiplying original bits with a pseudo random noise spreading code. Specifically, a Zig- Bee® symbol (i.e., 4-bits) are mapped into a 32-chip sequence. In DSSS, a correlation threshold is defined to control the maximum Hamming distance between the received 32-chip sequence and the predefined chip sequence that the receiver can tolerate. A none-zero threshold means that ZigBee® receivers inherently can tolerate a certain number of errors in chip sequences. Normally, 12 is the default threshold, i.e., 12 chip errors can be recovered by the ZigBee® DSSS technique. In some scenarios, this threshold is set more loosely to adapt to environments with high interference and noise. For example, the default of such a threshold is set to 20 for ZigBee® frames to survive WiFi® interference. As mentioned early, QAM-based emulation could introduce errors in chip sequences. However, such errors are mediated by DSSS, and the emulated ZigBee® symbols can be decoded by ZigBee® successfully with a high probability.

Figure 7:
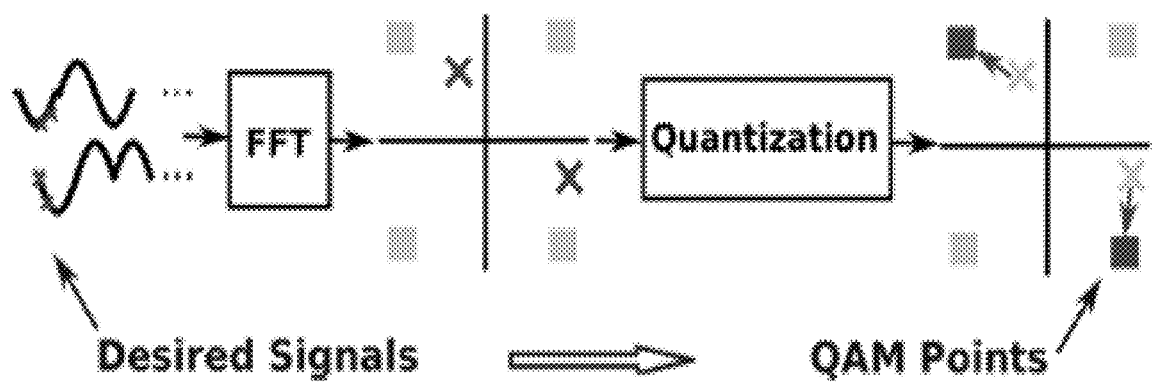
FIG. 7 is a conceptual diagram illustrating a basic process of quadrature amplitude modulation (QAM) emulation in accordance with the techniques of the current disclosure.

FIG. 7 is a conceptual diagram illustrating a basic process of quadrature amplitude modulation (QAM) emulation in accordance with the techniques of the current disclosure. QAM emulation is the core of the techniques described herein. FIG. 7 shows that the QAM selection is done in the reverse direction, where the desired ZigBee® time-domain signals are fed into the FFT to select corresponding QAM constellation points. The challenging issue of QAM emulation is that because the QAM points in WiFi® OFDM are predefined and discrete, the frequency components of the desired time-domain signals might not match the discrete QAM points perfectly, as shown in FIG. 7, leading to intrinsic QAM quantization errors.

In Fourier transform analyses, the Parseval's theorem states an equation of difference-energy in the time-domain and frequency-domain, i.e., $$\int_{t=-T/2}^{T/2} |u(t)-v(t)|^2 dt = T \Sigma_k |U[k]-V[k]|^2 \quad (1)$$

where u(t) and v(t) are two-time domain signals and U[k] and V[k] are corresponding DFTs.

The difference-energy equation shows that minimizing the signal distortion in the time-domain under energy metric is equivalent to minimizing the total deviation of frequency components after QAM quantization. Therefore, QAM emulation is essentially an optimization process to choose a combination of the closest k QAM points in term of total Euclidean distance to k FFT points of desired signals as shown in FIG. 7, which can be done easily in O(k).

Figure 8A:
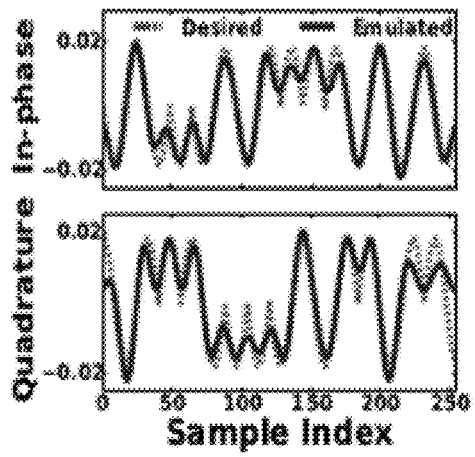
FIGS. 8A and 8B are conceptual diagrams illustrating a comparison between a WiFi® QAM Emulated signal and a desired ZigBee® signal in accordance with the techniques of the current disclosure.
Figure 8B:
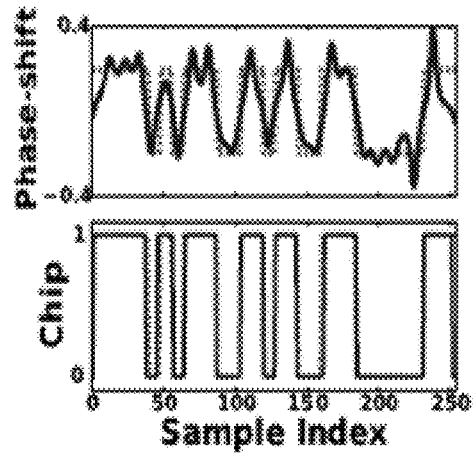

FIGS. 8A and 8B are conceptual diagrams illustrating a comparison between a WiFi® QAM Emulated signal and a desired ZigBee® signal in accordance with the techniques of the current disclosure. FIG. 8A is an emulated time-domain signal. FIG. 8B is a phase shift of the emulated signal. As a proof of concept example, an emulated ZigBee® symbol "5" is emulated according to the process shown in FIG. 7, where the 64-QAM constellation points in IEEE 802.11g standard are utilized for emulation. After the IFFT, the emulated time-domain signal is shown in FIG. 8A, where the real/imaginary parts of the emulated time-domain signal are compared with the desired In-phase/Quadrature (or I/Q) signal of the ZigBee® symbol. The desired ZigBee® signals are approximated well by the emulated WiFi® signal, with some tolerable distortion.

Furthermore, the phase shifts of the emulated signal (and corresponding chip values) are calculated and shown in FIG. 8B. The results prove that the emulated signal can be decoded by ZigBee® successfully.

Figure 9:
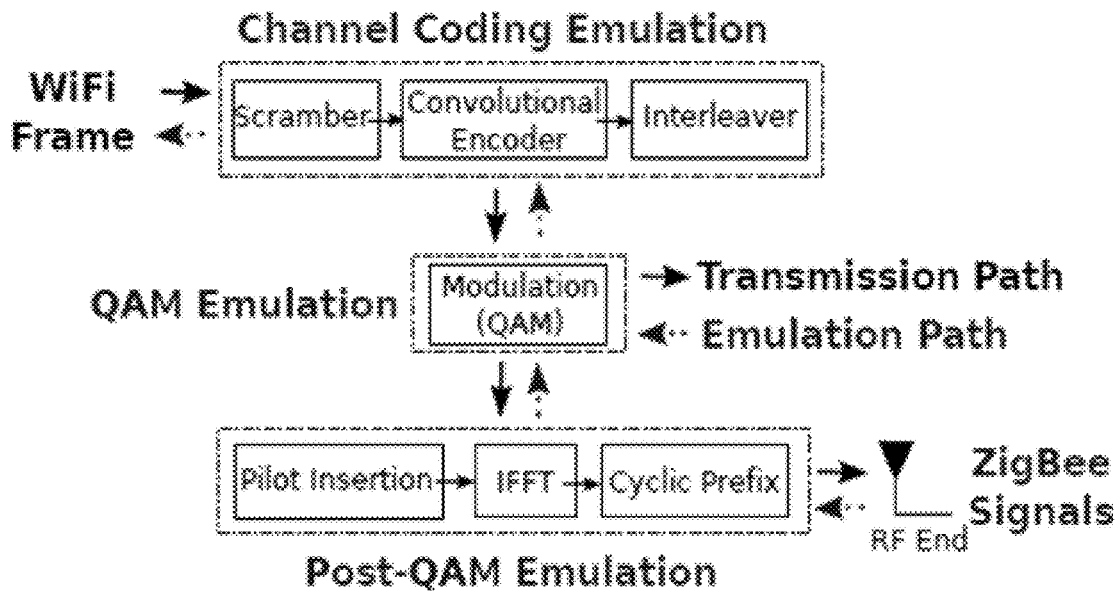
FIG. 9 is a conceptual diagram illustrating a data emulation procedure in accordance with the techniques of the current disclosure.

FIG. 9 is a conceptual diagram illustrating a data emulation procedure in accordance with the techniques of the current disclosure. For the sake of clarity, the QAM emu-
lation illustrated in FIG. 7 is introduced without mentioning hardware constraints. Clearly, to support cross-technology communication from WiFi® to ZigBee® in commodity devices, the techniques described herein may handle a few challenging issues. FIG. 9 shows the detailed transmission path of WiFi® OFDM. In addition to QAM emulation, the techniques described herein support two additional types of emulation: (i) channel coding emulation and (ii) post-QAM emulation. The challenges related to each of these emulations are discussed below.

Channel coding (convolutional encoding) makes WiFi® OFDM communications more resilient to noise and interference by introducing redundancy (extra bits). However, this imposes a challenge for emulation from the reverse direction because the techniques described herein may map source bits in the WiFi® payload into only a constrained set of coded bits to activate QAM points for OFDM subcarrier modulation.

More specifically, in WiFi® 64-QAM, six coded-bits are used to map one QAM point. Given 48 QAM points, a total of 288 (=48×6) coded bits are used. Given a channel coding rate of 3/4, the techniques described herein may use the $$216 \left( = 288 \times \frac{3}{4} \right)$$

bits in the WiFi® payload to generate the 288 coded bits.

If matrices in Galois field GF(2) are used to define the relationship between the source bits X and the coded bits Y, it is easy to model the convolutional encoding as a matrix M satisfying the following equation:

$$M \times_{GF(2)} X = Y \quad (2)$$

For any Y, finding the X satisfying the equation (2) is equivalent to finding the inverse of M under GF(2). If M is full row-rank and square, the inverse of M can be calculated easily by Gaussian Elimination.

Figure 10:
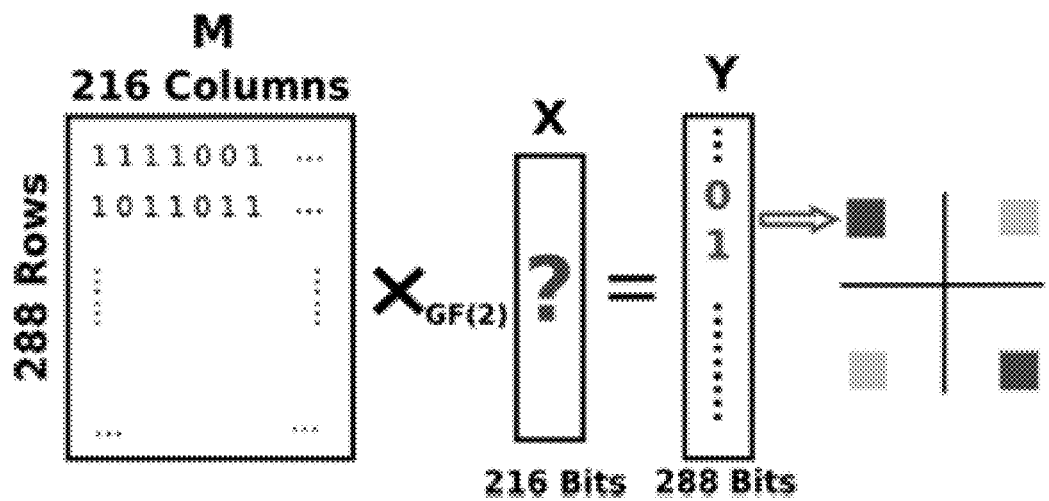
FIG. 10 is a conceptual diagram illustrating an invertible QAM Points under constraints of WiFi® channel coding in accordance with the techniques of the current disclosure.

FIG. 10 is a conceptual diagram illustrating an invertible QAM Points under constraints of WiFi® channel coding in accordance with the techniques of the current disclosure. However, as shown in FIG. 10, to map 216 source bits in X to 288 coded bits in Y, convolutional encoding uses a 288-by-216 matrix M. Since M is not full row-rank (row: 288>column:216), the matrix equation is an overdetermined system (i.e., more equations than unknowns). In other words, techniques described herein may not emulate an arbitrary combination of 48 QAM points using 216 source bits.

However, ZigBee® signals occupy only a 2 MHz band, covering 7 WiFi® subcarriers with a 312.5 KHz bandwidth each. To emulate ZigBee® signals, the techniques described herein may control only 7 WiFi® QAM points (14 QAM points in the parallel case) instead of all 48 QAM points. According to Equation 2, the techniques described herein may control only 84 bits (14×6 bits) of Y by manipulating the X. Let Y' be the 84-bits subvector of Y and M' be the corresponding submatrix, $$M' \times_{GF(2)} X = Y'. \quad (3)$$

Given M' is now a full row-rank matrix (row:84<column: 216), for arbitrary coded bits Y, the matrix equation (3) is an underdetermined system with multiple solutions of X. In other words, the techniques described herein can emulate an arbitrary combination of 14 QAM points with 216 source bits in multiple ways.

Figure 11:
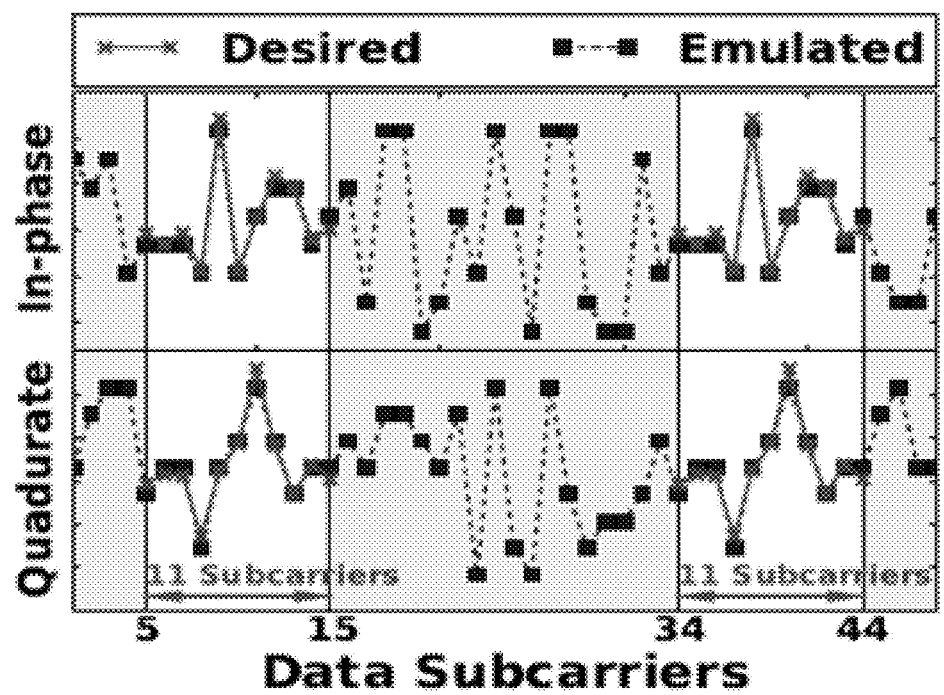
FIG. 11 is a conceptual diagram illustrating an example of QAM approximation by controlling a subset of subcarriers in accordance with the techniques of the current disclosure.

FIG. 11 is a conceptual diagram illustrating an example of QAM approximation by controlling a subset of subcarriers in accordance with the techniques of the current disclosure. The experiment described in FIG. 11 indicates that the techniques described herein may emulate ZigBee® closely in two subregions of 11 subcarriers (7 data+4 guard subcarriers) using 216 source bits. These two subregions overlap with 2 MHz ZigBee® channels with 625 KHz guarding bands on each side. Since devices may not control all 48 QAM points, additional signals are introduced in non-overlapped subcarriers, as shown in FIG. 11, which is fine because ZigBee® does not sample these subcarriers for demodulation.

To investigate the emulation capacity of source bits further, the techniques described herein increase the total bandwidth of desired subcarriers. When the total bandwidth becomes wider (e.g., the number of elements in Y become larger), the row rank of M increases. Theoretically, when M becomes square and full row-rank, the techniques described herein can control up to 36 subcarriers (216 bits) with a total bandwidth of 11.25 MHz, which is much larger than twice the ZigBee® bandwidth (2 Mhz). It is noted that since the techniques described herein enable a device to choose arbitrary elements in Y, the techniques described herein may be capable of controlling non-continuous bands of subcarriers, paving the way for parallel CTC.

In addition to channel coding, the data scrambling in WiFi® OFDM is performed by XORing the incoming source bits with the output of a 7-bit linear feedback shift register. Since the scrambler is a one-to-one mapping from the source bits to the scrambled bits, it is easy to reverse the scrambler by XORing the scrambled bits with the same output of the shift register once the scrambling seed is known. A device may read the scrambling seed from many commodity WiFi® radios. For instance, in ath5k supported WiFi® cards (e.g., Atheros AR5112 and AR2425), the techniques described herein may fix the scrambling seed by setting the GEN SCRAMBLER field in the AR5K PHY CTL register of the driver. In other Atheros chipsets (e.g., AR9580 and AR5001G), the scrambling seed is incremented by one between frames, which is easy to track. The interleaver can be handled similarly.

In WiFi® OFDM, each 20 MHz channel is composed of 64 subcarriers: 48 subcarriers for data, 4 subcarriers as pilot subcarriers for channel state estimation, and 12 null subcarriers. Without hardware modification, the WiFi® signals transmitted in the pilot/null subcarrier cannot be controlled by software. Therefore, if the pilot subcarriers overlap with the frequency bands of ZigBee® devices, the techniques described herein may not work properly. In accordance with the techniques described herein, channel mapping may be utilized to avoid the collision with the pilot/null subcarriers in WiFi® OFDM.

Figure 12:
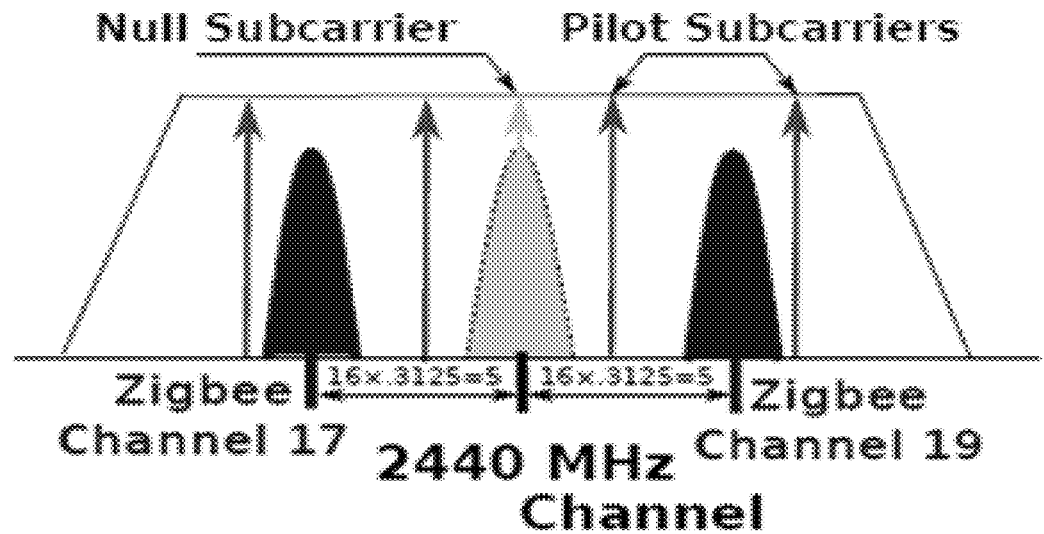
FIG. 12 is a conceptual diagram illustrating channel mapping for pilot avoidance in accordance with the techniques of the current disclosure.

FIG. 12 is a conceptual diagram illustrating channel mapping for pilot avoidance in accordance with the techniques of the current disclosure. For example, once the central frequency of a channel is set as 2440 MHz, the two regions of WiFi® OFDM data subcarriers [−21, −7] and [7, 21]) can be utilized to achieve two parallel cross-technology communications in standard ZigBee® channel 17 and channel 19. It should be noted that many commodity WiFi® radios (e.g., Atheros AR9485, AR5112, and AR2425) can set their central frequency.

Figure 13:
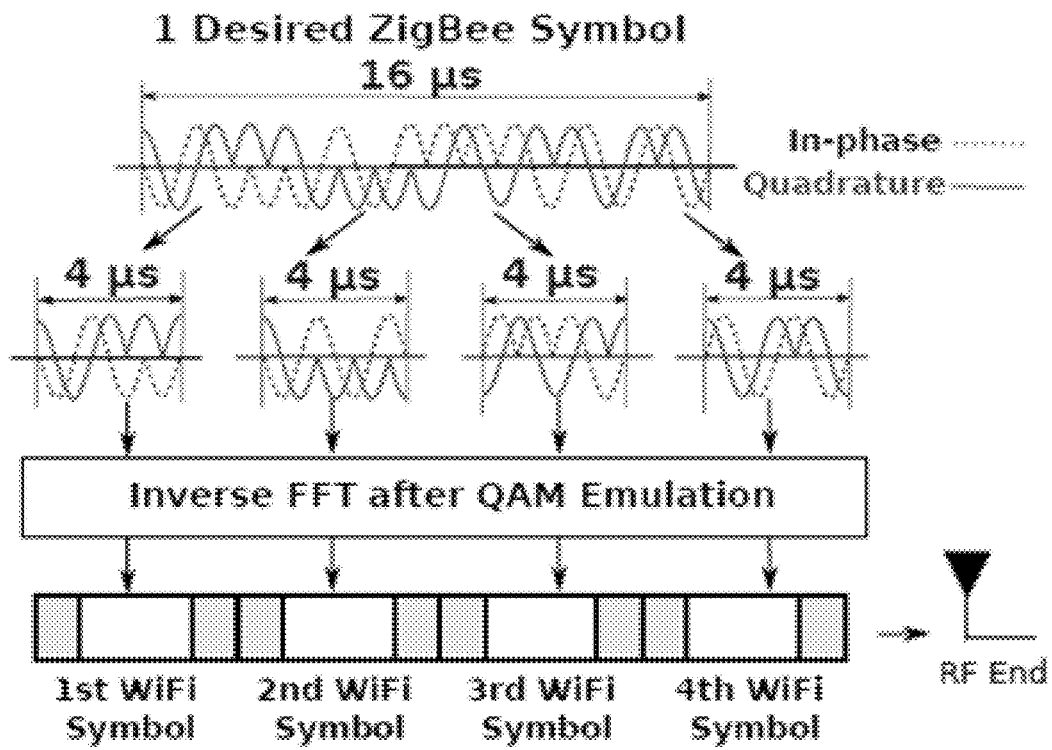
FIG. 13 is a conceptual diagram illustrating an emulated offset quadrature phase-shift keying (OQPSK) process with WiFi® QAM in accordance with the techniques of the current disclosure.

FIG. 13 is a conceptual diagram illustrating an emulated offset quadrature phase-shift keying (OQPSK) process with WiFi® QAM in accordance with the techniques of the current disclosure. Compared with the 16µ duration of a ZigBee® symbol, a WiFi® symbol occupies 4 µs. Therefore, a full WiFi® symbol emulates only one-fourth of a ZigBee® symbol, as shown in FIG. 13.

Technically, QAM points used by a WiFi® symbol are selected by feeding the time-domain signal of one-fourth of a ZigBee® symbol into Discrete Fourier transform (DFT). In DFT, the sampling in the frequency domain leads to the replicates of time domain signals; specifically, the signal ^x(n) recovered from the DFT samples via the following synthesis equation $$\hat{\hat{x}}(n) = \frac{1}{N} \sum_{k} \left( \sum_{n} x(n) e^{-j2\pi nk/N} \right) e^{j2\pi kn/N} \tag{4}$$

^x(n) is a periodic signal that consists of a sum of shifted replicates of the discrete time signal x(n).

Figures 14A, 14B:
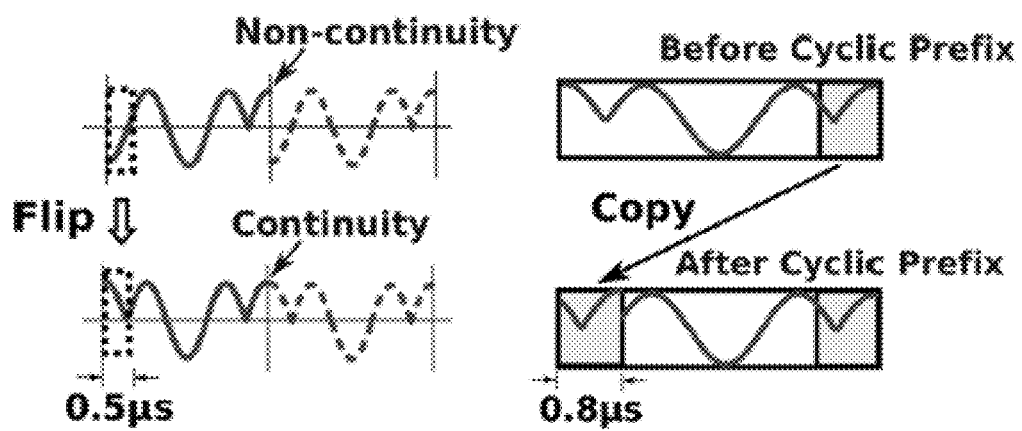
FIGS. 14A and 14B are conceptual diagrams illustrating effects of flipping and a cyclic prefix in accordance with the techniques of the current disclosure.

FIGS. 14A and 14B are conceptual diagrams illustrating effects of flipping and a cyclic prefix in accordance with the techniques of the current disclosure. On one hand, the DFT treats the time-domain data by assuming they were periodic by concatenating with the shifted replicates of themselves. On the other hand, at the ZigBee® receiver, Offset Quadrature Phase-Shift Keying (OQPSK) modulation adds a π/2 phase offset to the quadrature signals of the ZigBee® symbol, which makes concatenated replicates noncontinuous, as shown in FIG. 14A. This non-continuity introduces signal boundary errors when the DFT is used for an individual WiFi® symbol, each emulating one-fourth of the supposedly continuous ZigBee® symbol.

Another source of error comes from the WiFi® cyclic prefixing, a technique to eliminate inter-symbol interference (ISI). As illustrated in FIG. 14B, with cyclic prefixing, a guard interval lasting 0.8 µs in each WiFi® symbol is copied from the right of WiFi® symbol and pasted into (overwrite) the left of the symbol. As a result, the front segment and the end segment of WiFi® signals are the same. However, ZigBee® I/Q signals do not have such repetition. Because of the cyclic prefix enforced by WiFi® modulation, the techniques described herein have a segment of signals with 0.8 µs duration which may not be controlled in signal emulation.

Since various techniques described herein do not modify the hardware used, the techniques described herein may not completely remove these two sources of errors, but the techniques described herein may mediate them. Before feeding one-fourth of the desired ZigBee® Q signal to FFT, the techniques described herein build a continuous shifted replicated signal Q' by flipping a half-chip of Q at the boundaries as illustrated in FIG. 14a. It should be noted that flipping the desired signal is done in software for the emulation purpose, and thus no hardware changes are involved. Since the duration of a half chip of Q is 0.5 µs less than that of a cyclic prefix (e.g., 0.8 µs), boundary flipping can mediate errors due to noncontinuity without penalty given the constraint of cyclic prefixing.

Figure 15:
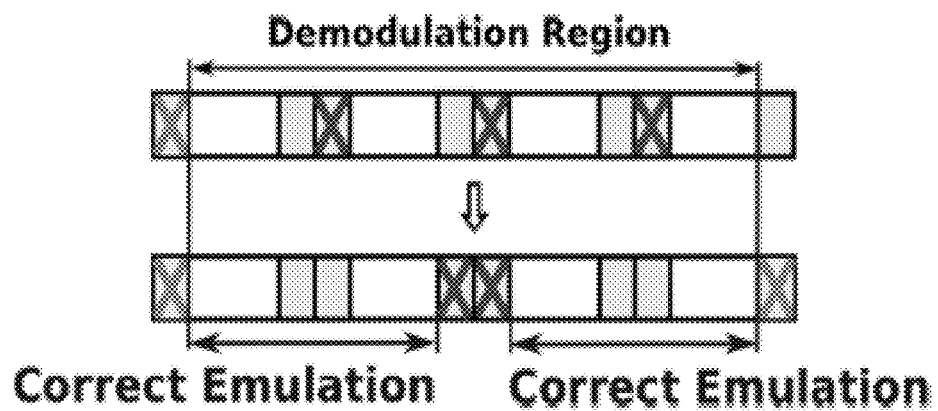
FIG. 15 is a conceptual diagram illustrating a flipping boundary selection process in accordance with the techniques of the current disclosure.

FIG. 15 is a conceptual diagram illustrating a flipping boundary selection process in accordance with the techniques of the current disclosure. As FIG. 15 shows, four WiFi® symbols have eight boundaries, among which the left/right-most boundaries are not used by OQPSK demodulation. A naive selection would be flipping only left(right) boundaries of ZigBee® signal segments. The upper part of FIG. 15 shows the number of regions corrupted by cyclic prefix is 3. But if the device chooses boundary flipping wisely, as shown in the lower part of FIG. 15, the number of regions corrupted by cyclic prefix is reduced to 2, leading to a better demodulation. Experimentally evaluating the design, the phase-shift distortion is significantly lower with selective boundary flip, leading to better chip demodulation performance.

It is noted that selective boundary flipping can mediate but not eliminate signal distortion completely. However, through the use of DSSS, the ZigBee® symbol can tolerate a certain number of chip errors, leading to a high symbol-level reliability (above 97%). Due to the intrinsic discrepancy between WiFi® and ZigBee®, signal distortion may not be avoided completely during emulation, even with DSSS. Therefore, the techniques described herein may utilize additional high-level mechanisms to achieve highly reliable CTC (e.g., 99% and above).

In essence, a device that implements one or more of the techniques described herein may be a genuine WiFi® device. Therefore, the techniques described herein may avoid interference from other ISM-band devices (e.g., WiFi®, ZigBee®, and Bluetooth®) using the standard WiFi® CSMA/CA mechanism. The advanced co-existence designs for WiFi® can be directly applied to the techniques described herein to improve its reliability. Also, since the techniques described herein may emulate the low-bit-rate ZigBee®, it can nicely reduce the inter-symbol interference caused by multipath propagation.

For higher reliability, the techniques described herein can simply transmit WiFi® frames (e.g., multiple copies of an emulated ZigBee® frame) repeatedly. Note that this mechanism is transparent in the sense that a ZigBee® receiver cannot tell whether the sender is a WiFi® or ZigBee® device. Given the frame reception ratio (FRR), the reception probability of one frame after m repeated transmission is $$1-(1-FRR)^m. \quad (5)$$

The FRR for the techniques described herein may be between 40% and 60%. Accordingly, the reliability is between 95.3% and 99.5% after six retransmissions, as validated by the experiments. Although retransmission is considered inefficient in intra-technology communication, it is acceptable for CTC, given that it is mostly used for low-volume control and coordination. Moreover, in duty-cycled ZigBee® networks, it is a common practice to transmit a train of the same frames to wake up the receivers.

Beside retransmission, the techniques described herein may also support an FEC scheme with two design elements: preamble protection and payload coding. It is not a completely transparent design as retransmission, but it has a better spectrum efficiency with 90~99% FRR as shown in evaluation.

FIG. 16 is a conceptual diagram illustrating reliable cross-technology communication (CTC) with link coding in accordance with the techniques of the current disclosure. The preamble of an emulated ZigBee® frame is a constant string of some symbols '0' followed by a symbol '7A'. Such frame synchronization cannot be protected by a coding mechanism. The techniques described herein, therefore, provide a repeated frame synchronization mechanism. As shown in FIG. 16, preamble repetition improves the chances of successful preamble detection. If the first preamble is identified successfully, the techniques described herein may discard the second.

To protect content of an emulated ZigBee® frame, the techniques described herein use the computational efficient binary Hamming Code. Since the errors caused by the signal emulation are at the symbol level, while the binary Hamming codes work at the bit level, the techniques described herein employ a simple interleaver scattering the bits in corrupted symbol before applying hamming coding as shown in FIG. 16.

The parameter of Hamming Code is determined based on the symbol reception ratio of the techniques described herein, which is higher than 95%. The Hamming Code (15, 11) has the capability of error detection rate of 1/11, which is sufficient to handle the 5% symbol error rate.

An example testbed consists of two types of senders: (i) the USRP-N210 platform with 802.11 b/g PHY, (ii) a commodity WiFi® card Atheros AR2425 as well as three types of receivers: (i) a commodity ZigBee® receiver (i.e., MicaZ); (ii) a commodity WiFi® receiver (i.e., Atheros AR9485); and (iii) a USRP-N210 with 802.15.4 PHY. It should be noted that CTC is supported directly among commodity devices and USRP-N210 devices are used only for evaluation purposes to measure low-level PHY information, such as the distortion of phase and symbol error rate, which are inaccessible by commodity devices. With the techniques described herein, a broadcast frame from an Atheros AR2425 WiFi® card (or USRP-N210) can be simultaneously received by the MicaZ and Atheros AR9485 receivers, indicating this frame is indeed both WiFi®-compliant and ZigBee®-compliant.

During experiments, by adjusting the MTU, each emulated frame consists of a 32-bit preamble, and a default frame payload of 25 bytes, resulting in about a 1 ms duration, which is the typical length of payload for ZigBee® communications. To ensure statistical validity, the techniques described herein obtain the average result of 10 experiments, each of which sends 1,000 frames under a wide range of settings including indoor/outdoor, short/long distance, mobile, and duty-cycled scenarios.

The evaluation starts from PHY-layer measurements (i.e., time-domain signal, symbol error rate (SER)) to link-layer statistics (i.e., frame reception ratio (FRR) and throughput). The study also covers multiple scenarios, including (i) stationary, (ii) long-range, (iii) mobile, (iv) duty-cycled, and (v) parallel CTC.

To ensure reception, the RF waveform of the WiFi® payload may emulate that of ZigBee® signals as closely as possible. It is known that the ZigBee® OQPSK demodulation is based on the phase shift, i.e., the angle between two consecutive complex samples. The chip value is decoded as "1" if the phase shift is positive, and otherwise as "0". After collecting 32 chips, ZigBee® converts these chips to a ZigBee® symbol with smallest chip Hamming distances. Using the USRP receiver, the techniques described herein measure the distribution of chip Hamming distances between emulated ZigBee® and intended ZigBee® symbols.

FIG. 17 is a conceptual diagram illustrating phase shifts of emulated signals in accordance with the techniques of the current disclosure. For all emulated symbols, the central segments of emulated signals always present significant distortions in phase shifts. This phenomenon is a direct result of selective boundary flipping, shown in FIG. 15. Because of this emulation constraint, the Hamming distances of emulated signals are always larger than some specific number. Thanks to the inherent redundancy in DSSS, such Hamming distances can be tolerated by ZigBee® decoding, leading to a low symbol error rate (<3%).

In the techniques described herein, the symbol is standard ZigBee® symbol where each symbol stands for 4 data bits, while the symbol in certain prior techniques is an interval of consecutive WiFi® beacon frames and represents $\lfloor \log_2(100) \rfloor = 6$ data bits. The symbol error rates of both the techniques described herein and prior techniques depend on the number of repetition, a parameter to trade-off between throughput and reliability. The techniques described herein may reach a 99.9% symbol success rate when the frames are sent at a rate of 63 Kbps, while prior techniques achieve a 99.9% symbol success rate with bit rate 7.5 bps. Under the same success rate, the throughput of the techniques described herein may be more than 8,000 times of that of the prior techniques.

The techniques described herein may have a much longer range than that of ZigBee®-to-ZigBee® communication since WiFi® devices normally operate at 20 dBm, while ZigBee® devices operate at 0 dBm. Since energy is less a concern for WiFi® devices than for low-cost ZigBee® devices, this feature is very useful in allowing a WiFi® AP to control all IoT devices equipped with low-power Zig-Bee® radios in a large residential area. Further, repeated transmission is a simple, transparent, and robust mechanism that makes the techniques described herein work well in real wireless environments.

Link coding requires that ZigBee® receivers understand the format of link coding, and hence is not as transparent a design as retransmission. On the other hand, the link coding design can improve reliability without retransmission. If the link coding is applied, the techniques described herein may prefer a short frame length, repeated preamble, and the Hamming coding with a high coding rate.

The techniques described herein are also evaluated using low-duty-cycle ZigBee® receivers, which sleep most of the time and wake up periodically to check for radioactivity. In this case, a sender may transmit a train of repeated frames to wake up the receiver. In the experiments, each frame is retransmitted 20 times. The duty-cycle ratios are set as 30%, 15%, 6%, 3%, and 2%, respectively.

The techniques described herein can support two parallel communications from WiFi® to ZigBee®. Using the channel mapping, as shown in FIG. 12, the techniques described herein may send two ZigBee® frames with two different subcarrier regions (11 data subcarriers each) in WiFi®. At the same time, the FRR at one channel is slightly worse than the FRR at another channel overall. The reason for this phenomenon is the diversity of the channel quality under different channels. With two parallel channels, the aggregate throughput of the techniques described herein can be more than 16,000× faster than that of packet-level CTCs.

This work presents the techniques described herein, a physical-level cross-technology communication design based on signal emulation. Using multiple subcarrier regions, techniques described herein are the first to offer parallel cross-technology communication. The extensive experiments show that the techniques described herein may achieve bit rates more than 16,000× those of the current state of the art with 99% symbol reliability. The experiments also demonstrate that the techniques described herein can work well under long-distance, mobile, and low duty-cycle scenarios. Last, it should be noted that the vision of Software Define Radio (SDR) allows a single transceiver to adapt the techniques, but its pure software-based design requires significant cost, energy, and computational complexity. The techniques described herein, in contrast, may open a new pathway to achieve SDR through emulation, striking a nice balance among reliability, flexibility, deployability and complexity.

Figure 18:
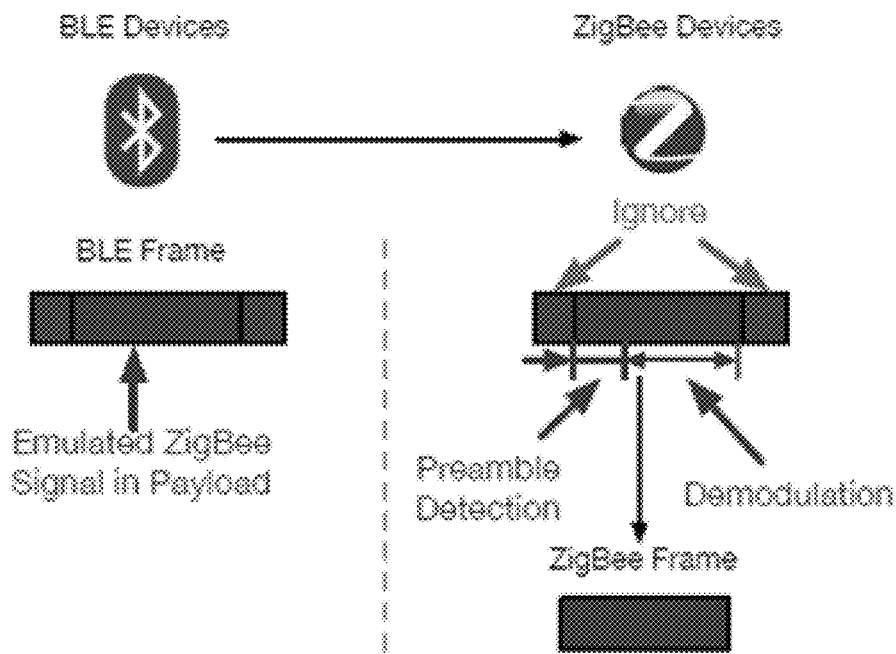
FIG. 18 is a conceptual diagram illustrating an example system architecture of the techniques described herein.

FIG. 18 is a conceptual diagram illustrating an example system architecture of the techniques described herein. With the rapid development of wireless technologies, such as WiFi®, Bluetooth®, and ZigBee®, the ISM band suffers from the cross-technology interference (CTI) and channel inefficiency. That is because the wireless technologies coexisting in the ISM band have heterogeneous PHY layer and cannot communicate directly, thus not able to effectively coordinate channel use. To achieve effective channel use, the traditional approach is to use a multi-channel gateway. And recently, researchers also propose cross-technology communication (CTC) techniques as a promising solution for channel coordination. However, neither the traditional gateway approach nor the existing CTC technologies work well for the channel coordination due to their intrinsic limitations.

Multi-radio gateways are a usual and straightforward solution to bridge multi-technology communication. However, a gateway introduces not only additional hardware cost but also the labor-intensive deployment cost, which would be prohibitive for the mobile and ad hoc environment. Also, a dual-radio gateway increases the traffic overhead by doubling traffic volume in the ISM band, which further intensifies the cross-technology interference.

The recent cross-technology communication aims at direct communication among heterogenous wireless technologies, thus make explicit channel coordination available. For examples, heterogeneous devices can allocate the channel in a way similar to the RTS/CTS in the 802.11 protocol, thus leading to a better channel efficiency. Existing CTC designs rely on sparse packet level information such as the beacon timing and multi-packet sequence patterns, introducing a delay of at least hundreds of milliseconds. Such a delay prevents the existing solutions from coordinating channels effectively in real-time.

In contrast to the limitations of gateway approach and existing CTC approaches, the techniques of this disclosure are able to transmit a ZigBee® packet directly from a Bluetooth® radio within a few milliseconds, making channel coordination feasible. In the techniques described herein, although the description will be based on one specific Bluetooth® protocol (Bluetooth® Low Energy (BLE)), the idea can be generalized to other Bluetooth® protocols, such as Bluetooth® Classic.

Various techniques of this disclosure include a high data-rate CTC communication from BLE to ZigBee®, while being compatible to both ZigBee® and BLE protocols. The basic idea of one or more techniques of this disclosure are illustrated in FIG. 18—these techniques encapsulate a legitimate ZigBee® frame within the payload of a legitimate BLE frame, by carefully choosing the payload bytes. At the PHY layer, the selected payload resembles (i.e., emulates) the signal of a legitimate ZigBee® frame. When the emulated BLE packet reaches a ZigBee® device, the payload part is detected (via preamble) and demodulated, just like any other ZigBee® packet originated from a ZigBee® sender. It should be noted that the header and trailer of the BLE frame are incompatible to ZigBee® and are naturally disregarded or treated as noise.

Such a design makes the techniques of this disclosure transparent. At the sender, the BLE device cannot distinguish whether it is a normal BLE packet or it contains emulated ZigBee® frame because it is merely a byte pattern in the payload. Conversely, at the receiver, the ZigBee® device cannot tell whether the frame is from a ZigBee® device or is emulated by a BLE device, due to the indistinguishable PHY layer waveform.

Table 1 above illustrates the technical advantages of the techniques of this disclosure, as the first PHY-layer CTC, compared to the gateway approach and the state-of-the-art packet-level CTC approaches. One or more techniques of this disclosure may overcome the shortages of existing gateway approach by providing direct communication between heterogeneous devices. As opposed to the gateway, these techniques do not incur deployment cost or additional traffic. At the same time, it offers significantly higher communication throughput and lower transmission delay compared to the CTC presented until now. Also, these techniques may enable multi-channel concurrent CTC by the inherent frequency hopping in the BLE communication.

Certain techniques of this disclosure also have innovative and unique features in compatibility. First, it is the first CTC design from BLE to ZigBee® that requires neither hardware nor firmware change. Other designs require at least firmware changes at the receivers. Second, the techniques of this disclosure have "dual-standard compliance" in a sense that a frame can be received and demodulated by both ZigBee® and BLE receivers.

Figure 19:
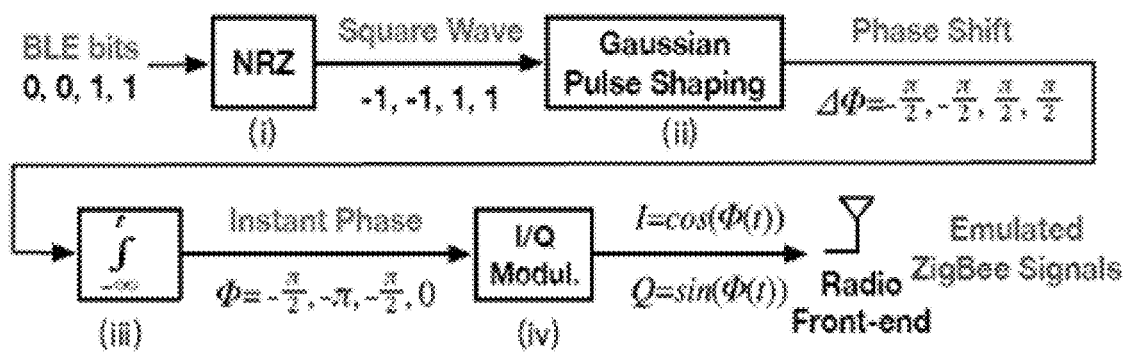
FIG. 19 is a conceptual diagram illustrating Bluetooth® Low Energy (BLE) as the transmitter with Gaussian frequency shift keying (GFSK) modulation in accordance with the techniques of the current disclosure.

FIG. 19 is a conceptual diagram illustrating Bluetooth® Low Energy (BLE) as the transmitter with Gaussian frequency shift keying (GFSK) modulation in accordance with one or more techniques of the current disclosure. BLE uses GFSK modulation, which is normally realized by phase shift over time 1. FIG. 19 illustrates the entire procedure from payload bits to corresponding radio waves from steps (i) to (iv). In (i) BLE bits first go through a non-return-to-zero (NRZ) module that modulates series of BLE bits to series of square waves with amplitudes of either −1 or 1. Since each wave is 1 μs long and carries a single bit, this leads to the 1 Mbps bitrate of BLE. (ii) This wave passes through the Gaussian low pass filter, which shapes the waves into a band-limited signal. This baseband signal corresponds to phase shifts of ±π/2 when multiplied to the carrier. (iii) Taking integral of the series of waves to t yields phase with respect to time (i.e., instant phase). This is essentially a time-domain representation of the accumulated phase shifts from the previous step. (iv) The In-phase and Quadrature (I/Q) signal is calculated through the cosine and sine of the instant phase, respectively, which are multiplied to the carrier and pushed into the air through the BLE RF front-end.

The goal of the techniques of this disclosure is to construct time-domain waveforms that can be demodulated by a commodity ZigBee® receiver. In other words, emulate ZigBee® signal at BLE. To do so, the equivalent of a ZigBee® signal containing the data of choice is emitted from the BLE RF front-end, and reverse engineer steps (iv) to (i) accordingly. In step (iv), ZigBee® signal in the air is sampled at BLE sampling rate (1 Msps). From the sampled I/Q signals, the corresponding instant phases are obtained. Reversing step (iii) yields the phase shifts between consecutive BLE samples, where the corresponding series of square waves are found by reversing step (ii). Finally, these waves are mapped to data bits at the BLE packet payload which can be freely set, indicating that the targeted ZigBee® signal is emulated simply by setting the BLE packet payload with the correct bits.

Such an approach enables the emulated waveform to be seamlessly demodulated by commodity ZigBee® radios as legitimate Zig-Bee packets, without any change incurred to BLE's GFSK modulator. However, such emulation is not trivial due to various constraints, such as the narrower bandwidth of BLE (1 MHz) compared to ZigBee® (2 MHz).

Figure 20:
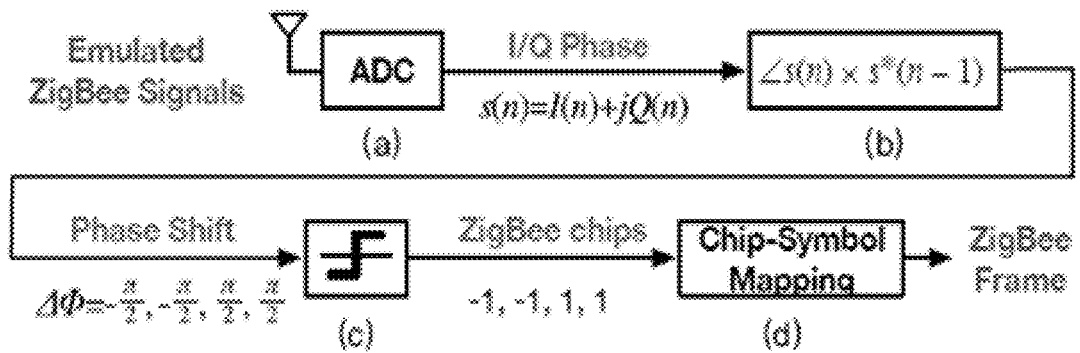
FIG. 20 is a conceptual diagram illustrating ZigBee® as the receiver with Offset Quadrature Phase Shift Keying (OQPSK) demodulation in accordance with the techniques of the current disclosure.

FIG. 20 is a conceptual diagram illustrating ZigBee® as the receiver with Offset Quadrature Phase Shift Keying (OQPSK) demodulation in accordance with the techniques of the current disclosure. As FIG. 20 depicts, the techniques of this disclosure enable BLE devices to transmit emulated ZigBee® packets which can be demodulated by any commodity ZigBee® device through the standard Offset Quadrature Phase Shift Keying (OQPSK) demodulation procedure. This is initiated by step (a), where ZigBee® captures the BLE signal on the overlapping 2.4 GHz ISM through the analog-to-digital converter (ADC), to obtain I/Q samples. A pair of I/Q samples are often referred to as a complex sample $s(n)=I(n)+jQ(n)$. In step (b), the phase shifts between consecutive complex samples are computed from $arctan(s(n) \times s^*(n-1))$, where $s^*(n-1)$ is the conjugate of $s(n-1)$. In step (c) positive and negative phase shifts are quantized to be 1 and −1, corresponding to ZigBee® chips 1 and 0.

TABLE 2

Symbol-to-chip mapping in ZigBee ® (802.15.4)

| Symbol (4 bits) | Chip Sequence (32 bits) |
|---|---|
| 0 0 0 0 | 11011001110000110101001000101110 |
| 0 0 0 1 | 11101101100111000011010100100010 |
| . . . | . . . |
| 1 1 1 1 | 11001001011000000111011110111000 |

Finally, in (d), 32 ZigBee® chips are mapped to a ZigBee® symbol, by looking up a symbol-to-chip mapping table (Table 2) predefined in DSSS. There are 16 different symbols where each represents $\log_2 16=4$ bits. It is noted that in the face of noise/interference the phases may suffer from errors (+↔−), which induce reversed chips (1↔0). In such case, the closest symbol with smallest Hamming distance is selected.

Conceptually, emulation of ZigBee® signal via BLE is possible due to two key technical insights. First is the similarity of (de)modulation techniques of BLE and ZigBee®. That is, BLE's GFSK and ZigBee®'s OQPSK commonly utilize phase shifts between consecutive samples to indicate symbols (chips for ZigBee®). Furthermore, ZigBee® only considers sign (+ or −) of the phase instead of a particular phase value, which offers great flexibility in emulation. However, the challenge comes from the fact that the bandwidth of BLE (1 MHz) is only half of that of ZigBee® (2 MHz). This fundamentally limits BLE's rate of phase shifts. In other words, phase shifts in BLE are not sufficiently fast to express all ZigBee® chips, leading to inevitable errors in emulation. This shortage is covered by the second key component to emulation in accordance with one or more techniques of this disclosure—e.g., DSSS in ZigBee®.

DSSS maps 32 bit chip sequences to 4 bit symbols (Table 2), leaving tolerance margin for robustness against noise and interference. Due to this margin, a ZigBee® symbol can be correctly decoded if the Hamming distance between the received and ideal chip sequence is within a threshold of 12 (may be adjusted up to 20). This tolerance margin can be exploited to recover from the inevitable error caused by the bandwidth asymmetry. In the following disclosure, a detailed illustration on the two insights is provided, and how certain techniques of this disclosure are designed to effectively explore them to enable CTC.

Figure 21:
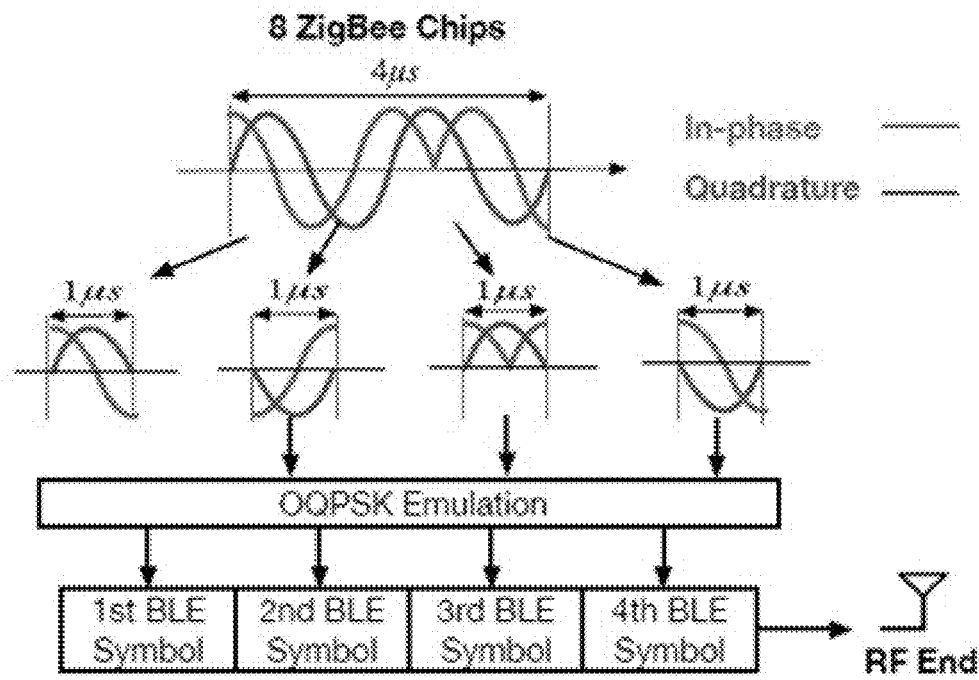
FIG. 21 is a conceptual diagram illustrating emulating ZigBee® with BLE in accordance with the techniques of the current disclosure.

FIG. 21 is a conceptual diagram illustrating emulating ZigBee® with BLE in accordance with the techniques of the current disclosure. Emulating ZigBee®'s OQPSK modulation with BLE is a nontrivial problem due to the narrower bandwidth of BLE compared to ZigBee® (1 MHz vs 2 MHz). FIG. 21 illustrates the emulation process with an example of 8 ZigBee® chips, where it starts by cutting the sequence into two-chips pieces (one In-phase chip and one Quadrature chip) with durations of 1 μs. Each of the pieces is then emulated to be a BLE symbol which is discussed in detail below. It is noted that the technique introduced only involves setting bit pattern of BLE packet payload, and does not enforce any change to hardware or firmware.

Figure 22:
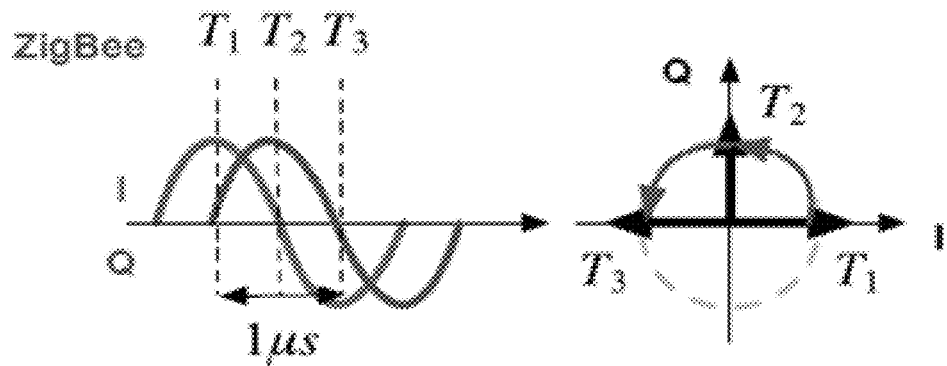
FIG. 22 is a conceptual diagram illustrating (a) a ZigBee® signal indicating two chips and (b) an emulated signal of (a), in accordance with the techniques of the current disclosure.

FIG. 22 is a conceptual diagram illustrating (a) a ZigBee® signal indicating two chips and (b) an emulated signal of (a), in accordance with the techniques of the current disclosure. Recall that OQPSK (i.e., ZigBee®) observes phase shifts between consecutive samples, whose signs are translated to chips of −1 and 1 (steps (a) and (b) in FIG. 20). The left in FIG. 22a depicts ZigBee® signal (not emulated) containing two chips of '11', where $T_1$-$T_3$ are the timings of three consecutive samples every 0.5 μs, the ZigBee® sampling rate. On the right, the constellation of the samples at the corresponding timings are plotted with arrows. The phase shift between the arrows of $T_1$ and $T_2$ is π/2. Since a positive value, this is translated to chip of '1'. The next chip is computed similarly between samples $T_2$ and $T_3$, which also yields a chip of '1'.

The above-mentioned ZigBee® signal can be successfully emulated by BLE, which is demonstrated in the left in FIG. 22B. Although the signal appears to be distinct from ZigBee® signal (left in FIG. 22A), it still delivers the same chips of '11' to ZigBee® receiver. The key point here is that only sign of phase shift is considered (not the amount). The left in FIG. 22B reflects the bandwidth of BLE being only half of ZigBee®—i.e., the sinusoidal curves indicating I/Q signals have half the frequency, or equivalently, double the period. When this signal is fed into the ZigBee® receiver and sampled at $T_1$-$T_3$, the resulting constellation is as the right in FIG. 22B. From the plot, phase shift between $T_1$ and $T_2$ is π/4 (i.e., positive), which yields chip of '1'. The same applies to the phase shift between $T_2$ and $T_3$. This indicates that the BLE signal in the left in FIG. 22B) indeed yields the same chip sequence of '11' at the ZigBee® receiver, as the ZigBee® signal in the left in FIG. 22a. In other words, the ZigBee® signal is successfully emulated by the BLE.

In fact, from the BLE's perspective, the signal at the left of the FIG. 22b is simply a BLE signal representing phase shift of π/2. This is because the sampling rate of BLE is half of the ZigBee®, due to the bandwidth difference and the corresponding Nyquist sampling rate. Specifically, BLE samples $T_1$-$T_3$ whose phase difference is π/2. Conversely speaking, by letting BLE to transmit bits corresponding to phase shift of π/2, the BLE devices is able to deliver chip sequences of '11' to a ZigBee® receiver. This is the key enabler to the techniques of this disclosure, where ZigBee® packet is encapsulated within a BLE packet simply through payload bit patterns.

From the example in FIG. 22B, a single-phase shift in BLE is interpreted as two-phase shifts in ZigBee®, as per bandwidth difference. That is, BLE has lower degree of freedom, where it can change phase shifts (−↔+) every 1 μs whereas it is 0.5 μs for ZigBee®. Due to this, while ZigBee® chip sequences are of '11' or '00' ('consistent phase' hereafter, since phase shifts are kept consistent at + or −) can be perfectly emulated, this is not the case for sequences '01' or '10'. FIG. 24A demonstrates ZigBee® chip sequence of '10'. As shown in FIG. 24B, BLE emulates this to be '11' (in the figure) or '00', incurring 1 chip error in either cases. While such a chip error is inevitable due to the nature of BLE's narrower bandwidth, interestingly, its impact on decoded bits can be significantly reduced depending on the BLE phase shift. That is, by smartly emulating chip sequence '01' to either '11' or '00' (same to '10'), the techniques described herein may maximize the probability of DSSS to map the received chip sequences to the correct symbol, and to output correct bits.

Figure 26A:
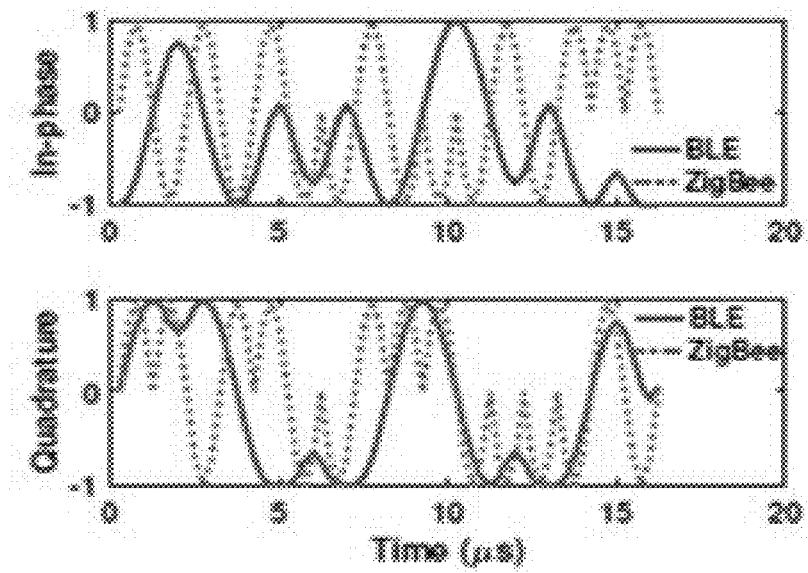
FIGS. 26A and 26B is a conceptual diagram illustrating a comparison between BLE emulated signal and the desired ZigBee® signal in accordance with the techniques of the current disclosure.
Figure 26B:
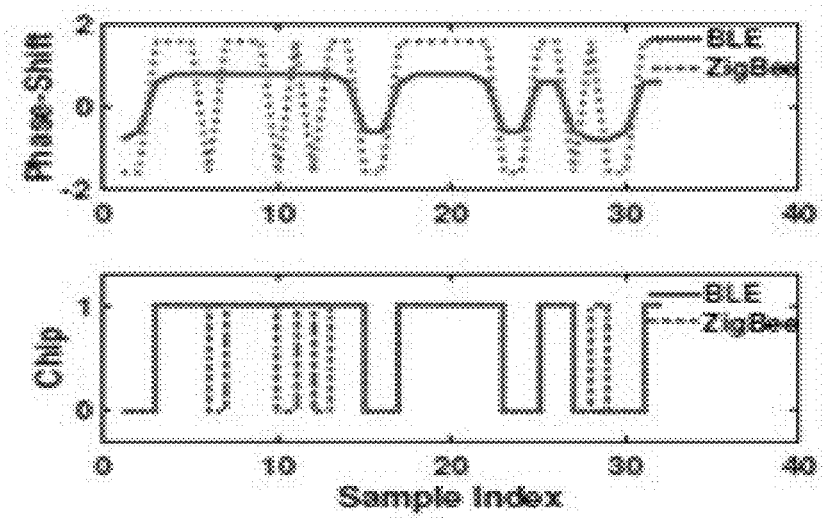

FIGS. 26A and 26B is a conceptual diagram illustrating a comparison between BLE emulated signal and the desired ZigBee® signal in accordance with the techniques of the current disclosure. As a proof of concept example, FIGS. 26A and 26B show a 32-chip ZigBee® symbol '0' (i.e., '0000' in Table 2) emulated from BLE. In FIG. 26A, the time domain I/Q signals for both ZigBee® and BLE are compared, which are quite different due to the disparate pulse shapes, e.g., Gaussian for BLE and half sine for ZigBee®. As discussed earlier, phase shifts depicted in the upper part of the FIG. 26B demonstrate that the shift per 0.5 μs is ±π/4 for BLE, where it is ±π/2 for ZigBee®. Moreover, some errors are observed where the phase shifts are inconsistent at ZigBee®. This is also reflected in the chips (lower in FIG. 26B), which is emulated DSSS so as to minimize the error in the decoded bits.

The techniques of this disclosure minimize the impact of the inevitable chip error introduced in OQPSK emulation, via DSSS. FIG. 25 illustrates an emulation in the 4-bit hamming space (simplified from 32 in ZigBee® DSSS). In this hamming space, there are three ideal symbols, which may be emulated using the method introduced above. Due to the limited capability of BLE, the techniques of this disclosure may only generate limited number of emulation symbols, which are marked with dashed rectangles in this figure. Other symbols in this hamming space cannot be represented by the techniques of this disclosure. Let $S_i$ denote the $i^{th}$ ideal symbol, and $E_i$ to denote the $i^{th}$ emulated symbol. Then, two symbol (Hamming) distances are defined as follows:

Intra symbol distance Dist ($E_i$, $S_i$) is hamming distance from the emulation symbol $E_i$ to the ideal symbol $S_i$.

Inter symbol distance Dist ($E_i$, $S_j$) is hamming distance from the emulation symbol $E_i$ to the ideal symbol $S_j$, where j≠i.

Figure 23:
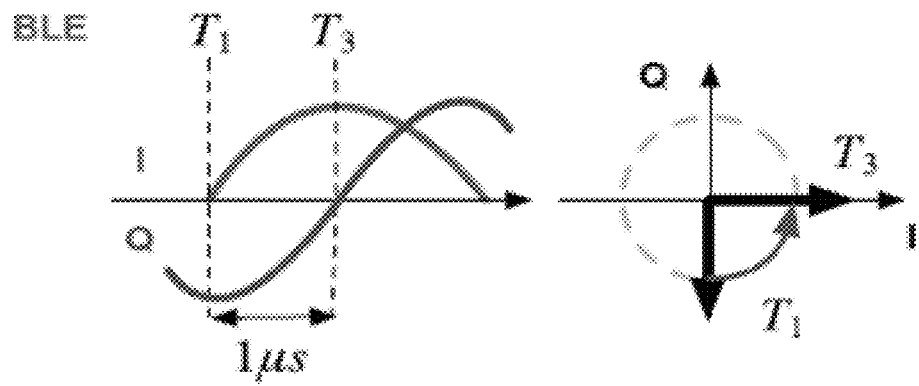
FIG. 23 is a conceptual diagram illustrating an example of optimized emulation in accordance with the techniques of the current disclosure.

FIG. 23 is a conceptual diagram illustrating an example of optimized emulation in accordance with the techniques of the current disclosure. To emulate the ideal symbol '1110', the techniques of this disclosure may generate two emulatable symbols '1100' and '1111', which have the same intra symbol distances of 1. After this, the techniques of this disclosure consider the inter symbol distance from these emulation symbol to the other two ideal symbols. For emulation symbol '1100', it has the inter symbol distance of 1 and 3 to the ideal symbol '0100' and '0010' respectively. Similarly, for emulation symbol '1111', it has the inter symbol distance of 3 and 3 respectively. As a result, the techniques of this disclosure choose the '1111' as the emulation choice, since it has the maximum value of the minimum inter symbol distance (i.e., maximum margin).

The previous example illustrates the idea of DSSS emulation in the 4-bit hamming space. The techniques of this disclosure optimize the DSSS emulation in the standard ZigBee® symbol space, following the same principles.

Each 4-bit ZigBee® symbol is mapped to 32 chips. Dividing the 32 chips into 16 consecutive pairs of chips and counting '01' or '10' yields the number of chip errors in the ZigBee® emulation by BLE, or equivalently, Dist ($E_i$, $S_i$) (i.e., intra-symbol Hamming distance). This value is constant for a given symbol, since emulation of '01' or '10' always induce 1 chip error, regardless of being emulated to '00' or '11'. For example, in FIG. 25, the intra hamming distances for all possible ZigBee® symbols are plotted. The maximum intra hamming distance is 8, such as the intra hamming distance of ZigBee® symbol '0000'. Note that the intra symbol hamming distance cannot be optimized, because there will always be one chip error at whatever bits BLE choose to emulate inconsistent ZigBee® phase shifts.

Although the intra symbol distance of each symbol is fixed, the techniques of this disclosure increase the inter symbol distance for improving the reliability. this is because the inter-symbol Hamming distance Dist ($E_i$, $S_j$), i≠j, depends on how '01' or '10' are emulated. For example, '01' can be emulated via either '00' or '11'. Therefore, a ZigBee® symbol can be emulated in $2^{Dist(E_i,S_j)}$ different sequences, where the techniques of this disclosure choose the emulation symbol with the maximum minimum inter-symbol hamming distance. This optimization can be described in the following equation:

$$\frac{\text{argmax}}{E_i} \min\{Dist(E_i, S_j), i \neq j\} \quad (6)$$

The computation is light weight with the limited search space of 0≤i, j≤15. Furthermore, this may be computed only once, and thus can be precomputed and loaded on the device prior to running the techniques of this disclosure.

Due to security concerns, the symbol transmitted by BLE is not the plain message of payload. Instead, a scramble technique called data whitening is adopted on BLE payload to randomize the matching between the payload bytes and the bytes transmitted in the air. Therefore, it is crucial to overcome the data whitening on BLE to control transmitted signal through BLE payload.

Figure 27:
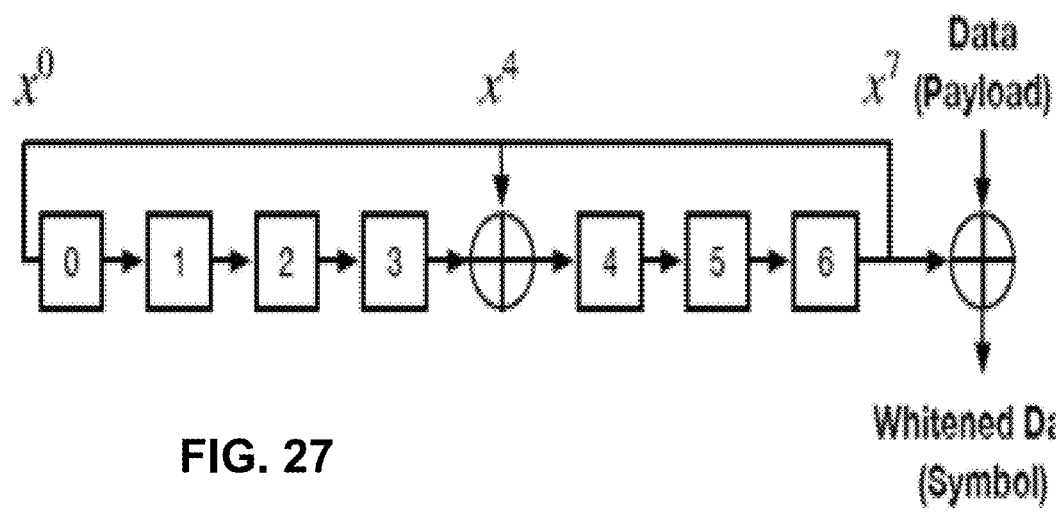
FIG. 27 is a conceptual diagram illustrating BLE data whitening through linear-feedback shift register (LFSR) in accordance with the techniques of the current disclosure.

FIG. 27 is a conceptual diagram illustrating BLE data whitening through linear-feedback shift register (LFSR) in accordance with the techniques of the current disclosure. Recent literature has shown that BLE's LFSR circuit is reversible. BLE uses the 7-bit linear feedback shift register (LFSR) circuit with the polynomial $x^7+x^4+1$ as shown in FIG. 27. The circuit is used to generate a sequence of bits to whiten the incoming data by XOR operation. The initial state of the LFSR circuit is the current channel number (e.g., from 0 to 39) in binary representation defined in the BLE specification. The techniques of this disclosure reverse engineer the whitening process to generate the BLE payload according to the chosen bytes for emulation. This makes the techniques of this disclosure fully compatible to commodity BLE devices.

One specific feature of BLE is the frequency hopping, which helps BLE devices to avoid busy channels occupied by other ISM band radios. In the techniques of this disclosure, this feature allows one BLE device to hop among the 2.4 GHz band and communicate with multiple ZigBee® devices at different channels. Furthermore, a transmitter may control BLE frequency hopping sequence, while still following BLE frequency hopping protocol.

BLE has 40 2 MHz wide channels, labeled as channel 0 to channel 39. Among them, channel 37, 38, and 39 are advertising channels and the others are data channels. Once connection is established on the advertising channels, two paired devices will hop among the data channels.

Figure 28:
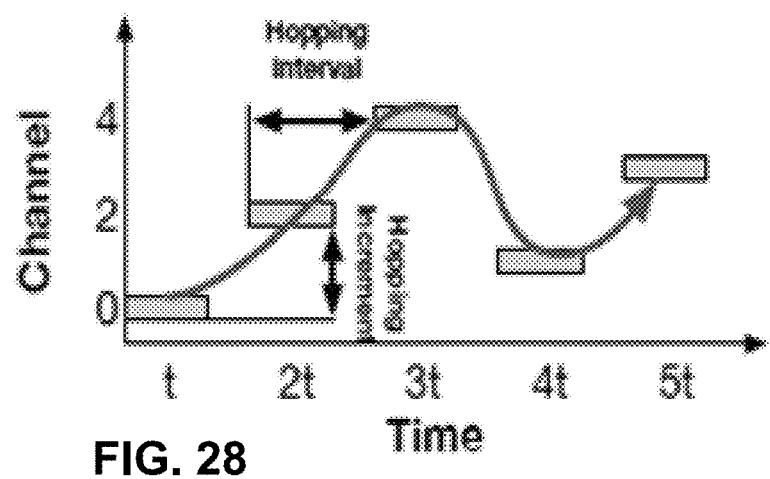
FIG. 28 is a conceptual diagram illustrating BLE normal frequency hopping in accordance with the techniques of the current disclosure.

FIG. 28 is a conceptual diagram illustrating BLE normal frequency hopping in accordance with the techniques of the current disclosure. In BLE, a simple yet effective frequency hopping protocol is used to determine the next channel to hop. The first channel is always '0', and after a time duration of hopping interval, the BLE device will hop to the next channel with an increment of hopping increment. In formula $$C_{next}=C_{current}+\text{hoppingInc}(\text{mod } 37), \quad (7)$$

where $C_{next}$ and $C_{current}$ indicate next and current channel respectively, 37 is the total number of BLE data channels, and hoppingInc is the hopping increment. In FIG. 28, a frequency hopping sequence on 5 channels (i.e., channel '0' to channel '4') with a hopping increment of 2 and hopping interval of t is illustrated.

Figure 29:
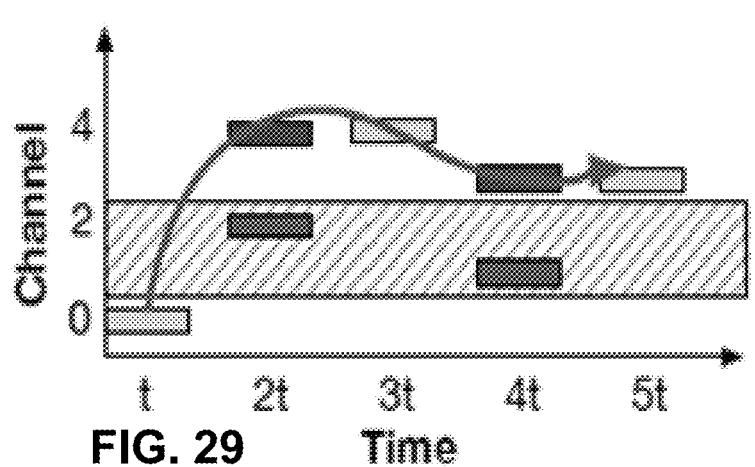
FIG. 29 is a conceptual diagram illustrating BLE adaptive frequency hopping in accordance with the techniques of the current disclosure.

FIG. 29 is a conceptual diagram illustrating BLE adaptive frequency hopping in accordance with the techniques of the current disclosure. To avoid collision with other wireless radios on the same ISM band, BLE adopts adaptive frequency hopping (AFH) when packet accept ratio is low on certain channels. In BLE AFH, a 37-bit channel map is used to maintain the channel link quality where '0' indicates a bad channel and '1' indicates a good channel. The variables $S_{good}$ and $S_{bad}$ may be used to indicate the good and bad channel sets respectively. Whenever the next channel will be a bad channel, it will be replaced by another channel in the $S_{good}$. More specifically, a remapIndex will be calculated through $$\text{remapIndex}=C_{next} \text{ mod } |S_{good}|, \quad (8)$$

and $C_{next}$ will be replaced by $S_{good}$ (remapIndex). For example, in FIG. 29, the channel 1 and channel 2 are bad channels. So, whenever BLE devices hop to these two channels, they will be remapped to channel 3 and channel 4 respectively following Equation 8.

With AFH, the frequency to visit different channels becomes uneven. For example, in FIG. 29, channel 0 will only be visited once during one hopping period (i.e., 5 hops in the example) half the frequency of channel 3 and 4. In real network environment, AFH will cause unfair services to ZigBee® nodes at BLE-ZigBee® overlapped channels (i.e., 2410, 2420, . . . 2480 MHz). In other words, the QoS of the techniques of this disclosure cannot be guaranteed. To resolve this issue, a transmitter may balance BLE's frequency of visiting overlapped channels in a non-disruptive way.

To achieve that, a transmitter may take advantage of the 37-bit channel bit map in BLE. As mentioned earlier, the channel bit map is used to calculate the next channel to hop if AFH is enabled. In addition, current BLE protocol supports the update of the channel bit map during normal transmission to adapt to the fast-changing network environment. So, a transmitter can control the hopping behavior of BLE by only updating the channel bit map. For different optimization goals in application scenarios, two concurrent solutions are proposed.

By updating the channel bit map, a transmitter can control the set of channels BLE device can hop on. To maximize the throughput of concurrent emulation, a transmitter can leave the ZigBee®-BLE overlapped channels in the channel bit map if they are marked as idle in the original channel bit map (i.e., $S_{good}$), while blacklisting the non-overlapped channels. The channel bit map may be set only once in the connection initialization stage, so the network overhead is very low. Note that the transmitter chooses a subset channels from the idle channels, so a transmitter will not disrupt the original functionality of BLE channel hopping, which is to avoid channel collision. In addition, such change is supported by BLE standard through host (i.e., user) level commands such as the HCI_set_AFH_Channel_Classification.

In some scenarios, the fairness of CTC is more important, such as the multi-channel synchronization problem. The maximum-throughput design may not guarantee a load balanced CTC on different channels. Here a simple yet effective heuristic method is proposed to balance the BLE's frequency hopping on overlapped channels while still being compliant to BLE's AFH protocol. More specifically, a transmitter can balance the traffic by slightly modify $S_{good}$ and $S_{bad}$ in the channel bit map. The basic idea is that for each unbalanced channel c (i.e., visited less than other overlapped channels), a transmitter finds another channel c' in $S_{good}$ whose remapped channel will be c. Then a transmitter marks c' as a bad channel in the channel bit map, so that whenever BLE devices hop to c', the channel will be remapped to c. Of course, a transmitter keeps $|S_{good}|$ unchanged so that the remapIndex is unchanged. To do that a transmitter chooses to mark one bad channel to be good in the channel bit map, so that $|S_{good}|$ still keeps the same.

Figure 30A:
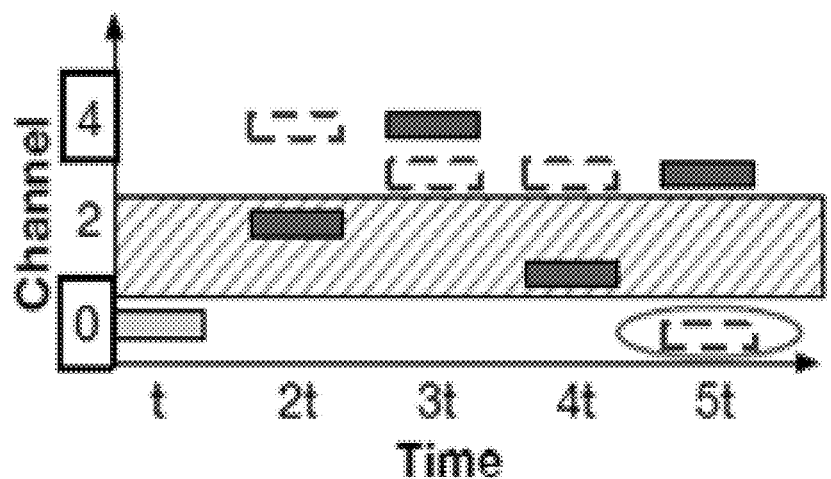
FIGS. 30A and 30B are conceptual diagrams illustrating the steps of channel scheduling in accordance with the techniques of the current disclosure.
Figure 30B:
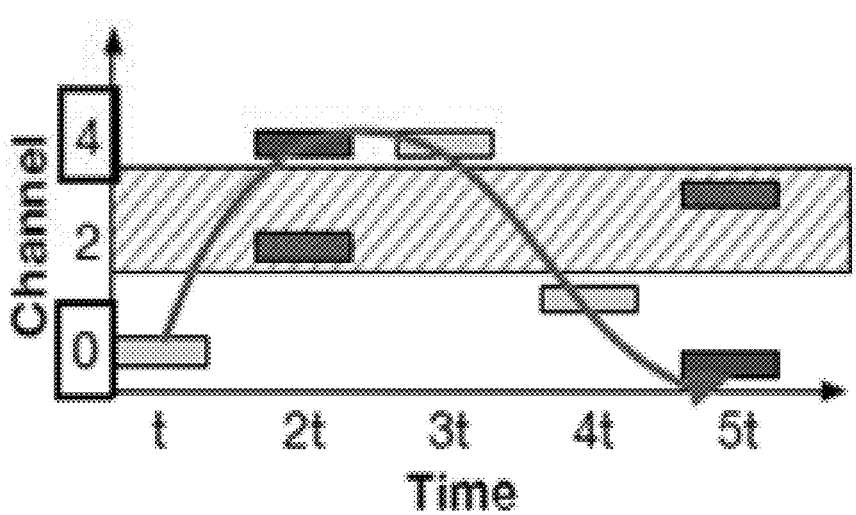

FIGS. 30A and 30B are conceptual diagrams illustrating the steps of channel scheduling in accordance with the techniques of the current disclosure. FIG. 30A and FIG. 30B shows an example scheduling algorithm. In the example, a transmitter rebalances channel 0 and channel 4. A transmitter finds channel 0 are visited less than channel 4, so a transmitter redirects frequency hopping to channel 0. It is first assumed all the channels may be remapped (marked as red), except channel one. Then a transmitter finds the channel whose remapped channel will be channel 0, which is channel 3, as shown in FIG. 30A. A transmitter adds channel 3 to $S_{bad}$ to replace one channel in $S_{bad}$, i.e., channel 1, so that $|S_{good}|$ doesn't change as shown in FIG. 30B. Finally, a transmitter has rebalanced channel 0 and channel 4. In some cases, it may be unable to balance all the overlapped channels due to too many bad channels. In that case, a transmitter may not disrupt a lot of good channel to achieve the rebalance goal.

Figure 31:
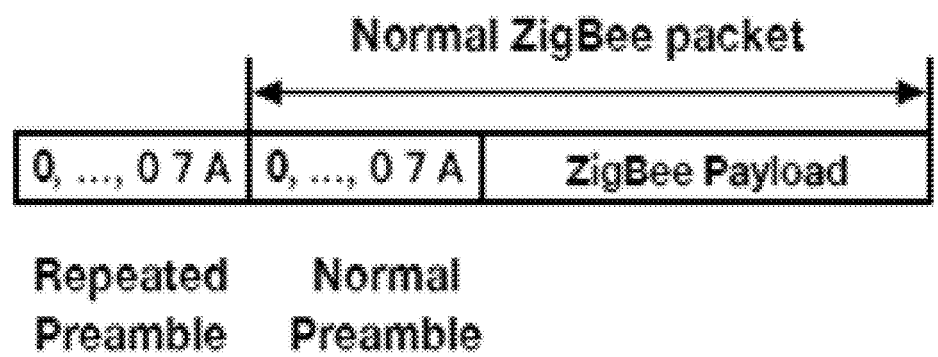
FIG. 31 is a conceptual diagram illustrating reliable CTC with repeated preamble in accordance with the techniques of the current disclosure.

FIG. 31 is a conceptual diagram illustrating reliable CTC with repeated preamble in accordance with the techniques of the current disclosure. To improve the transmission reliability, the techniques of this disclosure can transmit the same Bluetooth® packet multiple times for emulating the ZigBee® packets, in case some of the emulated ZigBee® packet is dropped at the receiver side. The ZigBee® receiver is able to receive the correct information if there is at least one copy of the same ZigBee® packet is correctly received, i.e., the packet passes through the CRC checksum as specified in the 802.15.4 standard. The frame retransmission technique is naturally compatible with the ZigBee® protocol at the receiver side. That is because the ZigBee® receiver will automatically ignore retransmitted ZigBee® frames if it has already received one according to the 802.15.4 standard.

The number of frame retransmission is related to the frame reception ratio (FRR). Assuming that the reception of each emulated ZigBee® frame is independent of the others, after transmitting k copies, a receiver will successfully receive at least one ZigBee® frame with probability $1-(1-FRR)^k$. As demonstrated in the experiment, the successful reception of the packet varies with different SNR situations. Supposing an FRR of 70%, then after 6 retransmissions, the final successful reception rate is more than 99.9%, suggesting that the techniques of this disclosure can achieve a very high FRR by simply retransmitting the emulated frames. Note that the retransmission will not cause significant overhead to the channel efficiency, since CTC is usually used for the control purpose with little total traffic demand.

In addition to the frame retransmission technique mentioned above, certain techniques of this disclosure may also utilize the repeated preamble technique to further improve the reliability. In the commodity ZigBee® chips, the demodulation of possible ZigBee® packets starts by searching for the specific preamble, which consists of eight '0' symbols, followed by the symbols 'a7', which is the start frame delimiter (SFD). Since this preamble detection is done before ZigBee® can receive any frames, it cannot be protected using upper layer coding. To improve the packet reception rate, the techniques of this disclosure send out multiple repeated preambles, as shown in FIG. 31. If the first preamble is successfully received, the ZigBee® receiver will then discard the remaining preambles in the upper layer decoding. Otherwise, ZigBee® still has a second chance to detect the preamble.

Compatibility with Bluetooth® Classic BLE is defined in Bluetooth® core specification 4:0. Another well-known Bluetooth® technique is Bluetooth® Classic, defined in Bluetooth® core specification 1:0. There are some connection and distinctive difference between these two techniques. First, in modulation, although both adopts GFSK, Bluetooth® Classic's modulation index is 0:35 while BLE's modulation index is between 0:45 and 0:55. The difference in modulation index affects the shape of the final signal. As mentioned earlier, the phase shift error brought by pulse shape can be mediated through phase shift quantization at Zig-Bee receiver, which means the techniques of this disclosure can still be used in Bluetooth® Classic. Second, Bluetooth® Classic has 79 channels distributed from 2402 MHz to 2480 MHz spaced 1 MHz apart. So, it can cover all Zig-Bee channels. Third, on the frequency hopping, Bluetooth® Classic will hop among all 79 channels following a frequency hopping pattern calculated through master device's MAC address and clock. Its hopping interval will always be 625p. The hopping interval is long enough to transmit a Bluetooth® emulated ZigBee® packets. Although the channel scheduling methods will be different, the same heuristic method can be used to find a channel scheduling solution.

The emulation reliability of the techniques of this disclosure are evaluated, including PHY-layer reliability (i.e., phase shift and hamming distance) and link-layer reliability (i.e., frame reception ratio). To provide the details, these experiments are tested under various situations, including different transmission power, distances, scenarios, and different packet duration.

Since the ZigBee®'s OQPSK demodulation may consider the closest hamming distance, the inter-symbol hamming distance also affects the accuracy of emulation. For example, after the optimization, the hamming distance difference ranges from 3 to 7, while the hamming distance difference of 3 suggests very little protection from the background noises. The optimization of the techniques of this disclosure manages to increase this hamming distance difference for the emulated ZigBee® symbols. This means that the techniques of this disclosure can tolerate more background noises than the basic design, leading to a better reliability.

In the techniques of this disclosure, a legitimate ZigBee® packet is embedded in a legitimate BLE frame. The characteristic of dual-standard compliance indicates the techniques of this disclosure can achieve cross-technology broadcast. That means that a dual-standard frame may be constructed where part of it is a ZigBee® frame and part of it is a BLE frame. Each technology can identify their parts by detecting legitimate preambles and headers while regarding the rest as noise.

The frame reception ratio (FRR) where the BLE sender sends out emulated ZigBee® frames on both USRP and commodity CC2540 development kit is evaluated. The average FRR is within 92% to 86%, demonstrating the reliability of the techniques of this disclosure, at a transmission distance of 10 m (the usual communication range between two BLE devices). Note that the FRR slightly decreases with the increasing of distance, due to the lower SNR. Even so, in all the experiments, the FRRs are all above 85%.

In BLE specification 4:2, the maximum payload for BLE has been extended from 39 bytes to 2526 Bytes, which means the frame duration will grow from around 0.3 ms to over 2 ms. The FRR with frame duration ranging from 0.3 ms to 1.2 ms is shown, following the latest standard. The increase in frame duration will slightly decreases FRR, about 2% decrease. That is because a longer frame is usually more vulnerable to environment noise and interference. Even so, over 90% FRR shows the resistance of the techniques of this disclosure to the impact of long frame.

Figure 32:
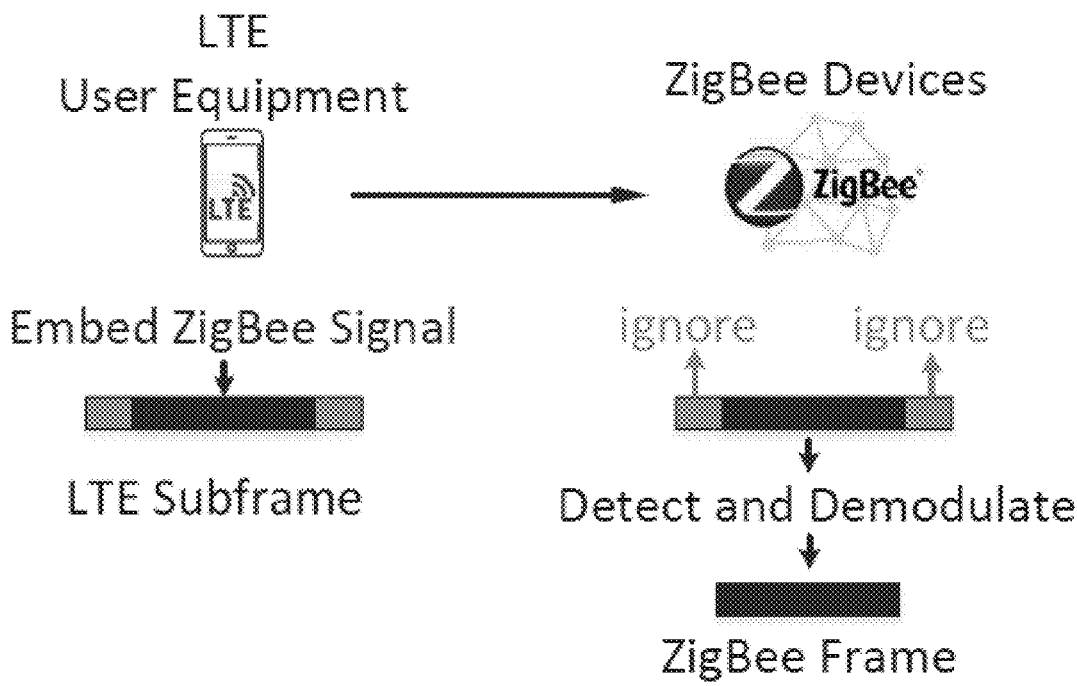
FIG. 32 is a conceptual diagram illustrating another example system architecture in accordance with the techniques of the current disclosure.

FIG. 32 shows the frame reception ratio (FRR) of the techniques of this disclosure with impact of various Tx power and distance from a USRP to a commodity CC2530 ZigBee® device for its convenience to control transmission power. When Tx power increases from −2 dBm to 2 dBm, most FRR also increases from 85% to 90%. The Tx power is fixed, and study the FRR of the techniques of this disclosure with different distances. When the distance is as far as 10 m, the FRR is still over 80%. Note that the transmission power of a typical BLE device is 0 dBm and the typical transmission range is 10 m. That means the techniques of this disclosure can work well with typical BLE setting.

Typical preamble length in ZigBee® is 8 ZigBee® symbols '0'. The number of '0's can be changed with at least four '0's. The length of ZigBee® preamble is changed from 4 symbols to 16 symbols which doubles the length of preamble. With a typical preamble length of 8 symbols, FRR is about 84%. When the preamble length is increased to 12 symbols, the FRR jumps to about 95%, a 13% improvement. The experiments prove the effectiveness of the multiple preamble technique. Even when the preamble length is reduced to 4 symbols, the average FRR is still about 78%, which shows the robustness of the techniques of this disclosure.

Personal area networks (PANs), e.g., ZigBee®/BLE networks, are traditionally believed to be private and isolated. However, in the era of the internet of things (IoT), there is an increasing need to push information from the wide-area network (WAN) to these isolated PAN devices. For example, pushing Internet weather forecasts to BLE thermostats may enable building climate control systems to be more energy efficient. In another example, switching on/off smart bulbs based on sunset/sunrise times can save electricity for local communities.

Adding a WAN interface to each PAN device defeats its intended design objectives: battery longevity and low-cost. Therefore, other solutions for accessing ZigBee®/BLE networks normally employ multi-interface gateways. However, the limitations of the gateway-based approach introduce both extra hardware cost and deployment cost to the system, Further, a single gateway cannot directly cover a large ZigBee® network, hence complicating multi-hop routing. Third, the gateways are installed in limited locations, and thus cannot support a large number of IoT applications that require wide-area mobility.

Despite the rich information available on the Internet and the ubiquitous availability of LTE, ZigBee®/BLE devices and networks remain mostly isolated. Driven by this motivation, the techniques described herein provide a simple, compatible communication system with full coverage. Ubiquitous connectivity is the key to transform conventional internet to the internet of Things. The LTE technology is currently the major force for this purpose. Using LTE smartphones, the techniques described herein leverage such a full coverage at no cost. In other words, the techniques described herein can push rich internet information via LTE smartphone almost any time and anywhere to ZigBee®/BLE nodes while eliminating the need for gateways.

Despite extensive research has been conducted in multi-hop networking, commercial wireless deployment remains mostly single-hop because the complexity introduced by multi-hop routing makes a network less robust and hard to deploy. Under full coverage, the techniques described herein eliminate the need for multiple-hop relays, significantly reducing the hardware, deployment, maintenance, and energy cost.

Further, as they are compatible with existing standards, the techniques described herein do not modify the hardware components of the LTE and ZigBee®/BLE devices. This allows fast deployment of new IoT applications on existing billions of LTE devices and legacy ZigBee®/BLE devices. These techniques are in contrast and complementary to the emerging low-power WAN (LPWAN) technologies, which require new devices.

FIG. 32 is a conceptual diagram illustrating another example system architecture in accordance with the techniques of the current disclosure. For the purposes of illustration only, the description below focuses on ZigBee®. However, the same techniques may be used for communication between LTE and other PANs, such as BLE-based PANs. An LTE user equipment (UE), e.g., a smartphone, transmits an LTE frame with carefully chosen IP payload, which can be demodulated by a commodity ZigBee® receiver as a legitimate ZigBee® packet. Because the transmitted waveform in the air emulates the standard ZigBee® signals, a part of the LTE frame will pass the ZigBee® preamble detection, and then successfully be demodulated at a commodity ZigBee® receiver.

Figure 33:
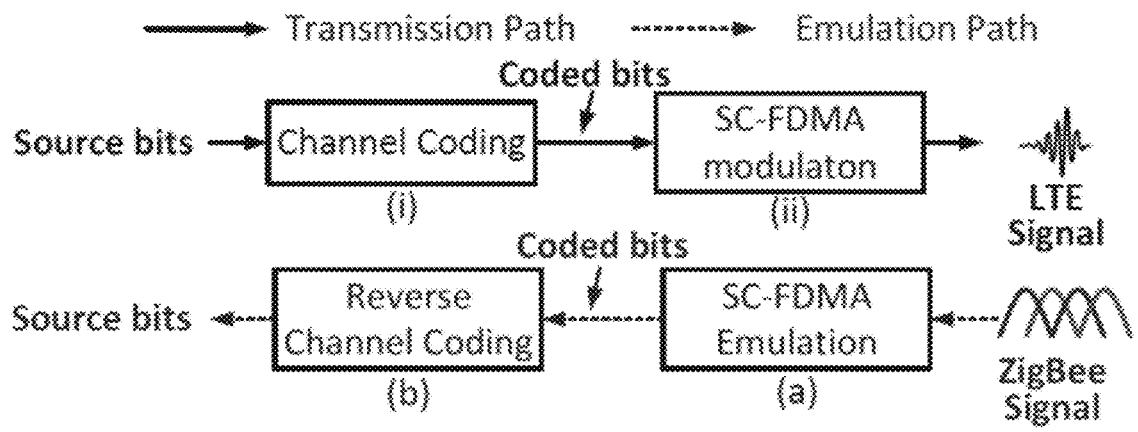
FIG. 33 is a conceptual diagram illustrating an example architecture of a transmitter device in accordance with the techniques of the current disclosure.

FIG. 33 is a conceptual diagram illustrating an example architecture of a transmitter device in accordance with the techniques of the current disclosure. The LTE transmitter converts source bits to the baseband signal in two steps: (i) source bits (called transport block in LTE) are encoded by channel coding into coded bits for robustness; and (ii) these coded bits are modulated by SC-FDMA modulation into a baseband signal.

The techniques described herein take the emulation path which is the inverse of the transmission path. Given a targeted ZigBee® signal, the techniques described herein first determine the LTE baseband signal that can emulate this targeted signal, and then calculate the coded bits that generate this LTE baseband signal. Having determined the coded bits, the techniques described herein reverses channel coding to derive source bits, which will further determine the payload in the IP packets.

Figure 34:
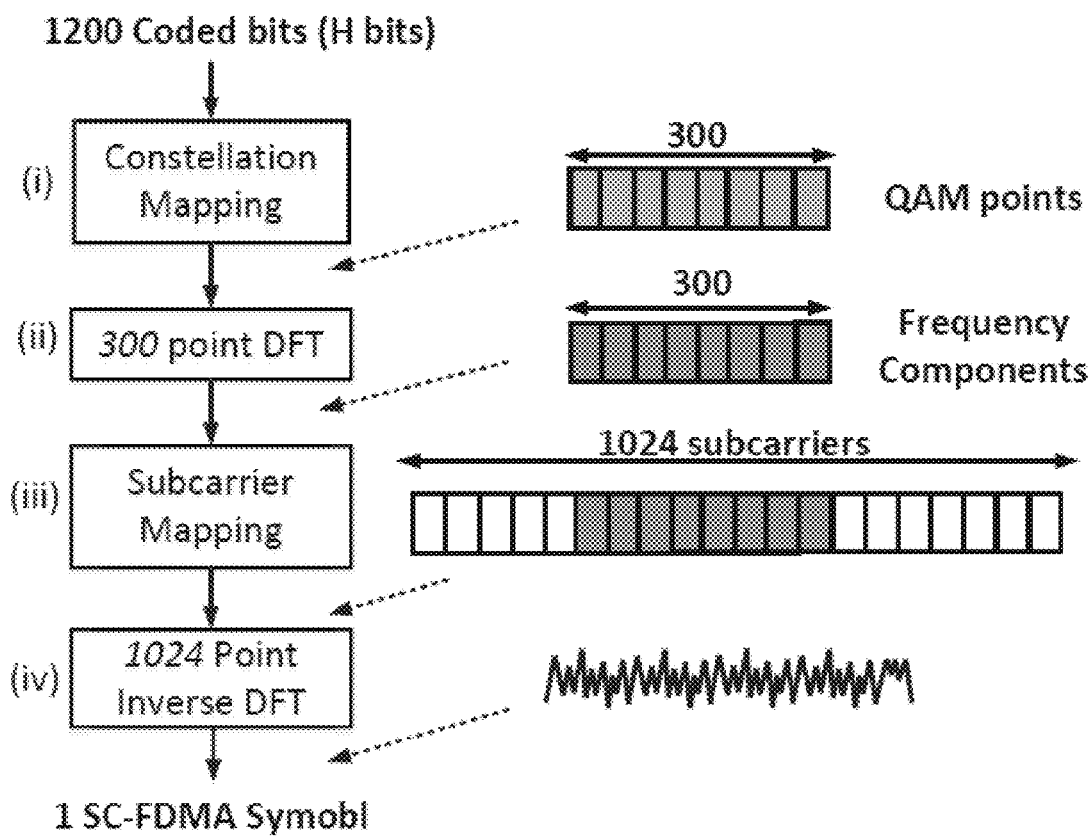
FIG. 34 is a conceptual diagram illustrating an example single-carrier frequency-division multiple access (SC-FDMA) modulation in accordance with the techniques of the current disclosure.

FIG. 34 is a conceptual diagram illustrating an example single-carrier frequency-division multiple access (SC-FDMA) modulation in accordance with the techniques of the current disclosure. Single-carrier FDMA (SC-FDMA) is the modulation method adopted by the LTE uplinks. FIG. 34 uses an example to illustrate how the coded bits ("H bits" in LTE standard) are modulated to the baseband signal by SC-FDMA module. LTE has multiple bandwidths and modulation schemes, and for the sake of clarity, a specific setting may be used as an example: total bandwidth is 10 MHz (1024 subcarriers of 15 KHz) in which 4.5 MHz (300 subcarriers) are allocated to the uplink of the LTE UE. Further, the modulation scheme is 16QAM.

Every 1200 coded bits are mapped to a set of 300 QAM constellation points. These QAM points are transferred into a set of 300 frequency components by performing 300-point discrete Fourier transfer (DFT). Then the set of frequency components are mapped to the frequency range assigned to the Physical Uplink Shared Channels (PUSCH) transmission. Specifically, 300 complex-valued frequency components are assigned to a continuous partition in a subcarrier vector of length 1024, while other 724 subcarriers in the vector are set to zero. After that, discrete Fourier transfer (IDFT) combine all the 1024 subcarriers and transfer them into a time-domain SC-FDMA symbol. As described below, twelves SC-FDMA symbols will be concatenated with guarding intervals (cyclic prefix) and reference signal into a PUSCH subframe.

Figure 35:
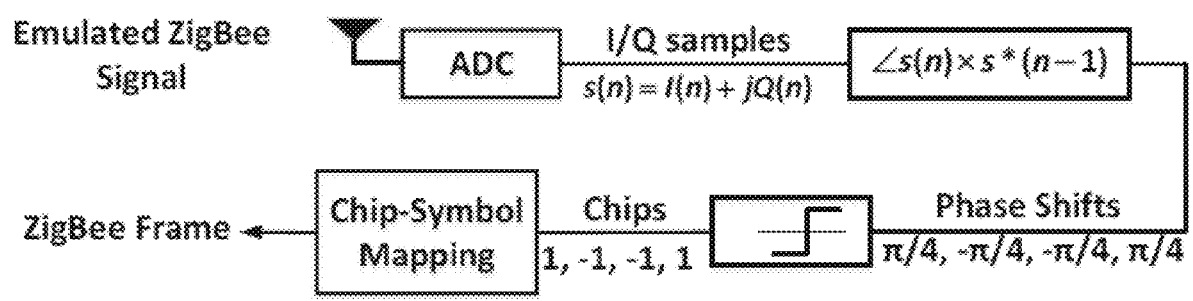
FIG. 35 is a conceptual diagram illustrating an example demodulation process performed by the receiver device in accordance with the techniques of the current disclosure.

FIG. 35 is a conceptual diagram illustrating an example demodulation process performed by the receiver device in accordance with the techniques of the current disclosure. Particularly, FIG. 35 explains how ZigBee® devices demodulate the emulated frame using the standard OQPSK (Offset Quadrature Phase Shift Keying) demodulator. First, the baseband signal is sampled by ADC using 4 MHz sample rate to generate discrete I/Q samples of the ZigBee® signal: s(n). Second, the phase shifts, i.e., angles between consecutive samples are computed from arctan(s(n)×s*(n−1)), where s*(n−1) is complex conjugate of previous sample s(n−1). Third, positive and negative phase shifts are quantized to 1 and −1 respectively, which corresponds to ZigBee® chips 1 and 0. Last, a set of 32 ZigBee® chips are mapped to one of 16 ZigBee® symbols by matching the received chip sequences with the ideal DSSS sequences of each symbol defined in a symbol-to-chip mapping table. Note that, due to the inherent redundancy in DSSS, a small number of chips include errors due to imperfect emulation can be tolerated by DSSS.

Certain techniques described herein determine the exact coded bits which will create a waveform recognized by a ZigBee® receiver after the SC-FDMA modulation. By selecting independent frequency components for each subcarrier, as is done using other techniques of emulating ZigBee® signals with WiFi®, the OFDM modulator of WiFi® can produce emulated ZigBee® waveform. However, the method cannot be adopted because the values of frequency components of each subcarrier in SC-FDMA are constrained, i.e., cannot be independently selected.

However, if the effect of "Subcarrier Mapping" is ignored, "Discrete Fourier Transform" and "Inverse Discrete Fourier Transform" are opposite operations and will cancel each other out, so that the "QAM" sequence generated from the coded bits will directly determine the output waveform of SC-FDMA. This provides a straightforward way of signal emulation: emulate ZigBee® waveform directly from time-domain.

Figure 36:
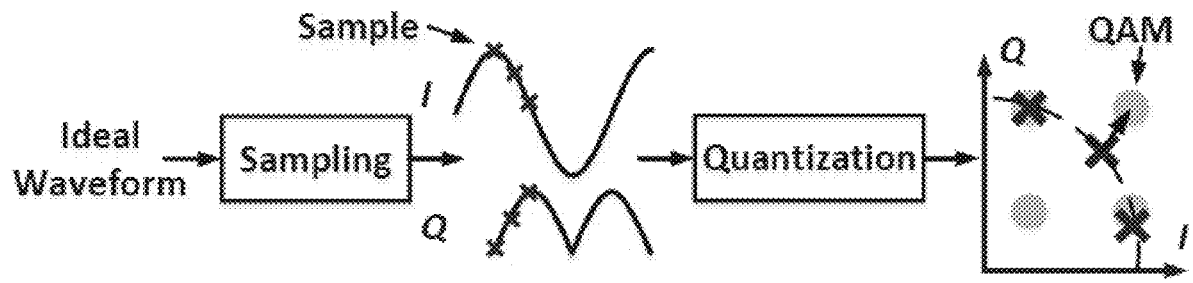
FIG. 36 is a conceptual diagram illustrating an example signal emulation in a time domain in accordance with the techniques of the current disclosure.

FIG. 36 is a conceptual diagram illustrating an example signal emulation in a time domain in accordance with the techniques of the current disclosure. FIG. 36 demonstrates how to use QAM samples to approximate the ideal OQPSK waveform under the constraints of LTE transmitter. This process takes two steps: Sampling and Quantization. In the sampling step, the LTE transmitter has a limited set of sample rates (equal to the allocated uplink bandwidth). The ideal waveform needs first to be sampled at a valid sample rate, e.g., 4.5 MHz, which produces a sequence of ideal samples. In the quantization step, each LTE sample can only take the values of discrete QAM points. To minimize the distortion of the emulated signal, LTE transmitter makes the best effort to approximate the value of each sample. Since samples in the time domain are mutually independent, this is equivalent to quantize the value of each sample to its closest QAM point on the constellation.

To evaluate the feasibility of the algorithm, the techniques described may emulate random ZigBee® frames with 16QAM constellation and all the valid LTE sample rates (PUSCH bandwidths). The transmitter computes the mean square error (MSE) by comparing the emulated signal with the ideal signal to demonstrate the accuracies of emulation.

Figure 37:
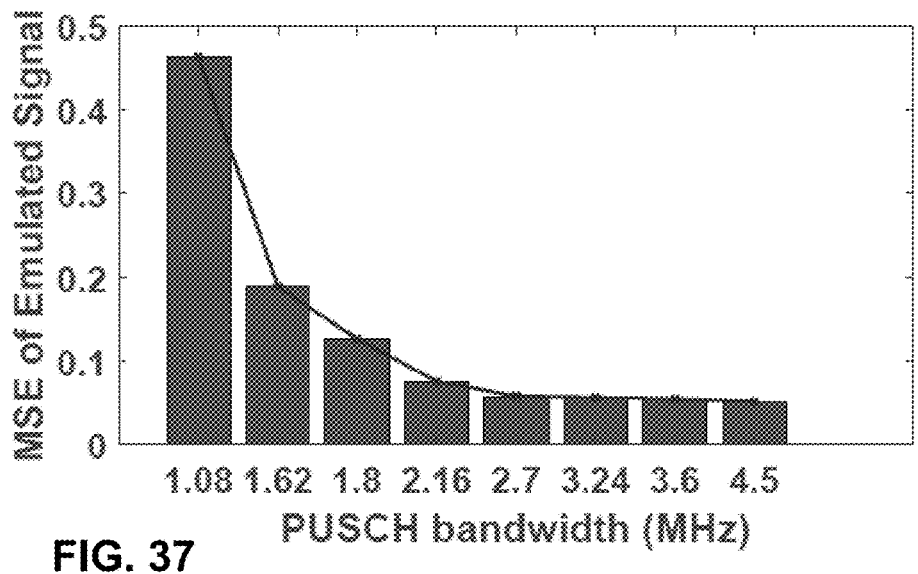
FIG. 37 is a conceptual diagram illustrating example bandwidth and emulation errors in accordance with the techniques of the current disclosure.
Figure 38:
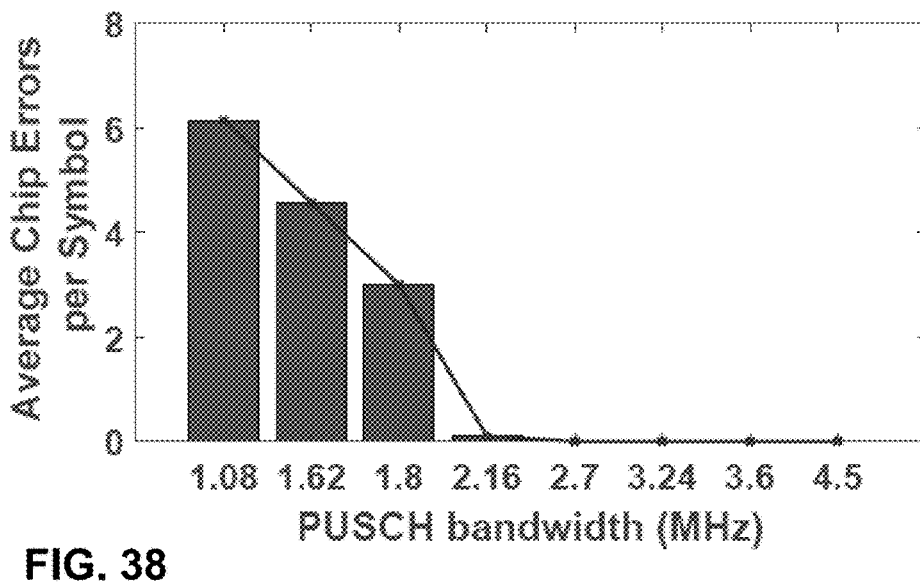
FIG. 38 is a conceptual diagram illustrating example bandwidth and average chip errors in accordance with the techniques of the current disclosure.

FIG. 37 is a conceptual diagram illustrating example bandwidth and emulation errors in accordance with the techniques of the current disclosure. FIG. 38 is a conceptual diagram illustrating example bandwidth and average chip errors in accordance with the techniques of the current disclosure. As shown in FIGS. 37 and 7, both the emulation errors and chip errors decrease as the sample rates increases. Although the emulation errors to zero may not be reduced to zero, the chip errors indeed go to zero when sample rate is larger than 2.16 MHz. This conforms with the fact that ZigBee® receivers perform quadrature demodulation, where the sign of phase shifts between two samples, instead of the values of these samples, are used to demodulate. Note that in order not to cause interference to the adjacent ZigBee® channel, the bandwidth should be less than the ZigBee® channel spacing, which is 5 MHz. Some examples may use 4.5 MHz in implementing the techniques described herein.

FIGS. 39A and 39B are conceptual diagrams illustrating example emulated signals in time domains and phase shifts/chips, respectively, in accordance with the techniques of the current disclosure. FIG. 39 shows a proof-of-concept example with the ZigBee® symbol '0' emulated by 16QAM points at 4.5 MHz. In FIG. 39A, the emulated signal is compared with the ideal one. Clearly, with constrained sample rates and sample values, the signal emulation described herein can still approximate the ideal signal well. The emulated signal and the ideal waveform produce similar phase shifts and thus the same chip values as FIG. 39B demonstrates.

Knowing the feasibility of QAM emulation, the subcarrier mapping may be placed back into the workflow. As shown in FIG. 34, the "Subcarrier Mapping" process zero-pads the positive and negative ends of these 300 frequency points to generate 1024 frequency components. Zero padding samples in the frequency domain are equivalent to upsampling the signal in the time domain (interpolating values between samples), so intuitively the module will not distort the desired waveform.

"Subcarrier Mapping" does make serious distortions to the waveform. To demonstrate this, a sequence of 16QAM symbols that rotate randomly around the octangular path as the input of SC-FDMA is generated. After SC-FDMA, the output signal is not the upsampled version of original waveform, meaning that subcarrier mapping distorts the desired signal.

Such a distortion is due to the constrained subcarrier mapping. FIG. 40 is a conceptual diagram illustrating an example subcarrier mapping process in accordance with the techniques of the current disclosure. As FIG. 40 shows, the output of "300-point DFT" is the frequency components of the original QAM sequence, which starts with DC component followed by positive frequency components and then negative frequency components. This is the conventional way of expressing DFT output: the indices of frequency components start from zero (DC), and the negative components are copied from left to the right side. However, the problem is that subcarrier vector used for IDFT does not follow the same convention. It follows the convention of ordering subcarriers in the spectrum: DC subcarrier is in the middle of the 1024-point vector with positive subcarriers on the right head side and negative ones on the left. "Subcarrier mapping" just maps the DFT output directly onto a partition of the vector. As a result, the final time domain signal after IDFT is one with exchanged positive and negative frequency components: The positive components in the input signal become negative components in the SC-FDMA output while the original negative components become the DC and positive components.

To tackle the constraint caused by subcarrier mapping, the techniques described herein utilize the following signal processing techniques to pre-process the input signal, so that the output signals affected by SC-FDMA are correct. One such process is exchanging the positive and negative frequency components of the signal, which is equivalent to negate the odd-index samples in the time domain.

FIGS. 41A and 41B are conceptual diagrams illustrating example time sequences in accordance with the techniques of the current disclosure. FIGS. 41A and 41B show an example of +/− frequency component exchange. The solid arrows in the FIG. 41A depict the input time-domain sequence containing four samples ($S_0$:0010→$S_1$:0001→$S_2$: 1001→$S_3$: 1010). As for the results after SC-FDMA modulation, SC-FDMA modulation negates the samples with odd indices, i.e., $S_1$ and $S_3$, so that these two samples will rotate around the origin by 180 degrees. As a result, $S_1$ and $S_3$ become 1101 and 0110 respectively. Meanwhile, the samples with even index will be intact. As FIG. 41B shows, the resulting time-domain sample sequence looks diverse from the original one.

This discovery leads to a key design that solves the +/−frequency exchange problem. For the targeted time-domain sequence $S_0, S_1, \ldots, S_{N-1}$, the techniques described herein pre-processes this sequence to generate $S'_0, S'_1, \ldots, S'_{N-1}$, where $S_{2i}=S'_{2i}$, and $S_{2i+1}=-S'_{2i+1}$ ($0 \le i \& i \in Z$). In other words, the techniques described herein pre-process the sequence, so that the pre-processing cancels out the impacts of the frequency exchange effects introduced by SC-FDMA. After the preprocess, SC-FDMA output of sequence is identical to its upsample.

FIG. 42 is a conceptual diagram illustrating an example Physical Uplink Shared Channel (PUSCH) subframe structure in accordance with the techniques of the current disclosure. The techniques described herein generate one Zig-Bee® frame with one LTE subframe. As FIG. 42 shows, every 16QAM constellation may not be controlled due to the existence of reference signal (DMRS) in the 4th and 11th symbols. Specifically, the duration of each DMRS is 71.35p, which will destroy four ZigBee® symbols if the emulated signal tries to cover these areas. Thus, the techniques described herein utilizes the middle six LTE symbols between two DMRS for ZigBee® emulation. Zig-Bee® receiver will ignore DMRS and other symbols. The maximum duration of the emulated frame is 428.6p, which corresponds to 26 ZigBee® symbols.

As shown in FIG. 42, LTE appends Cyclic Prefix (CP) in front of each symbol to eliminate inter-symbol interference (ISI). Such a design introduces distortion in emulated signals. Specifically, each CP produces 4.7 μs noise, polluting six ZigBee® symbols with only 4 chip errors for each symbol on average. FIG. 43 is a conceptual diagram illustrating an example solution to cyclic prefix (CP) constraints in accordance with the techniques of the current disclosure. Although this emulation constraint can be tolerated by DSSS in ZigBee®, extra steps may be taken to avoid emulation in the CP fragments as shown in FIG. 43. Specifically, a sample targeted signal is sampled to the LTE baseband sample rate (15.36 MHz=1024×15 KHz). Then those samples located in CP fragments are removed. The samples without CP fragments are then downsampled to 4.5 MHz. And from there, the transmitter starts 16QAM emulation, ending up with the output of coded bits.

Figure 44:
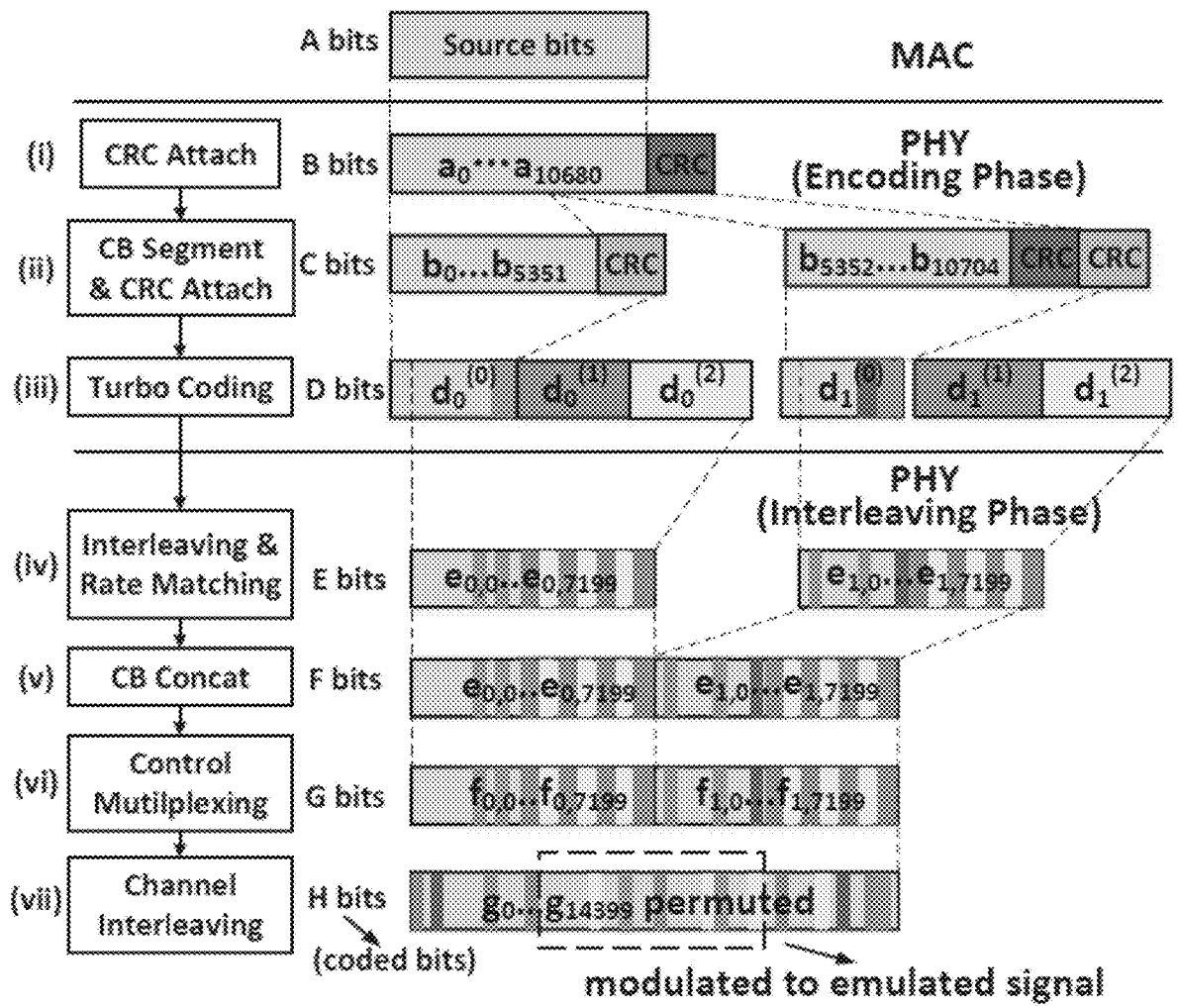
FIG. 44 is a conceptual diagram illustrating an example channel coding data flow in accordance with the techniques of the current disclosure.

FIG. 44 is a conceptual diagram illustrating an example channel coding data flow in accordance with the techniques of the current disclosure. To explain the reverse engineering process in detail, the complicated channel coding scheme in LTE is introduced. In the following description, it is assumed that the bandwidth for Physical Uplink Shared Channels (PUSCH) is 4.5 MHz and that MCS is 20. FIG. 44 shows the channel coding procedure involves seven steps, outputs of which are named by a letter in the alphabet order. These may be grouped into two phases: encoding and interleaving.

The encoding phase produces redundant bits from source bits for robustness in three steps. First, the PHY calculate and append a Type-24A CRC to the whole 10680 source bits ("A bits"), which generates "B bits". Then "B bits" are segmented into two 5352-bits codeblocks. PHY generates and attaches Type-24B CRC to each codeblocks and send codeblock+CRC ("C bits") to the turbo encoder. Finally, each "C bits" codeblocks are individually encoded by a turbo encoder with one-third coding ratio into one "D bits" block which contains 3 subblocks: the original "C bits" ($d^{(0)}_r$) and two parity subblocks ($d^{(1)}_r, d^{(2)}_r$), r=0,1.

The interleaving phase takes an additional four steps, in which 7200 bits are collected by a rate matcher from each "D bits" block and concatenated. Then interleaver permutes the concatenated 14400 bits according to the pattern defined in. As the bottom part of FIG. 44 shows, the coded bits ("H bits") are created after interleaving, in which the middle 7200 bits produce the middle six SC-FDMA symbols in the subframe for ZigBee® emulation. These seven steps may be reversely permeated. In other words, given the desired "H bits" from SC-FDMA emulation, the "A bits" may be determined.

Figure 45:
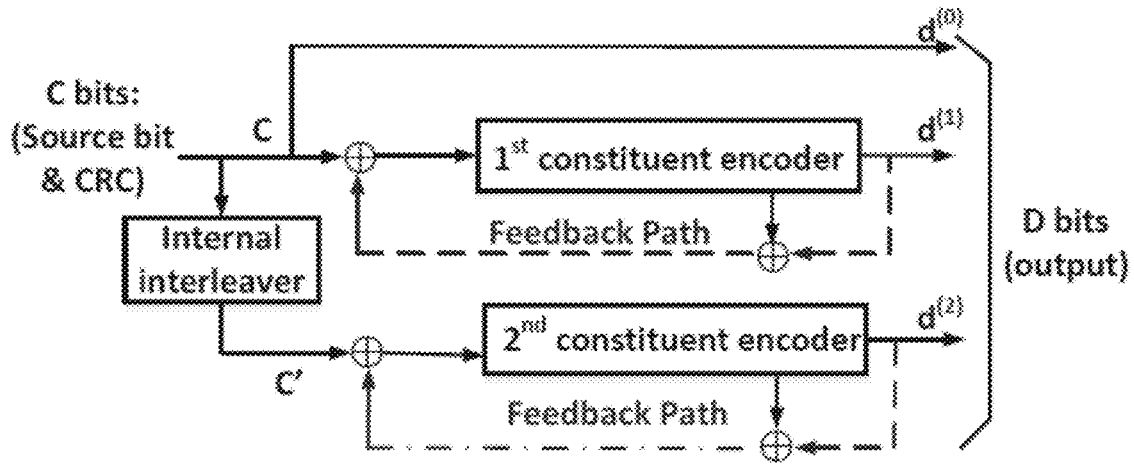
FIG. 45 is a conceptual diagram illustrating an example turbo encoding process in accordance with the techniques of the current disclosure.

FIG. 45 is a conceptual diagram illustrating an example turbo encoding process in accordance with the techniques of the current disclosure. The interleaving phase is deterministic and thus reversible. In contrast, the reversing coding phase is more challenging. Specifically, in the transmission path, turbo encoder takes input bits and computes the output coded bits. Since the techniques described herein to enable a transmitter to transmit the data following the existing protocol stack, it has to reversely compute the input bits with the given output bits. However, the turbo coding inputs are constrained in the following two ways.

The techniques described herein are fully compatible with LTE protocol, so the input of turbo encoder must contain CRC bits, which are calculated from the source bits. Although the lengths of CRC bits are limited, i.e., 24 bits, they will pollute majority of 16QAM symbols if ignored. In specific, as FIG. 45 shows, some CRC bits are permuted to the start of the input by the internal interleaver and the noise they create in the output will last until the end of coding because the feedback path continuously sends the noise back to the input. For the first codeblock, certain CRC bits will influence more than 250 coded bits.

In order to be compliant with the protocol, source bits coming from MAC layer inevitably contains protocol headers. As shown in FIG. 45, the source bits including headers are directly written into the first output subblock $d^{(0)}$. Thus, these coded bits may not be controlled via modifying the IP payload. If source bits contain a TCP/IP header (34 bytes), 155 "H bits" are polluted, which dramatically reduces the signal's SNR. Such impact may be minimalized through RLC segmentation.

Figure 46:
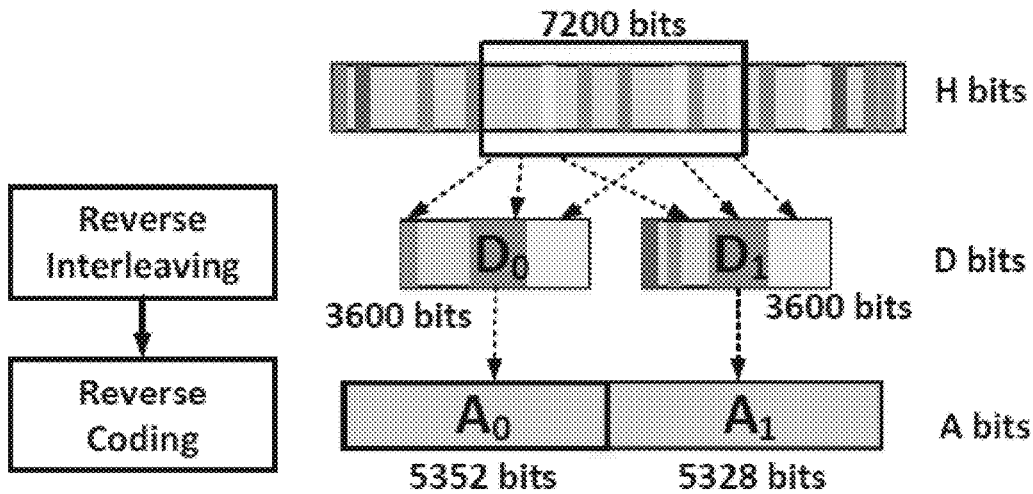
FIG. 46 is a conceptual diagram illustrating an example reverse channel coding data flow in accordance with the techniques of the current disclosure.

FIG. 46 is a conceptual diagram illustrating an example reverse channel coding data flow in accordance with the techniques of the current disclosure. FIG. 46 depicts two steps for the reverse channel coding. Interleaving reverser maps the middle 7200 "H bits" to two 3600 "D bits" blocks, $D_0$ and $D_1$. Then coding reverser computes corresponding "A bits" segments, $A_0$ and $A_1$. The mapping table is precalculated between "H bits" and two turbo coding output segments: $D_0$ and $D_1$. So interleaving reverser can undo the multiple rate matching and interleaving operations in one step.

With the given output bits of turbo coding, the legitimate input bits may be found that prevent the pollution of uncontrolled CRC. To deal with these problems, a reverse encoding phase may be implemented. Turbo Coding, while complicated, only involves linear operations and thus can be represented as matrix multiplication. Although the CRC in the turbo coding input may not be directly controlled, these CRC are computed from other input bits, i.e., payload. CRC computation is also linear. Thus, the high-level idea is that the payload may be found by solving two linear equation systems.

Figure 47:
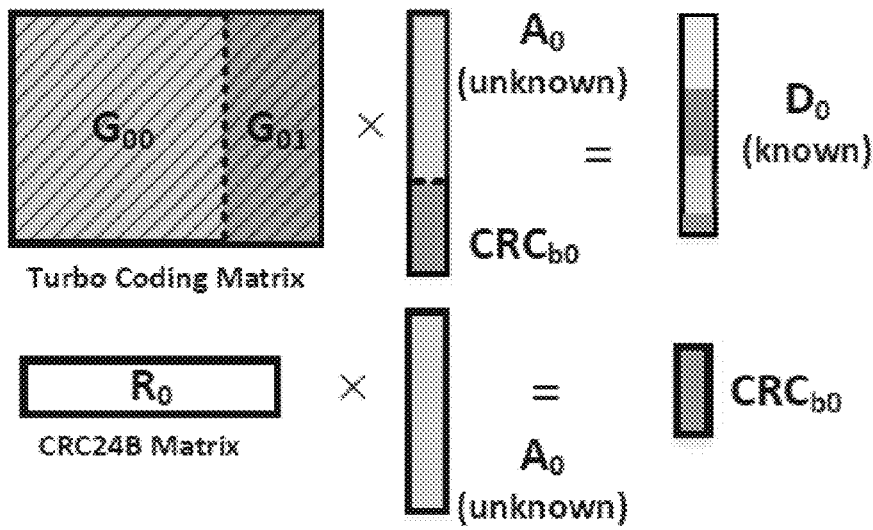
FIG. 47 is a conceptual diagram illustrating an example turbo coding matrix and an example cyclic redundancy check (CRC) matrix in accordance with the techniques of the current disclosure.

FIG. 47 is a conceptual diagram illustrating an example turbo coding matrix and an example cyclic redundancy check (CRC) matrix in accordance with the techniques of the current disclosure. As the illustrated in FIG. 47, it is able to represent the turbo encoding procedures for the coded bits $D_0$ via matrix multiplications in Galois field GF(2). Specifically, the matrix $G=[G_{00}G_{01}]$ is the coding matrix converted from the turbo encoder utilized in LTE. In addition, inside the input bits $A_0$ comes from source bits, which can be controlled by the payload, while $CRC_{b0}$ are the CRC bits computed from $A_0$.

As a result, the turbo coding procedure may be summarized using the following formulas:

$$[G_{00}G_{01}]\times_{GF(2)}[A_0 CRC_{b0}]^T = D_0 \quad (9)$$

$$R_0 \times_{GF(2)} A_0 = CRC_{b0} \quad (10)$$

To solve the input bits $A_0$, the transmitter implementing the techniques described herein solve this linear equation system. By replacing $CRC_{b0}$ with equation (10), the transmitter may use the following equation:

$$(G_{00}+G_{01}\times_{GF(2)}R_0)\times_{GF(2)}A_0 = D_0 \quad (11)$$

Since this equation is full row rank, the transmitter is able to compute the corresponding input bits $A_0$ with any wanted coded bits $D_0$. As for the second codeblock, this problem has the same form of the first codeblock, while it has one additional constraint of the CRC bits $CRC_a$. The transmitter solves this linear equation system following the similar procedures for computing $A_1$. Solving a large system of equations is time-consuming. To provide real-time performance, the transmitter can compute the matrix for particular solution offline so that online calculating $A_0$ and $A_1$ will only involve two linear transformations.

Figure 48:
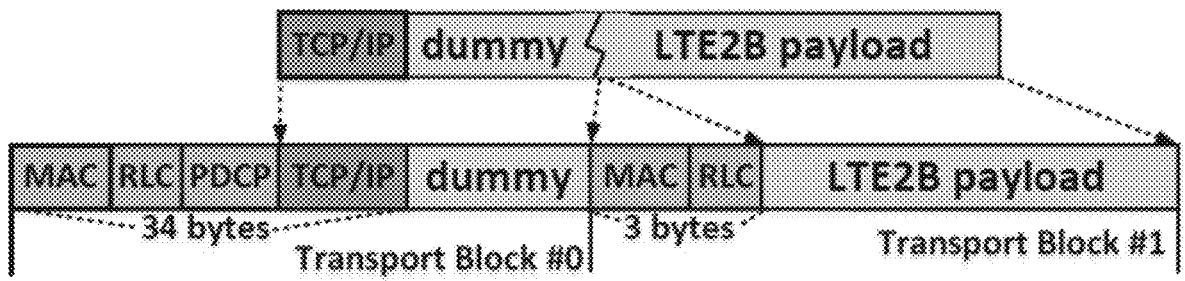
FIG. 48 is a conceptual diagram illustrating an example of radio link control (RLC) segmentation in accordance with the techniques of the current disclosure.

FIG. 48 is a conceptual diagram illustrating an example of radio link control (RLC) segmentation in accordance with the techniques of the current disclosure. Some coded bits are only controlled by the header bits, which are non-configurable. To reduce the impacts of header bits, the techniques described herein leverage the RLC segmentation feature to minimize the length of header bits in the transport block that contains the emulated payload. As FIG. 48 shows, when the size of a packet is larger than the capacity of a subframe, the RLC layer will segment it into two transport blocks. Thus, by appending a carefully chosen number of dummy bits, the TCP/IP headers can be segmented into a separated transport block. There are only 3 bytes of the header left, which introduce, at most, 7 polluted coded bits. Considering the DSSS in ZigBee® provides tolerance to these small errors, the techniques described herein remain reliable.

The techniques described herein bridge the WAN technology (e.g., LTE) with PAN technology (e.g., ZigBee®). In contrast with previous CTC approaches, the techniques described herein implement with a generic scheme to tackle unique constraints in SC-FDMA modulator and emulate ZigBee® and/or BLE signals with high accuracy. Through SC-FDMA emulation, the IP payload of a data packet can penetrate thirteen layers of complicated coding and modulation in LTE and generates correct phase shift for OQPSK demodulation in ZigBee®. The techniques described herein are compliant with existing standards and has been implemented in commercial COTS devices with 99% accuracy over a long distance (e.g., 400 m).

More than 80% symbols have no chip errors. The error distribution in the CP-polluted symbols (symbol overlapped with uncontrollable cyclic prefix) may be compared with CP-free symbols. The majority of chip errors are caused by cyclic prefixing, showing the accuracy of the techniques described herein. Also, the most hamming distances of CP-polluted symbols are less than 10, which can be tolerated by DSSS. Emulating an OQPSK signal defined in time domain directly via QAM samples that is also in time-domain can yield significantly fewer emulation errors than approximating the converted frequency domain version of the signal using QAM frequency components.

Due to the accurate signal emulation, the techniques described herein are reliable in the indoor scenarios and outdoor scenarios when the communication distance is less than 180 m. To support reliable communication for longer distance, e.g., 400 m, the frame may be transmitted multiple times. The techniques described herein can achieve 99% frame reception rate by repeating the frame rate 3 times for 300 m and 4 times for 400 m.

The techniques described herein are designed to work with the mobile applications. For example, ambulances equipped with In-vehicle LTE can directly control ZigBee® traffic lights. Moreover, the ZigBee® receiver preserves energy by doing low power listening with varying duty cycle ratio while one LTE frame is repeated 50 times by a smartphone. When the user walks or bicycles, a 5% duty cycle ratio is enough to guarantee reliable message delivery. In the driving scenarios, the reliable communication needs only a 10% duty cycle ratio.

To evaluate the generality of the techniques described herein, the same technology may be used to emulate Bluetooth Low Energy waveforms. SC-FDMA modulation may be used to emulate a 14 Bytes BLE advertisement frame. Note that BLE does not provide redundancy mechanism (e.g., DSSS), thus a one-bit error will lead to packet loss. The requirement of accuracy for emulating BLE signal is much higher than that of emulating ZigBee®. From the emulated waveform, the techniques described herein are able to emulate GFSK waveform of BLE well. The emulation scheme described herein is both robust and general so that it can be further applied to the cross-technology communication with various kind of wireless technologies.

Additional techniques may extend similar techniques to communicate between an LTE network device and a WiFi® network device). The LTE network is being extended to the unlicensed band, coexisting with the WiFi® network. However, due to their incompatible physical and media access control, there are severe collisions between the two technologies, which leads to low throughput, long latency, and high energy consumption. These additional techniques achieve explicit coordination between these two technologies, requiring no hardware modification, conforming to LTE and WiFi® standards, and being transparent to existing software.

By carefully choosing the LTE payloads in the application layer, an LTE base station may generate emulated WiFi® clear-to-send frames. WiFi® devices may refrain from outputting signals during the time period specified by clear-to-send frames, protecting the LTE data frames.

Figure 49:
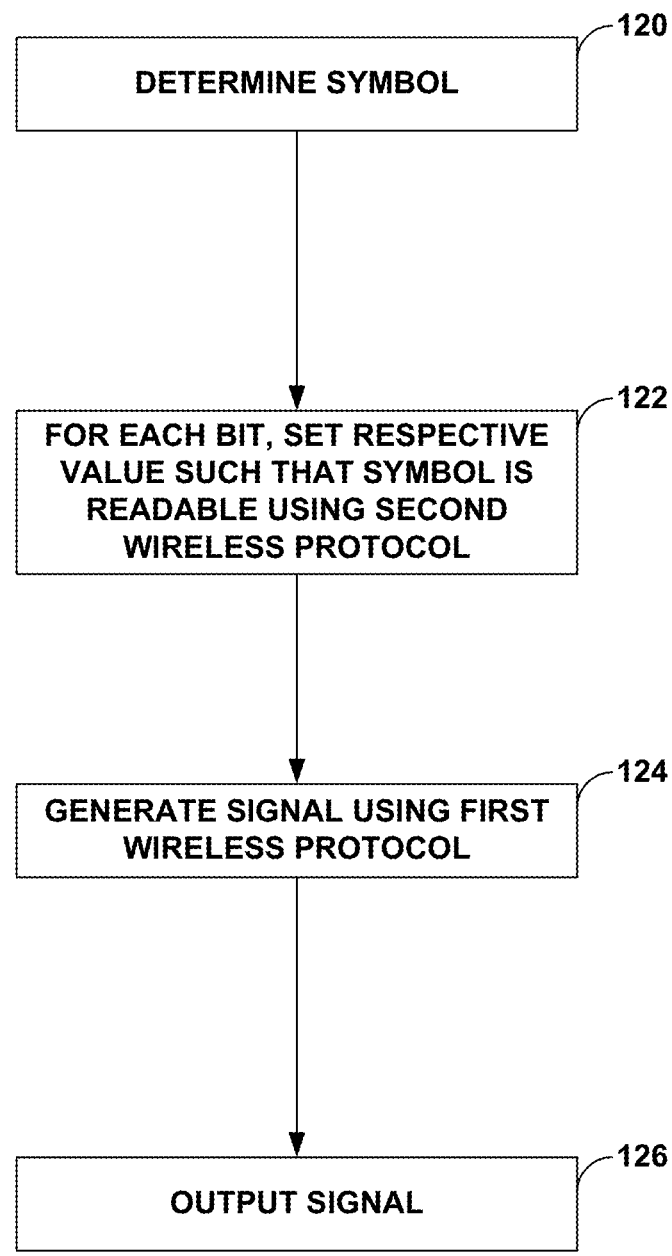
FIG. 49 is a flow diagram of one or more techniques of the current disclosure.

FIG. 49 is a flow diagram of one or more techniques of the current disclosure. The operations of FIG. 49 may be performed by one or more processors of a computing device, such as transmitter 2 of FIG. 1 or FIG. 2. For purposes of illustration only, FIG. 49 is described below within the context of transmitter 2 of FIG. 1.

In accordance with the techniques of this disclosure, emulation module 4 may determine (120) a symbol to be sent to receiver 12. As described above, however, transmitter 2 and receiver 12 may be configured to operate in accordance with two different wireless protocols. Receiver 12 may not be configured to operate in accordance with the first wireless protocol. In some examples, the symbol may be one or more of an informative symbol or a command to perform an action.

In some examples, in determining the symbol, emulation module 4 may determine an ideal symbol to be emulated by transmitter 2. Emulation module 4 may then determine, for each of two emulatable symbols, a respective minimum inter-symbol distance, where each of the two emulatable symbols has a same intra-symbol distance. Emulation module 4 may then select a first emulatable symbol of the two emulatable symbols that has a larger minimum inter-symbol distance.

In some instances, the determined symbol may be an initial symbol. In such examples, emulation module 4 may determine a desired symbol to send to receiver 12. Emulation module 4 may then determine the initial symbol such that an application of a data whitening process to the initial symbol results in the desired symbol. For each bit of the plurality of bits included in the payload of the data packet that is associated with the initial symbol, emulation module 4 may then set the value of the respective bit to be the initial symbol.

For each bit of a plurality of bits included in a payload of a data packet that is associated with the symbol, emulation module 4 may set (122) a value of the respective bit such that the symbol, when the data packet is translated into at least one signal using the first wireless protocol, is readable using the second wireless protocol.

In some examples, in setting the bits of the payload, emulation module 4 may structure the payload of the data packet such that it includes header bits in a format consistent with the second wireless protocol. In some examples, to increase accuracy, emulation module 4 may begin the payload of the data packet with two instances of the same header repeated, increasing the likelihood that receiver 12 acknowledges the data packet. As such, emulation module 4 may, for each bit of a second plurality of bits that form a header included in the payload of the data packet, set a value of the respective bit in the header such that the header includes a first preamble of bits followed by a second preamble of bits. The first preamble of bits may be identical to the second preamble of bits.

In some instances, for each bit of a second plurality of bits outside of the payload of the data packet, emulation module 4 may set a value of the respective bit such that the second plurality of bits define a header of the data packet, a preamble of the data packet, and a trailer of the data packet in accordance with the first wireless protocol.

The data packet, as it is formed in accordance with the first wireless protocol, may include headers, preambles, and trailers formed in accordance with the first wireless protocol, and these portions of the data packet may not be readable by the second wireless protocol. As such, emulation module 4 may, for each bit of a second plurality of bits outside of the payload of the data packet, set a value of the respective bit such that the second plurality of bits define a header of the data packet, a preamble of the data packet, and a trailer of the data packet in accordance with the first wireless protocol.

In some instances, prior to generating the at least one signal using the first wireless protocol, emulation module 4 may exchange positive frequency components and negative frequency components of the at least one signal. Also, prior to outputting the at least one signal, emulation module 4 may interleave the symbol of the payload using binary Hamming Code.

Emulation module 4 may perform additional preparations of the data packet. For instance, emulation module 4 may interleave a set of bits in the data packet to form a first subset of bits and a second subset of bits. The first subset of bits has a size equal to the second subset of bits. Emulation module 4 may then reverse cod e each of the first subset of bits and the second subset of bits to produce a first reverse coded subset of bits and a second reverse coded subset of bits, respectively, with the first reverse coded subset of bits having a size greater than the second reverse coded subset of bits. In reverse coding the first subset of bits, emulation module 4 may perform a matrix multiplication operation to derive the first reverse coded subset of bits.

Modulator module 6 may generate (124), based at least in part on the data packet, the at least one signal using the first wireless protocol. In generating the at least one signal, modulator module 6 may modulate the at least one signal according to one or more modulation procedures, which are discussed in greater detail below. Modulator module 6 may output (126), to receiver 12 and via the first wireless protocol, the at least one signal.

In modulating the at least one signal, modulator module 6 may, in general, modulate the at least one signal such that one or more components of the at least one signal, sent via the first wireless protocol, match one or more components of at least one template signal defined by the second wireless protocol. These components may be frequency components or time-domain phase components.

More specifically, in modulating the at least one signal, modulator module 6 may perform one or more of the following modulation procedures: modulate the at least one signal using quadrature amplitude modulation emulation; modulate, using a filter, the at least one signal using Gaussian frequency shift keying modulation, where the filter comprises a Gaussian low pass filter; modulate the at least one signal using single-carrier frequency-division multiple access (SC-FCDMA) modulation; or emulate a sign of a shift in the phase of time-domain components by setting a value of a first bit of the data packet. In the instances where the modulation procedure includes modulating the at least one signal using SC-FDMA modulation, modulator module 6 may sample an ideal waveform at a valid sample rate to produce a sequence of ideal samples and quantize a respective value for each ideal sample in the sequence of ideal samples to a respective closest quadrature amplitude modulation (QAM) point of a plurality of QAM points.

In some examples, the symbol may be a first symbol, and emulation module 4 may further determine a second symbol, a third symbol, and a fourth symbol within the data packet to be sent to receiver 12. In some instances, the first symbol, the second symbol, the third symbol, and the fourth symbol, when combined, form a singular symbol in the second wireless protocol. In other instances, the first symbol, the second symbol, the third symbol, and the fourth symbol are each different symbols in both the first wireless protocol and the second wireless protocol. For each bit of the plurality of bits included in the payload of the data packet, emulation module 4 may set a value of the respective bit such that each of the first symbol, the second symbol, the third symbol, and the fourth symbol, when the data packet is translated into the at least one signal using the first wireless protocol, are readable using the second wireless protocol. Emulation module may then generate, based at least in part on the data packet, the at least one signal using the first wireless protocol, and flip a half-chip of a boundary of at least one symbol of the data packet. Modulator module 4 may then output, to receiver 12 via the first wireless protocol, the at least one signal.

In some instance, one or more components of the at least one signal include time-domain phase components. In such instances, the at least one signal may include at least one in-phase and quadrature (I/Q) signal. In generating the at least one I/Q signal using the first wireless protocol, modulator module 6 may determine a phase of the time-domain phase components of the at least one modulated signal and calculate, based on the phase of the time-domain phase components, the I/Q signal.

In outputting the at least one signal, modulator module 6 may set a central frequency for the at least one signal such that a data subcarrier of a frequency channel that includes the central frequency matches a frequency channel of the second wireless protocol.

In some instances, for each bit of a second plurality of bits that form a header included in the payload of the data packet, modulator module 6 may set a value of the respective bit in the header such that the header includes a first preamble of bits followed by a second preamble of bits, with the first preamble of bits being identical to the second preamble of bits.

In other examples, in outputting the at least one signal, modulator module 6 may attempt to output the at least one signal over a first channel via the first wireless protocol. Upon this attempt failing, modulator module 6 may then determine a packet accept ratio of the first channel and compare the packet accept ratio of the first channel to a threshold packet accept ratio. Responsive to determining that the packet accept ratio of the first channel is below the threshold packet accept ratio, modulator module 6 may hop frequencies to a second channel that is an overlap channel between the first wireless protocol and the second wireless protocol. The second channel may also be experiencing less bandwidth usage than the first channel. Modulator module 6 may then output, over the second channel via the first wireless protocol, the at least one signal.

In some instance, modulator module 6 may further output a second set of one or more signals identical to the at least one signal. In doing so, modulator module 6 may increase the chance that the transmission of the at least one signal between transmitter 2 and receiver 12 is successful.

Figure 50:
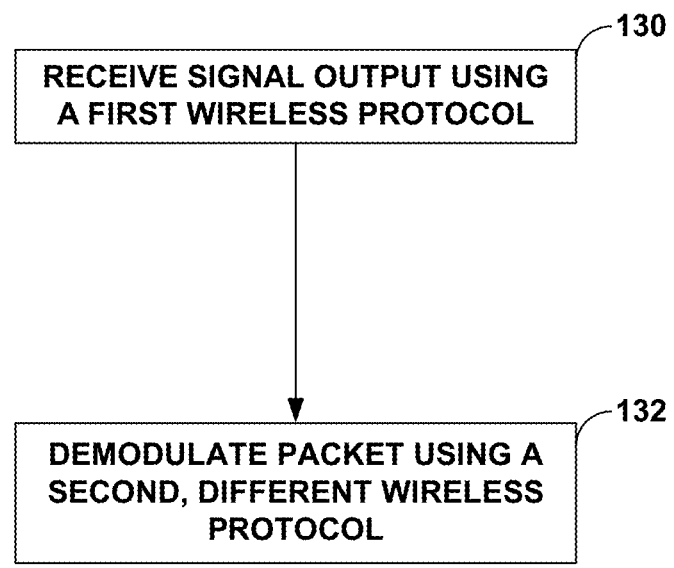
FIG. 50 is a flow diagram of one or more techniques of the current disclosure.

FIG. 50 is a flow diagram of one or more techniques of the current disclosure. The operations of FIG. 50 may be performed by one or more processors of a computing device, such as receiver 12 of FIG. 1 or FIG. 2. For purposes of illustration only, FIG. 50 is described below within the context of receiver 12 of FIG. 1.

In accordance with the techniques of this disclosure, receiver 12 may be configured to operate in accordance with the second wireless protocol, e.g., ZigBee®, WiFi®, or Bluetooth®. In accordance with the techniques of this disclosure, demodulator module 16 of receiver 12 may receive (130) at least one signal including a data packet sent from a transmitter 2, which is configured to operate in accordance with the first wireless protocol, e.g., WiFi®, Bluetooth®, or LTE. Receiver 12 may not be configured to operate in accordance with the first wireless protocol.

Demodulator module 16 of receiver 12 may demodulate (132) a payload of the data packet. The payload of the data packet may include at least a header defined by the second wireless protocol and an indication of a symbol that is associated with the data packet. The payload may include a sequence of bits readable using the second wireless protocol.

In demodulating the payload of the data packet, demodulator module 16 may capture, using an analog-to-digital converter, the at least one signal sent using the first wireless protocol. Demodulator module 16 may then determine an in-phase sample and a quadrature sample for the at least one signal. Using the in-phase sample and the quadrature sample for the at least one signal, demodulator module 16 may map the symbol of the payload of the data packet to a chip sequence.

Example 1

A system comprising: a first computing device configured to operate in accordance with a first wireless protocol; and a second computing device configured to operate in accordance with a second wireless protocol different than the first wireless protocol, wherein the second computing device is not configured to operate in accordance with the first wireless protocol, wherein the first computing device is configured to: determine a symbol to be sent to the second computing device; for each bit of a plurality of bits included in a payload of a data packet that is associated with the symbol, set a value of the respective bit such that the symbol, when the data packet is translated into at least one signal using the first wireless protocol, is readable using the second wireless protocol; generate, based at least in part on the data packet, the at least one signal using the first wireless protocol; and output, to the second computing device via the first wireless protocol, the at least one signal, and wherein the second computing device is configured to: receive the at least one signal sent from the first computing device; and demodulate the payload of the data packet, wherein the payload of the data packet comprises at least the header defined by the second wireless protocol and an indication of the symbol that is associated with the data packet.

Example 2

A method comprising: determining, by a first computing device configured to operate in accordance with a first wireless protocol, a symbol to be sent to a second computing device, wherein the second computing device is configured to operate in accordance with a second wireless protocol different than the first wireless protocol, and wherein the second computing device is not configured to operate in accordance with the first wireless protocol; for each bit of a plurality of bits included in a payload of a data packet that is associated with the symbol, setting, by the first computing device, a value of the respective bit such that the symbol, when the data packet is translated into at least one signal using the first wireless protocol, is readable using the second wireless protocol; generating, by the first computing device and based at least in part on the data packet, the at least one signal using the first wireless protocol; and outputting, by the first computing device and to the second computing device via the first wireless protocol, the at least one signal.

Example 3

The method of example 2, wherein generating the at least one signal using the first wireless protocol comprises: modulating, by the first computing device, the at least one signal such that one or more components of the at least one signal, sent via the first wireless protocol, match one or more components of at least one template signal defined by the second wireless protocol.

Example 4

The method of example 3, wherein the one or more components of the at least one signal comprise one or more of frequency components or time-domain phase components.

Example 5

The method of example 3, wherein modulating the at least one signal comprises one or more of: modulating, by the first computing device, the at least one signal using quadrature amplitude modulation emulation; modulating, by the first computing device and using a filter, the at least one signal using Gaussian frequency shift keying modulation, wherein the filter comprises a Gaussian low pass filter; modulating, by the first computing device, the at least one signal using single-carrier frequency-division multiple access (SC-FCDMA) modulation; or emulating, by the first computing device, a sign of a shift in the phase of time-domain components by setting a value of a first bit of the data packet.

Example 6

The method of example 5, wherein modulating the at least one signal using the SC-FDMA modulation comprises: sampling, by the first computing device, an ideal waveform at a valid sample rate to produce a sequence of samples; and quantizing, by the first computing device, a respective value for each sample in the sequence of samples to a respective closest quadrature amplitude modulation (QAM) point of a plurality of QAM points.

Example 7

The method of any of examples 2-6, further comprising: setting, by the first computing device, a central frequency for the at least one signal such that a data subcarrier of a frequency channel that includes the central frequency matches a frequency channel of the second wireless protocol.

Example 8

The method of any of examples 2-7, wherein the symbol comprises a first symbol, and wherein generating the at least one signal comprises: determining, by the first computing device, a second symbol, a third symbol, and a fourth symbol within the data packet to be sent to the second computing device; for each bit of the plurality of bits included in the payload of the data packet, setting, by the first computing device, a value of the respective bit such that each of the first symbol, the second symbol, the third symbol, and the fourth symbol, when the data packet is translated into the at least one signal using the first wireless protocol, is readable using the second wireless protocol; generating, by the first computing device and based at least in part on the data packet, the at least one signal using the first wireless protocol; flipping, by the first computing device, a half-chip of a boundary of at least one symbol of the data packet; and outputting, by the first computing device and to the second computing device via the first wireless protocol, the at least one signal.

Example 9

The method of example 8, wherein the first symbol, the second symbol, the third symbol, and the fourth symbol each comprise a same symbol in the second wireless protocol.

Example 10

The method of example 8, wherein the first symbol, the second symbol, the third symbol, and the fourth symbol are each different symbols.

Example 11

The method of any of examples 2-10, further comprising: for each bit of a second plurality of bits that form a header included in the payload of the data packet, setting, by the first computing device, a value of the respective bit in the header such that the header includes a first preamble of bits followed by a second preamble of bits, wherein the first preamble of bits is identical to the second preamble of bits.

Example 12

The method of any of examples 2-11, further comprising: prior to outputting the at least one signal, interleaving, by the first computing device, the symbol of the payload using binary Hamming Code.

Example 13

The method of any of examples 2-12, wherein the first wireless protocol comprises one of a WiFi® protocol, a Bluetooth® protocol, or an LTE protocol, and wherein the second wireless protocol comprises a ZigBee® protocol or the Bluetooth® protocol.

Example 14

The method of any of examples 2-13, further comprising: for each bit of a second plurality of bits outside of the payload of the data packet, setting, by the first computing device, a value of the respective bit such that the second plurality of bits define a header of the data packet, a preamble of the data packet, and a trailer of the data packet in accordance with the first wireless protocol.

Example 15

The method of any of examples 2-14, wherein the symbol comprises one or more of an informative symbol or a command to perform an action.

Example 16

The method of any of examples 2-15, wherein one or more components of the at least one signal comprise one or more time-domain phase components, wherein the at least one signal comprises at least one in-phase and quadrature (I/Q) signal, and wherein generating the at least one I/Q signal using the first wireless protocol comprises: determining, by the first computing device, a phase of the one or more time-domain phase components of the at least one signal; and calculating, by the first computing device based on the phase of the one or more time-domain phase components, the I/Q signal.

Example 17

The method of any of examples 2-16, wherein determining the symbol comprises: determining, by the first computing device, and for each of two emulatable symbols, a respective minimum inter-symbol distance, wherein each of the two emulatable symbols has a same intra-symbol distance; and selecting, by the first computing device, a first emulatable symbol of the two emulatable symbols that has a larger minimum inter-symbol distance.

Example 18

The method of any of examples 2-17, wherein the symbol comprises an initial symbol, and wherein determining the initial symbol comprises: determining, by the first computing device, a desired symbol to send to the second computing device; determining, by the first computing device, the initial symbol such that an application of a data whitening process to the initial symbol results in the desired symbol; and for each bit of the plurality of bits included in the payload of the data packet that is associated with the initial symbol, setting, by the first computing device, the value of the respective bit to be the initial symbol.

Example 19

The method of any of examples 2-18, wherein outputting the at least one signal comprises: attempting to output, by the first computing device and over a first channel via the first wireless protocol, the at least one signal; responsive to a failed attempt, determining, by the first computing device, a packet accept ratio of the first channel; comparing, by the first computing device, the packet accept ratio of the first channel to a threshold packet accept ratio; and responsive to determining that the packet accept ratio of the first channel is below the threshold packet accept ratio, hopping, by the first computing device, frequencies to a second channel, wherein the second channel comprises an overlap channel between the first wireless protocol and the second wireless protocol.

Example 20

The method of example 19, wherein the second channel comprises a channel with less bandwidth usage than the first channel.

Example 21

The method of any of examples 2-20, further comprising: outputting, by the first computing device, a second set of one or more signals, wherein the second set of one or more signals is identical to the at least one signal.

Example 22

The method of any of examples 2-21, further comprising, prior to generating the at least one signal using the first wireless protocol: exchanging, by the first computing device, positive frequency components and negative frequency components of the at least one signal.

Example 23

The method of any of examples 2-22, further comprising: interleaving, by the first computing device, a set of bits in the data packet to form a first subset of bits and a second subset of bits, wherein the first subset of bits has a size equal to the second subset of bits; and reverse coding, by the first computing device, each of the first subset of bits and the second subset of bits to produce a first reverse coded subset of bits and a second reverse coded subset of bits, respectively, wherein the first reverse coded subset of bits has a size greater than the second reverse coded subset of bits.

Example 24

The method of any of examples 2-23, wherein reverse coding the first subset of bits comprises: performing, by the first computing device, a matrix multiplication operation to derive the first reverse coded subset of bits.

Example 25

A method comprising: receiving, by a first computing device configured to operate in accordance with a first wireless protocol, at least one signal including a data packet sent from a second computing device configured to operate in accordance with a second wireless protocol, wherein the first wireless protocol is different than the second wireless protocol, and wherein the first computing device is not configured to operate in accordance with the second wireless protocol; and demodulating, by the first computing device, a payload of the data packet, wherein the payload of the data packet comprises at least a header defined by the first wireless protocol and an indication of a symbol that is associated with the data packet.

Example 26

The method of example 25, wherein the payload of the data packet further comprises a sequence of bits readable using the first wireless protocol.

Example 27

The method of any of examples 25-26, wherein the first wireless protocol comprises one of ZigBee® protocol or a Bluetooth® protocol, and wherein the second wireless protocol comprises one of a WiFi® protocol, the Bluetooth® protocol, or an LTE protocol.

Example 28

The method of any of examples 25-27, wherein demodulating the payload of the data packet comprises: capturing, by the first computing device and using an analog-to-digital converter, the at least one signal sent using the second wireless protocol; determining, by the first computing device, an in-phase sample and a quadrature sample for the at least one signal; and mapping, by the first computing device, the symbol of the payload of the data packet to a chip sequence.

Example 29

A computing device comprising: a wireless radio configured to send and receive signals via a first wireless protocol; at least one processor; and a storage component configured to store instructions executable by the at least one processor to: determine a symbol to be sent to a second computing device, wherein the second computing device is configured to operate in accordance with a second wireless protocol different than the first wireless protocol, and wherein the second computing device is not configured to operate in accordance with the first wireless protocol; for each bit of a plurality of bits included in a payload of a data packet that is associated with the symbol, set a value of the respective bit such that the symbol, when the data packet is translated into at least one signal using the first wireless protocol, is readable using the second wireless protocol; generate, based at least in part on the data packet, the at least one signal using the first wireless protocol; and output, to the second computing device via the first wireless protocol, the at least one signal.

Example 30

The computing device of example 29, wherein the instructions that cause the at least one processor to generate the at least one signal using the first wireless protocol further cause the at least one processor to: modulate the at least one signal such that one or more components of the at least one signal, sent via the first wireless protocol, match one or more components of at least one template signal defined by the second wireless protocol, wherein the one or more components of the at least one signal comprise one or more of frequency components or time-domain phase components, wherein the instructions that cause the at least one processor to modulate the at least one signal further cause the at least one processor to perform one or more of: modulating the at least one signal using quadrature amplitude modulation emulation; modulating, using a filter, the at least one signal using Gaussian frequency shift keying modulation, wherein the filter comprises a Gaussian low pass filter; modulating the at least one signal using single-carrier frequency-division multiple access (SC-FCDMA) modulation; or emulating a sign of a shift in the phase of time-domain components by setting a value of a first bit of the data packet.

Example 31

The computing device of any of examples 29-30, wherein the instructions further cause the at least one processor to: set a central frequency for the at least one signal such that a data subcarrier of a frequency channel that includes the central frequency matches a frequency channel of the second wireless protocol.

Example 32

The computing device of any of examples 29-31, wherein instructions that cause the at least one processor to generate the at least one signal using the first wireless protocol further cause the at least one processor to: determine a second symbol, a third symbol, and a fourth symbol within the data packet to be sent to the second computing device; for each bit of the plurality of bits included in the payload of the data packet, set a value of the respective bit such that each of the first symbol, the second symbol, the third symbol, and the fourth symbol, when the data packet is translated into the at least one signal using the first wireless protocol, are readable using the second wireless protocol; generate, based at least in part on the data packet, the at least one signal using the first wireless protocol; flip a half-chip of a boundary of at least one symbol of the data packet; and output, to the second computing device via the first wireless protocol, the at least one signal.

Example 33

The computing device of any of examples 29-32, wherein instructions further cause the at least one processor to: prior to outputting the at least one signal, interleave the symbol of the payload using binary Hamming Code.

Example 34

The computing device of any of examples 29-33, wherein the one or more components of the at least one signal comprise one or more time-domain phase components, wherein the at least one signal comprises at least one in-phase and quadrature (I/Q) signal, and wherein the instructions that cause the at least one processor to generate the at least one signal using the first wireless protocol further cause the at least one processor to: determine a phase of the one or more time-domain phase components of the at least one signal; and calculate, based on the phase of the one or more time-domain phase components, the I/Q signal.

Example 35

A computing device comprising: a wireless radio configured to send and receive signals via a first wireless protocol; at least one processor; and a storage component configured to store instructions executable by the at least one processor to: receive at least one signal including a data packet sent from a second computing device configured to operate in accordance with a second wireless protocol, wherein the first wireless protocol is different than the second wireless protocol, and wherein the computing device is not configured to operate in accordance with the second wireless protocol; and demodulate a payload of the data packet, wherein the payload of the data packet comprises at least a header defined by the first wireless protocol and an indication of a symbol that is associated with the data packet.

Example 36

A method comprising the steps performed by the system of example 1.

Example 37

A computing device comprising: a wireless radio configured to send and receive signals via a first wireless protocol; at least one processor; and a storage component configured to store instructions executable by the at least one processor to perform the method of any of claims 2-28.

Example 38

An apparatus comprising means for performing the method of any of claims 2-28.

Example 39

A non-transitory computer-readable storage medium is described having stored thereon instructions that, when executed, cause one or more processors of a computing device to perform the method of any of claims 2-28.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system comprising:
  a first computing device configured to operate in accordance with a first wireless protocol; and
  a second computing device configured to operate in accordance with a second wireless protocol different than the first wireless protocol,
  wherein the second computing device is not configured to operate in accordance with the first wireless protocol,
  wherein the first computing device is configured to:
    determine a symbol to be sent to the second computing device;
    for each bit of a plurality of bits included in a payload of a data packet that is associated with the symbol, set a value of the respective bit such that the symbol, when the data packet is translated into at least one signal using the first wireless protocol, is readable using the second wireless protocol;
    generate, based at least in part on the data packet, the at least one signal using the first wireless protocol; and
    output, to the second computing device via the first wireless protocol, the at least one signal, and
  wherein the second computing device is configured to:
    receive the at least one signal sent from the first computing device; and
    demodulate the payload of the data packet, wherein the payload of the data packet comprises at least a header defined by the second wireless protocol and data representative of the symbol that is associated with the data packet.

2. The system of claim 1, wherein the header defined by the second wireless protocol comprises a physical layer header.

3. A method comprising:
   determining, by a first computing device configured to operate in accordance with a first wireless protocol, a symbol to be sent to a second computing device, wherein the second computing device is configured to operate in accordance with a second wireless protocol different than the first wireless protocol, and wherein the second computing device is not configured to operate in accordance with the first wireless protocol;
   for each bit of a plurality of bits included in a payload of a data packet that is associated with the symbol, setting, by the first computing device, a value of the respective bit such that the symbol, when the data packet is translated into at least one signal using the first wireless protocol, is readable using the second wireless protocol;
   generating, by the first computing device and based at least in part on the data packet, the at least one signal using the first wireless protocol; and
   outputting, by the first computing device and to the second computing device via the first wireless protocol, the at least one signal.

4. The method of claim 3, wherein generating the at least one signal using the first wireless protocol comprises:
   modulating, by the first computing device, the at least one signal such that one or more components of the at least one signal, sent via the first wireless protocol, match one or more components of at least one template signal defined by the second wireless protocol.

5. The method of claim 4, wherein the one or more components of the at least one signal comprise one or more of frequency components or time-domain phase components.

6. The method of claim 4, wherein modulating the at least one signal comprises one or more of:
   modulating, by the first computing device, the at least one signal using quadrature amplitude modulation emulation;
   modulating, by the first computing device and using a filter, the at least one signal using Gaussian frequency shift keying modulation, wherein the filter comprises a Gaussian low pass filter;
   modulating, by the first computing device, the at least one signal using single-carrier frequency-division multiple access (SC-FCDMA) modulation; or
   emulating, by the first computing device, a sign of a shift in the phase of time-domain components by setting a value of a first bit of the data packet.

7. The method of claim 6, wherein modulating the at least one signal using the SC-FDMA modulation comprises:
   sampling, by the first computing device, an ideal waveform at a valid sample rate to produce a sequence of samples; and
   quantizing, by the first computing device, a respective value for each sample in the sequence of samples to a respective closest quadrature amplitude modulation (QAM) point of a plurality of QAM points.

8. The method of claim 3, further comprising:
   setting, by the first computing device, a central frequency for the at least one signal such that a data sub carrier of a frequency channel that includes the central frequency matches a frequency channel of the second wireless protocol.

9. The method of claim 3, wherein the symbol comprises a first symbol, and wherein generating the at least one signal comprises:
   determining, by the first computing device, a second symbol, a third symbol, and a fourth symbol within the data packet to be sent to the second computing device;
   for each bit of the plurality of bits included in the payload of the data packet, setting, by the first computing device, a value of the respective bit such that each of the first symbol, the second symbol, the third symbol, and the fourth symbol, when the data packet is translated into the at least one signal using the first wireless protocol, is readable using the second wireless protocol;
   generating, by the first computing device and based at least in part on the data packet, the at least one signal using the first wireless protocol;
   flipping, by the first computing device, a half-chip of a boundary of at least one symbol of the data packet; and
   outputting, by the first computing device and to the second computing device via the first wireless protocol, the at least one signal.

10. The method of claim 9, wherein the first symbol, the second symbol, the third symbol, and the fourth symbol each comprise a same symbol in the second wireless protocol.

11. The method of claim 9, wherein the first symbol, the second symbol, the third symbol, and the fourth symbol are each different symbols.

12. The method of claim 3, further comprising:
   for each bit of a second plurality of bits that form a header included in the payload of the data packet, setting, by the first computing device, a value of the respective bit in the header such that the header includes a first preamble of bits followed by a second preamble of bits, wherein the first preamble of bits is identical to the second preamble of bits.

13. The method of claim 3, further comprising:
   prior to outputting the at least one signal, interleaving, by the first computing device, the symbol of the payload using binary Hamming Code.

14. The method of claim 3, wherein the first wireless protocol comprises one of a WiFi® protocol, a Bluetooth® protocol, or an LTE protocol, and
   wherein the second wireless protocol comprises a ZigBee® protocol.

15. The method of claim 3, further comprising:
   for each bit of a second plurality of bits outside of the payload of the data packet, setting, by the first computing device, a value of the respective bit such that the second plurality of bits define a header of the data packet, a preamble of the data packet, and a trailer of the data packet in accordance with the first wireless protocol.

16. The method of claim 3, wherein the symbol comprises one or more of an informative symbol or a command to perform an action.

17. The method of claim 3, wherein one or more components of the at least one signal comprise one or more time-domain phase components, wherein the at least one signal comprises at least one in-phase and quadrature (I/Q) signal, and wherein generating the at least one I/Q signal using the first wireless protocol comprises:
   determining, by the first computing device, a phase of the one or more time-domain phase components of the at least one signal; and calculating, by the first computing device based on the phase of the one or more time-domain phase components, the I/Q signal.

18. The method of claim 3, wherein determining the symbol comprises:
    determining, by the first computing device, and for each of two emulatable symbols, a respective minimum inter-symbol distance, wherein each of the two emulatable symbols has a same intra-symbol distance; and
    selecting, by the first computing device, a first emulatable symbol of the two emulatable symbols that has a larger minimum inter-symbol distance.

19. The method of claim 3, wherein the symbol comprises an initial symbol, and wherein determining the initial symbol comprises:
    determining, by the first computing device, a desired symbol to send to the second computing device;
    determining, by the first computing device, the initial symbol such that an application of a data whitening process to the initial symbol results in the desired symbol; and
    for each bit of the plurality of bits included in the payload of the data packet that is associated with the initial symbol, setting, by the first computing device, the value of the respective bit to be the initial symbol.

20. The method of claim 3, wherein outputting the at least one signal comprises:
    attempting to output, by the first computing device and over a first channel via the first wireless protocol, the at least one signal
    responsive to a failed attempt, determining, by the first computing device, a packet accept ratio of the first channel;
    comparing, by the first computing device, the packet accept ratio of the first channel to a threshold packet accept ratio; and
    responsive to determining that the packet accept ratio of the first channel is below the threshold packet accept ratio, hopping, by the first computing device, frequencies to a second channel, wherein the second channel comprises an overlap channel between the first wireless protocol and the second wireless protocol.

21. The method of claim 20, wherein the second channel comprises a channel with less bandwidth usage than the first channel.

22. The method of claim 3, further comprising:
    outputting, by the first computing device, a second set of one or more signals, wherein the second set of one or more signals is identical to the at least one signal.

23. The method of claim 3, further comprising, prior to generating the at least one signal using the first wireless protocol:
    exchanging, by the first computing device, positive frequency components and negative frequency components of the at least one signal.

24. The method of claim 3, further comprising:
    interleaving, by the first computing device, a set of bits in the data packet to form a first subset of bits and a second subset of bits, wherein the first subset of bits has a size equal to the second subset of bits; and
    reverse coding, by the first computing device, each of the first subset of bits and the second subset of bits to produce a first reverse coded subset of bits and a second reverse coded subset of bits, respectively, wherein the first reverse coded subset of bits has a size greater than the second reverse coded subset of bits.

25. The method of claim 24, wherein reverse coding the first subset of bits comprises:
    performing, by the first computing device, a matrix multiplication operation to derive the first reverse coded subset of bits.

26. A method comprising:
    receiving, by a first computing device configured to operate in accordance with a first wireless protocol, at least one signal including a data packet sent from a second computing device configured to operate in accordance with a second wireless protocol,
    wherein the first wireless protocol is different than the second wireless protocol,
    wherein the first computing device is not configured to operate in accordance with the second wireless protocol,
    wherein a payload of the data packet comprises a plurality of bits, and
    wherein a value of each bit of the plurality of bits is set such that a symbol associated with the data packet is readable using the first wireless protocol; and
    demodulating, by the first computing device, a payload of the data packet, wherein the payload of the data packet comprises at least a header defined by the first wireless protocol and data representative of a symbol that is associated with the data packet.

27. The method of claim 26, wherein the payload of the data packet further comprises a sequence of bits readable using the first wireless protocol.

28. The method of claim 26, wherein the first wireless protocol comprises a ZigBee® protocol, and wherein the second wireless protocol comprises one of a WiFi® protocol, a Bluetooth® protocol, or an LTE protocol.

29. The method of claim 26, wherein demodulating the payload of the data packet comprises:
    capturing, by the first computing device and using an analog-to-digital converter, the at least one signal sent using the second wireless protocol;
    determining, by the first computing device, an in-phase sample and a quadrature sample for the at least one signal; and
    mapping, by the first computing device, a chip sequence to the symbol of the payload of the data packet.

30. The method of claim 26, wherein the header defined by the first wireless protocol comprises a physical layer header.

31. A computing device comprising:
    a wireless radio configured to send and receive signals via a first wireless protocol;
    at least one processor; and
    a storage component configured to store instructions executable by the at least one processor to:
        determine a symbol to be sent to a second computing device, wherein the second computing device is configured to operate in accordance with a second wireless protocol different than the first wireless protocol, and wherein the second computing device is not configured to operate in accordance with the first wireless protocol;
        for each bit of a plurality of bits included in a payload of a data packet that is associated with the symbol, set a value of the respective bit such that the symbol, when the data packet is translated into at least one signal using the first wireless protocol, is readable using the second wireless protocol;

generate, based at least in part on the data packet, the at least one signal using the first wireless protocol; and output, to the second computing device via the first wireless protocol, the at least one signal.

32. The computing device of claim 31, wherein the instructions that cause the at least one processor to generate the at least one signal using the first wireless protocol further cause the at least one processor to:

modulate the at least one signal such that one or more components of the at least one signal, sent via the first wireless protocol, match one or more components of at least one template signal defined by the second wireless protocol, wherein the one or more components of the at least one signal comprise one or more of frequency components or time-domain phase components, wherein the instructions that cause the at least one processor to modulate the at least one signal further cause the at least one processor to perform one or more of:

modulating the at least one signal using quadrature amplitude modulation emulation;

modulating, using a filter, the at least one signal using Gaussian frequency shift keying modulation, wherein the filter comprises a Gaussian low pass filter;

modulating the at least one signal using single-carrier frequency-division multiple access (SC-FCDMA) modulation; or emulating a sign of a shift in the phase of time-domain components by setting a value of a first bit of the data packet.

33. The computing device of claim 31, wherein the instructions further cause the at least one processor to:

set a central frequency for the at least one signal such that a data subcarrier of a frequency channel that includes the central frequency matches a frequency channel of the second wireless protocol.

34. The computing device of claim 31, wherein instructions that cause the at least one processor to generate the at least one signal using the first wireless protocol further cause the at least one processor to:

determine a second symbol, a third symbol, and a fourth symbol within the data packet to be sent to the second computing device;

for each bit of the plurality of bits included in the payload of the data packet, set a value of the respective bit such that each of the first symbol, the second symbol, the third symbol, and the fourth symbol, when the data packet is translated into the at least one signal using the first wireless protocol, are readable using the second wireless protocol;

generate, based at least in part on the data packet, the at least one signal using the first wireless protocol;

flip a half-chip of a boundary of at least one symbol of the data packet; and output, to the second computing device via the first wireless protocol, the at least one signal.

35. The computing device of claim 31, wherein instructions further cause the at least one processor to:

prior to outputting the at least one signal, interleave the symbol of the payload using binary Hamming Code.

36. The computing device of claim 31, wherein the one or more components of the at least one signal comprise one or more time-domain phase components, wherein the at least one signal comprises at least one in-phase and quadrature (I/Q) signal, and wherein the instructions that cause the at least one processor to generate the at least one signal using the first wireless protocol further cause the at least one processor to:

determine a phase of the one or more time-domain phase components of the at least one signal; and calculate, based on the phase of the one or more time-domain phase components, the I/Q signal.

37. A computing device comprising:

a wireless radio configured to send and receive signals via a first wireless protocol;

at least one processor; and a storage component configured to store instructions executable by the at least one processor to:

receive at least one signal including a data packet sent from a second computing device configured to operate in accordance with a second wireless protocol, wherein the first wireless protocol is different than the second wireless protocol, and wherein the computing device is not configured to operate in accordance with the second wireless protocol; and demodulate a payload of the data packet, wherein the payload of the data packet comprises at least a header defined by the first wireless protocol and data representative of a symbol that is associated with the data packet.

38. The computing device of claim 37, wherein the header defined by the first wireless protocol comprises a physical layer header.

* * * * *